(12) United States Patent
Takeuchi et al.

(10) Patent No.: US 7,379,037 B2
(45) Date of Patent: May 27, 2008

(54) DISPLAY APPARATUS, METHOD OF DRIVING DISPLAY APPARATUS, ELECTRON EMITTER, METHOD OF DRIVING ELECTRON EMITTER, APPARATUS FOR DRIVING ELECTRON EMITTER, ELECTRON EMISSION APPARATUS, AND METHOD OF DRIVING ELECTRON EMISSION APPARATUS

(75) Inventors: Yukihisa Takeuchi, Nishikamo-Gun (JP); Tsutomu Nanataki, Toyoake (JP); Iwao Ohwada, Nagoya (JP); Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 342 days.

(21) Appl. No.: 10/808,258

(22) Filed: Mar. 24, 2004

(65) Prior Publication Data

US 2004/0233136 A1  Nov. 25, 2004

Related U.S. Application Data

(63) Continuation-in-part of application No. 10/678,958, filed on Oct. 3, 2003, now abandoned, which is a continuation-in-part of application No. 10/730,754, filed on Dec. 8, 2003, which is a continuation-in-part of application No. 10/731,901, filed on Dec. 9, 2003.

(60) Provisional application No. 60/457,719, filed on Mar. 26, 2003.

(30) Foreign Application Priority Data

Mar. 12, 2004 (JP) ............................... 2004-070859

(51) Int. Cl.
*G09G 5/00* (2006.01)
*G09G 3/20* (2006.01)

(52) U.S. Cl. ..................................... 345/75.2; 345/204
(58) Field of Classification Search ............... 345/75.2, 345/204, 690; 315/169.1–169.4; 313/495–496
See application file for complete search history.

(56) References Cited

U.S. PATENT DOCUMENTS 5,280,221 A  1/1994 Okamoto et al.

(Continued)

FOREIGN PATENT DOCUMENTS

DE          3833604          4/1990

(Continued)

OTHER PUBLICATIONS

U.S. Appl. No. 11/145,525, filed Jun. 3, 2005, Takeuchi et al.

(Continued)

*Primary Examiner*—Amr A. Awad
*Assistant Examiner*—Stephen G Sherman
(74) *Attorney, Agent, or Firm*—Burr & Brown

(57) ABSTRACT

One image is displayed in a period as one frame, which includes one charge accumulation period and one light emission period. In the charge accumulation period, all electron emitters are scanned, and voltages depending on the luminance levels of corresponding pixels are applied to the electron emitters which correspond to pixels to be turned on (to emit light), to accumulate charges (electrons) in amounts depending on the luminance levels of corresponding pixels in the electron emitters which correspond to pixels to be turned on. In the next light emission period, a constant voltage is applied to all the electron emitters to emit electrons in amounts depending on the luminance levels of corresponding pixels from the electron emitters which correspond to pixels to be turned on, thereby emitting light from the pixels to be turned on.

16 Claims, 58 Drawing Sheets

U.S. PATENT DOCUMENTS

| | | | |
|---|---|---|---|
| 5,361,015 | A | 11/1994 | Okunuki et al. |
| 5,453,661 | A | 9/1995 | Auciello et al. |
| 5,508,590 | A | 4/1996 | Sampayan et al. |
| 5,666,019 | A | 9/1997 | Potter |
| 5,726,524 | A | 3/1998 | Debe |
| 5,729,094 | A | 3/1998 | Geis et al. |
| 5,747,926 | A | 5/1998 | Nakamoto et al. |
| 5,764,205 | A * | 6/1998 | Doyle et al. ............ 345/74.1 |
| 5,874,802 | A | 2/1999 | Choi et al. |
| 5,877,594 | A | 3/1999 | Miyano et al. |
| 5,990,605 | A | 11/1999 | Yoshikawa et al. |
| 6,040,973 | A | 3/2000 | Okamoto et al. |
| 6,153,978 | A | 11/2000 | Okamoto |
| 6,157,145 | A | 12/2000 | Vollkommer et al. |
| 6,184,612 | B1 | 2/2001 | Negishi et al. |
| 6,198,225 | B1 | 3/2001 | Kano et al. |
| 6,274,881 | B1 | 8/2001 | Akiyama et al. |
| 6,285,123 | B1 | 9/2001 | Yamada et al. |
| 6,288,695 | B1 | 9/2001 | Wood |
| 6,313,815 | B1 | 11/2001 | Takeda et al. |
| 6,359,383 | B1 | 3/2002 | Chuang et al. |
| 6,380,913 | B1 | 4/2002 | Hush et al. |
| 6,452,328 | B1 | 9/2002 | Saito et al. |
| 6,469,452 | B2 | 10/2002 | Seo et al. |
| 6,479,924 | B1 | 11/2002 | Yoo |
| 6,538,391 | B1 | 3/2003 | Suzuki et al. |
| 6,580,108 | B1 | 6/2003 | Utsumi et al. |
| 7,071,628 | B2 * | 7/2006 | Takeuchi et al. ......... 315/169.1 |
| 2001/0050537 | A1 * | 12/2001 | Itoh et al. ............... 315/169.1 |
| 2002/0011982 | A1 | 1/2002 | Takeuchi et al. |
| 2002/0060516 | A1 | 5/2002 | Kawate et al. |
| 2002/0153827 | A1 | 10/2002 | Takeuchi et al. |
| 2002/0154101 | A1 | 10/2002 | Abe et al. |
| 2003/0038600 | A1 | 2/2003 | Takeuchi et al. |
| 2004/0061431 | A1 | 4/2004 | Takeuchi et al. |
| 2004/0066133 | A1 | 4/2004 | Takeuchi et al. |
| 2004/0090398 | A1 | 5/2004 | Takeuchi et al. |
| 2004/0100200 | A1 | 5/2004 | Takeuchi et al. |
| 2004/0104684 | A1 | 6/2004 | Takeuchi et al. |
| 2004/0104689 | A1 | 6/2004 | Takeuchi et al. |
| 2004/0104690 | A1 | 6/2004 | Takeuchi et al. |
| 2004/0113561 | A1 | 6/2004 | Takeuchi et al. |
| 2005/0073234 | A1 * | 4/2005 | Takeuchi et al. ............ 313/311 |
| 2005/0104504 | A1 * | 5/2005 | Takeuchi et al. ............ 313/495 |
| 2005/0116603 | A1 * | 6/2005 | Takeuchi et al. ............ 313/311 |

FOREIGN PATENT DOCUMENTS

| | | |
|---|---|---|
| DE | 10057072 | 5/2001 |
| EP | 0 353 632 | 2/1990 |
| EP | 428853 | 5/1991 |
| EP | 0 718 864 | 6/1996 |
| EP | 0 953 958 A2 | 11/1999 |
| FR | 2639151 | 5/1990 |
| FR | 2675306 | 10/1992 |
| FR | 2789221 | 8/2000 |
| FR | 2789223 | 8/2000 |
| JP | 44-26125 | 11/1969 |
| JP | 46-20944 | 6/1971 |
| JP | 59-208587 | 11/1984 |
| JP | 63-150837 A | 6/1988 |
| JP | 1-311533 A | 12/1989 |
| JP | 05-325777 | 12/1993 |
| JP | 06-103886 | 4/1994 |
| JP | 7-147131 A | 6/1995 |
| JP | 08-111166 | 4/1996 |
| JP | 09-090882 A | 4/1997 |
| JP | 10-27539 A | 1/1998 |
| JP | 10-241553 | 9/1998 |
| JP | 11-185600 | 7/1999 |
| JP | 11-288249 A | 10/1999 |
| JP | 2000-285801 A | 10/2000 |
| JP | 2000-310970 A | 11/2000 |
| JP | 3160213 B2 | 2/2001 |
| JP | 3214256 | 7/2001 |
| JP | 2002-108310 A1 | 4/2002 |
| JP | 2003-017245 A1 | 1/2003 |
| WO | 01/09870 | 2/2001 |
| WO | 02/052600 A1 | 7/2002 |

OTHER PUBLICATIONS

U.S. Appl. No. 10/919,678, filed Aug. 17, 2004, Takeuchi et al.

U.S. Appl. No. 10/810,078, filed Mar. 26, 2004, Takeuchi et al.

U.S. Appl. No. 10/951,509, filed Sep. 28, 2004, Takeuchi et al.

U.S. Appl. No. 10/950,976, filed Sep. 27, 2004, Takeuchi et al.

U.S. Appl. No. 10/952,524, filed Sep. 28, 2004, Takeuchi et al.

U.S. Appl. No. 10/951,832, filed Sep. 28, 2004, Takeuchi et al.

Kanemaru, Seigou, "Featuring: All About Flat Displays 2000, Leading Technological Trend of FEDs," Electronic Engineering, Nikkan Kogyo Shimbun, Ltd., Jul. 2000, pp. 38-41 (with partial translation).

U.S. Appl. No. 10/919,747, filed Aug. 17, 2001, Takeuchi et al.

U.S. Appl. No. 10/901,932, filed Jul. 29, 2004, Takeuchi et al.

U.S. Appl. No. 10/459,415, filed Jun. 11, 2003, Takeuchi et al.

U.S. Appl. No. 10/647,794, filed Aug. 25, 2003, Takeuchi et al.

U.S. Appl. No. 10/730,754, filed Dec. 8, 2003, Takeuchi et al.

U.S. Appl. No. 10/719,521, filed Nov. 21, 2003, Takeuchi et al.

"Pulsed Electron Source Using a Ferroelectric Cathode," Tokyo Institute of Technology, vol. 68, No. 5, Jan. 7, 1999, pp. 546-550.

Puchkarev, Victor F. and Mesyats, Gennady A., "On the Mechanism of Emission from the Ferroelectric Ceramic Cathode," Journal of Applied Physics, vol. 78, No. 9, Nov. 1, 1995, pp. 5633-5637.

Riege, H., "Electron Emission from Ferroelectrics—a Review," Nucl. Instr. and Meth. A340, 1994, pp. 80-89.

Masatoshi Miyake et al., "Electron Emission from Ferroelectric Cathodes Excited by Pulsed Voltage," Tokyo Institute of Technology, vol. 119, No. 5, 1999 pp. 622-627.

G. Benedek et al., "Electron Emission From Ferroelectric/Antiferroelectric Cathodes Excited by Short High-Voltage Pulses", Journal Applied Physics, vol. 81, No. 3, Feb. 1, 1997, pp. 1396-1403.

Gundel, H. et al., "Low Pressure Hollow Cathode Switch Triggered by a Pulsed Electron Beam Emitted From Ferroelectrics", Applied Physics Letter, American Institute of Physics, New York, US vol. 54, No. 21, May 22, 1989, pp. 2071-2073.

Gundel, H. et al., "Time-Dependent Electron Emission From Ferroelectrics by External Pulsed Electric Fields", Journal of Applied Physics, American Institute of Physics, New York, US vol. 69, No. 2, Jan. 15, 1991, pp. 975-982.

* cited by examiner

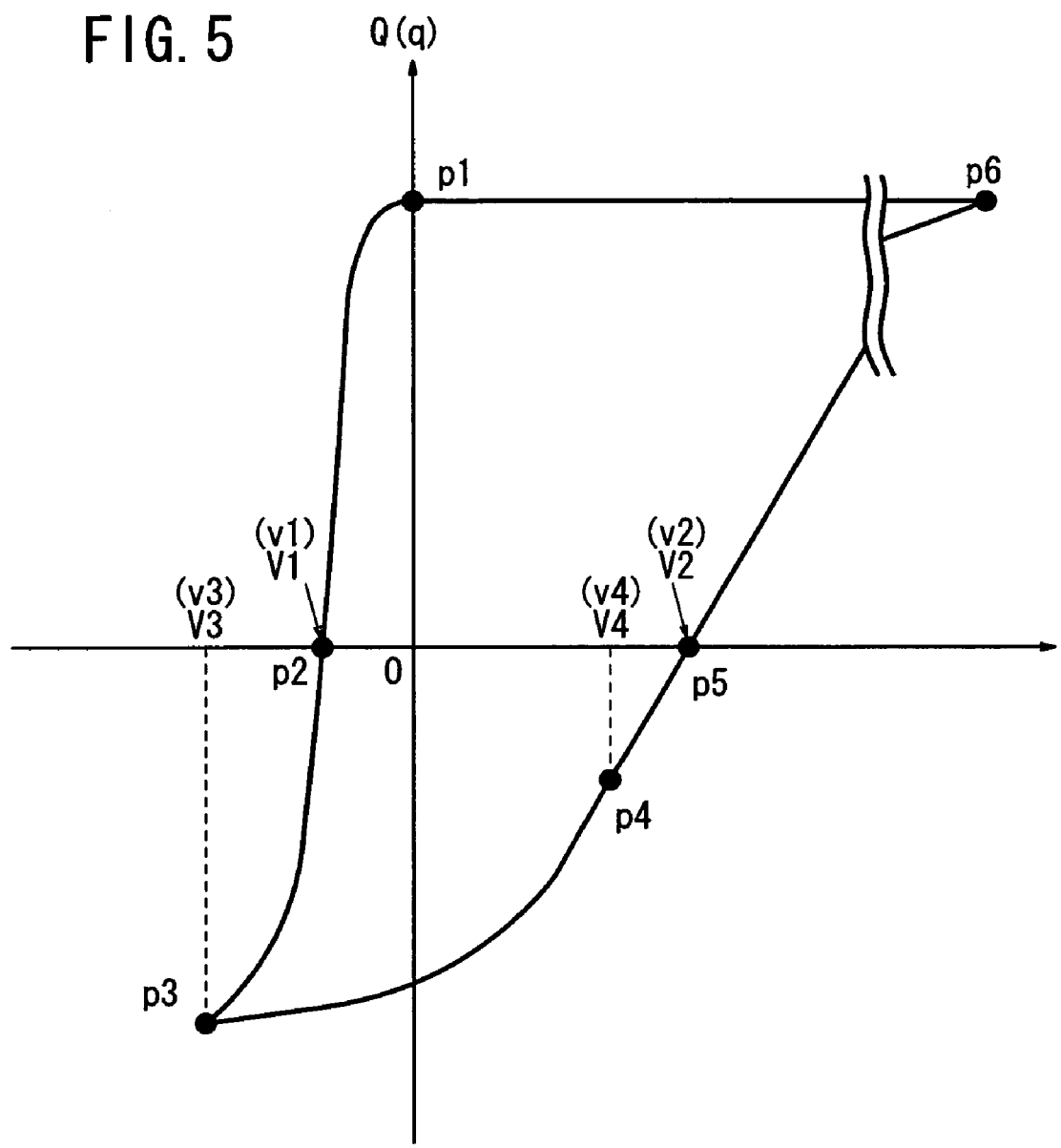

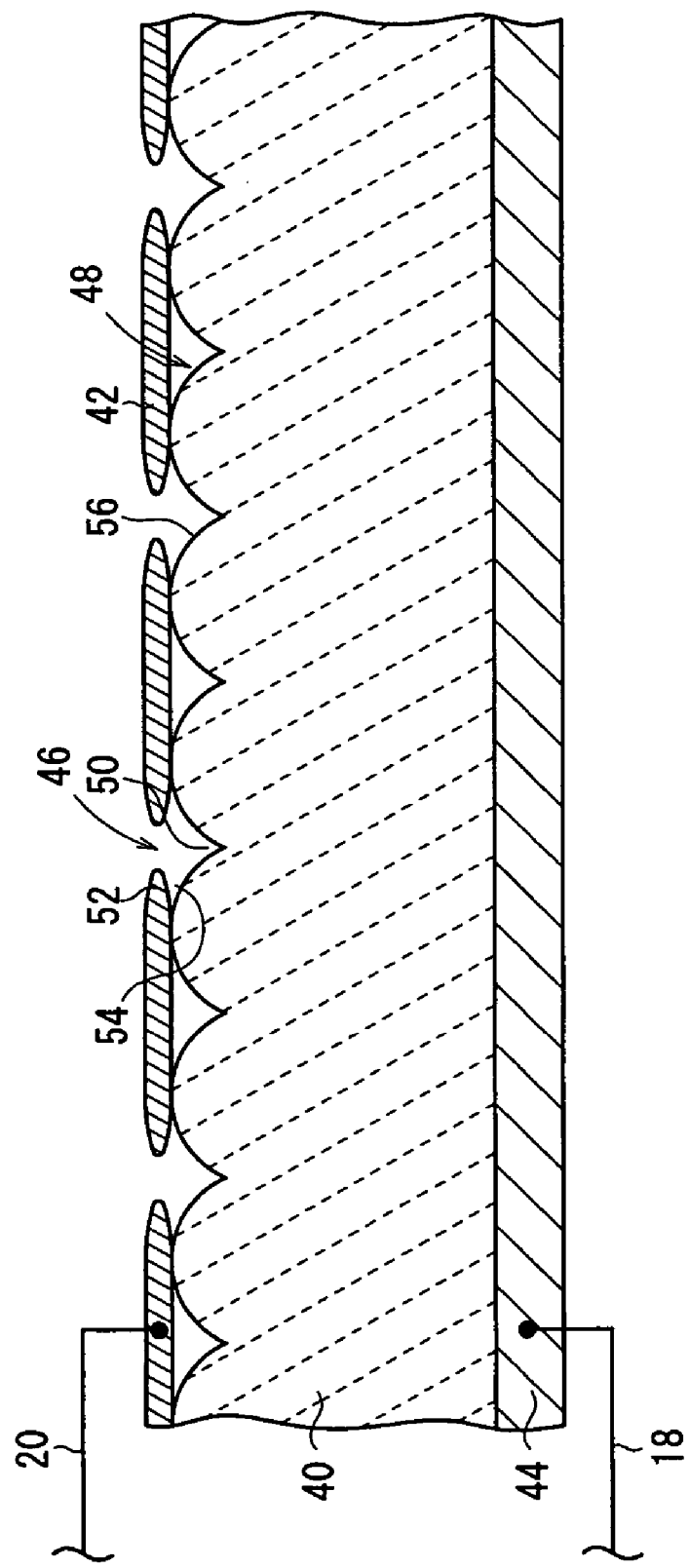

FIG. 28

|  | CHARGE ACCUMULATION PERIOD | | LIGHT EMISSION PERIOD |
|---|---|---|---|
|  | ON | OFF |  |
|  | 0~30[V] | 50[V] | 0[V] |
| SELECTED | 50[V] | -50~-20[V] | 0[V] |  |
| UNSELECTED | 0[V] | 0~30[V] | 50[V] |  |
| ALL SELECTED | -350[V] |  | 350[V] |

FIG. 31

|  | CHARGE ACCUMULATION PERIOD | | LIGHT EMISSION PERIOD |
|---|---|---|---|
|  | ON | OFF |  |
|  | 0[V] | 50[V] | 0~-280[V] |
| SELECTED | 50[V] | -50[V] | 0[V] |  |
| UNSELECTED | 0[V] | 0[V] | 50[V] |  |
| ALL SELECTED | -350[V] |  |  | 350~70[V] |

FIG. 33

|  | CHARGE ACCUMULATION PERIOD | | LIGHT EMISSION PERIOD |
|---|---|---|---|
|  | ON | OFF | |
|  | 0~30[V] | 50[V] | 0[V] |
| SELECTED | 50[V] | -50~-20[V] | 0[V] | |
| UNSELECTED | 0[V] | 0~30[V] | 50[V] | |
| ALL SELECTED | -350[V] | | | 350[V] |

FIG. 36

|  | | CHARGE ACCUMULATION PERIOD | | LIGHT EMISSION PERIOD |
|---|---|---|---|---|
|  | | ON | OFF | |
|  | | 0 [V] | 50 [V] | -150 [V] |
| SELECTED | 50 [V] | -50 [V] | 0 [V] | |
| UNSELECTED | 0 [V] | 0 [V] | 50 [V] | |
| ALL SELECTED | -350 [V] | | | 200 [V] |

FIG. 39

|  | | CHARGE ACCUMULATION PERIOD | LIGHT EMISSION PERIOD | |
|---|---|---|---|---|
|  | | | ON | OFF |
|  | | 0 [V] | 200~110 [V] | 100 [V] |
| SELECTED | 0 [V] | | 200~110 [V] | 100 [V] |
| UNSELECTED | 100 [V] | | 10~100 [V] | 0 [V] |
| ALL SELECTED | 70 [V] | −70 [V] | | |

FIG. 41

|  | | CHARGE ACCUMULATION PERIOD | LIGHT EMISSION PERIOD | |
|---|---|---|---|---|
|  | | | ON | OFF |
|  | | 0~50[V] | 200[V] | 100[V] |
| SELECTED | 0[V] | | 200[V] | 100[V] |
| UNSELECTED | 100[V] | | 100[V] | 0[V] |
| ALL SELECTED | 70[V] | -70~-20[V] | | |

FIG. 43

|  | | CHARGE ACCUMULATION PERIOD | LIGHT EMISSION PERIOD | |
|---|---|---|---|---|
|  | | | ON | OFF |
|  | | 0 [V] | 200~110 [V] | 100 [V] |
| SELECTED | 0 [V] | | 200~110 [V] | 100 [V] |
| UNSELECTED | 100 [V] | | 10~100 [V] | 0 [V] |
| ALL SELECTED | 70 [V] | −70 [V] | | |

FIG. 45

|  | CHARGE ACCUMULATION PERIOD | LIGHT EMISSION PERIOD | |
|---|---|---|---|
|  |  | ON | OFF |
|  | 0 [V] | 200 [V] | 100 [V] |
| SELECTED | 0 [V] |  | 200 [V] | 100 [V] |
| UNSELECTED | 100 [V] |  | 100 [V] | 0 [V] |
| ALL SELECTED | 70 [V] | −70 [V] |  |

FIG. 48

| | CHARGE ACCUMULATION PERIOD | | LIGHT EMISSION PERIOD |
|---|---|---|---|
| | ON | OFF | |
| | 0～30[V] | 50[V] | 0[V] |
| SELECTED | 50[V] | -50～-20[V] | 0[V] | |
| RESET | 0[V] | | 50[V] | |
| UNSELECTED | High-Z | VARIABLE FROM 0 TO 100 V | |
| ALL SELECTED | -350[V] | | 350[V] |

High-Z: HIGH IMPEDANCE STATE

FIG. 53

|  | | ON | OFF |
|---|---|---|---|
|  | | -40 [V] | 0 [V] |
| SELECTED | 100 [V] | -140 [V] | -100 [V] |
| UNSELECTED | -100 [V] | 60 [V] | 100 [V] |

FIG. 54

|  | | ON | OFF |
|---|---|---|---|
|  | | −40[V] | 0[V] |
| SELECTED | 100[V] | −140[V] | −100[V] |
| RESET | −100[V] | 60[V] | 100[V] |
| ALL SELECTED | High-Z | VARIABLE FROM 60 TO 140 V | |

High-Z: HIGH IMPEDANCE STATE

FIG. 55

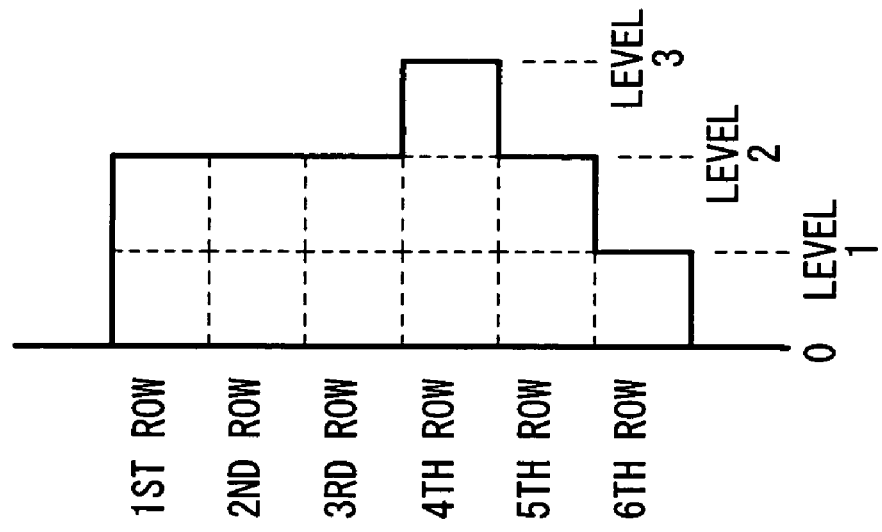
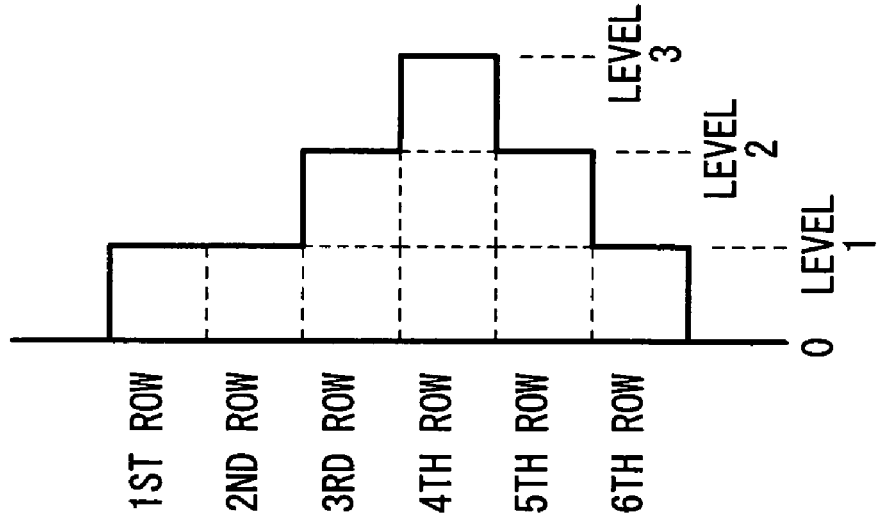
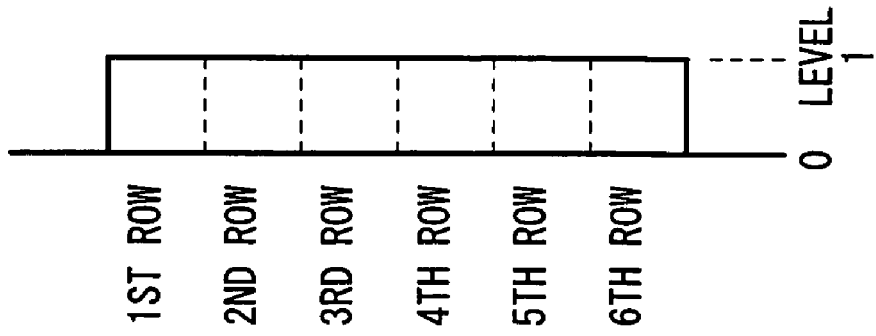

FIG. 58

|  | | ON | OFF |
|---|---|---|---|
|  | | −40[V] | 0[V] |
| SELECTED | 100[V] | −140[V] | −100[V] |
| RESET | −100[V] | 60[V] | 100[V] |
| 1ST UNSELECTED | High-Z | VARIABLE FROM − 140 TO − 60 V | |
| 2ND UNSELECTED | High-Z | VARIABLE FROM 60 TO 140 V | |

DISPLAY APPARATUS, METHOD OF DRIVING DISPLAY APPARATUS, ELECTRON EMITTER, METHOD OF DRIVING ELECTRON EMITTER, APPARATUS FOR DRIVING ELECTRON EMITTER, ELECTRON EMISSION APPARATUS, AND METHOD OF DRIVING ELECTRON EMISSION APPARATUS

CROSS REFERENCE TO RELATED APPLICATIONS

This application is a continuation-in-part of U.S. application Ser. No. 10/678,958 filed Oct. 3, 2003 now abandoned, U.S. application Ser. No. 10/730,754 filed Dec. 8, 2003 and U.S. application Ser. No. 10/731,901 filed Dec. 9, 2003, and claims the benefit of U.S. Application Ser. No. 60/457,719 filed Mar. 26, 2003, the entireties of which are incorporated herein by reference.

This application also claims the benefit of Japanese Application 2004-070859, filed Mar. 12, 2004, the entirety of which is incorporated herein by reference.

BACKGROUND OF THE INVENTION

1. Field of the Invention

The present invention relates to a display apparatus for supplying pixel signals respectively to a plurality of electron emitters arranged in association with a plurality of pixels thereby to display an image, a method of driving such a display apparatus, an electron emitter, a method of driving an electron emitter, an apparatus for driving an electron emitter, an electron emission apparatus, and a method of driving an electron emission apparatus.

2. Description of the Related Art

Recently, electron emitters having a cathode electrode and an anode electrode have been finding use in various applications such as field emission displays (FEDs) and backlight units. In an FED, a plurality of electron emitters are arranged in a two-dimensional array, and a plurality of phosphors are positioned in association with the respective electron emitters with a predetermined gap left therebetween.

Conventional electron emitters are disclosed in the following documents 1 through 5. Various theories about the emission of electrons from a dielectric material making up an emitter have been presented in the following documents 6 through 8:

[Document 1]
Japanese laid-open patent publication-No. 1-311533
[Document 2]
Japanese laid-open patent publication No. 7-147131
[Document 3]
Japanese laid-open patent publication No. 2000-285801
[Document 4]
Japanese patent publication No. 46-20944
[Document 5]
Japanese patent publication No. 44-26125
[Document 6]
Yasuoka and Ishii, "Pulsed electron source using a ferroelectric cathode", J. Appl. Phys., Vol. 68, No. 5, p. 546-550 (1999)
[Document 7]
V. F. Puchkarev, G. A. Mesyats, On the mechanism of emission from the ferroelectric ceramic cathode, J. Appl. Phys., Vol. 78, No. 9, 1 Nov., 1995, p. 5633-5637
[Document 8]
H. Riege, Electron emission ferroelectrics—a review, Nucl. Instr. and Meth. A340, p. 80-89 (1994)

If a display apparatus is constructed using pixels comprising electron emitters, then it is considered to array a number of pixels in a matrix drive them according to a passive matrix drive process or an active matrix drive process.

For enabling the pixels to emit light, it is necessary to apply a high voltage to the electron emitters. For this reason, for emitting light when the pixels are scanned, it is necessary to apply a high voltage during a period (e.g., one frame) for displaying one image, resulting in the problem of increased electric power consumption. A circuit for selecting each electron emitter and a circuit for supplying a pixel signal to the selected electron emitter need to be able to handle the high voltage.

The pixels on unselected rows often tend to be affected by a signal that is supplied to the pixels on a selected row, and this leads to an increase in the electric power consumption. Since each pixel is devoid of a memory effect (charge storage at electron emitters), the pixels are disadvantageous in attempts to achieve higher luminance and higher contrast.

SUMMARY OF THE INVENTION

The present invention has been made in view of the above drawbacks. It is an object of the present invention to provide a display apparatus which is designed for low electric power consumption and is capable of being driven at a low voltage, and a method of driving such a display apparatus.

Another object of the present invention is to provide a display apparatus which, in addition to the above capabilities, prevents the pixels on unselected rows from being affected by a signal that is supplied to the pixels on a selected row, and allows each pixel to have a memory effect for higher luminance and higher contrast, and a method of driving such a display apparatus.

A display apparatus according to the present invention has a plurality of electron emitters arrayed in association with a plurality of pixels, for emitting electrons from the electron emitters to display an image, and is characterized in that necessary charges are accumulated in all the electron emitters in a first period, and a voltage required to emit electrons is applied to all the electron emitters to cause a plurality of electron emitters which correspond to pixels to emit light therefrom, for emitting light from the pixels, in a second period after the first period.

Still another object of the present invention is to provide an apparatus for driving an electron emitter and a method of driving an electron emitter with a circuit system which can be driven at a low voltage for driving the electron emitter with reduced power consumption.

Yet still another object of the present invention is to provide an electron emission apparatus and a method of driving such an electron emission apparatus with a circuit which can be driven at a low voltage for applying voltages (an accumulation voltage and an emission voltage) to electron emitters with reduced power consumption.

According to the present invention, there is also provided a method of driving a display apparatus having a plurality of electron emitters arrayed in association with a plurality of pixels, for emitting electrons from the electron emitters to display an image, characterized by the step of accumulating necessary charges in all the electron emitters in a first period, and the step of applying a voltage required to emit electrons to all the electron emitters to cause a plurality of electron emitters which correspond to pixels to emit light therefrom, for emitting light from the pixels, in a second period after the first period.

One electron emitter may be assigned to one pixel, or a plurality of electron emitters may be assigned to one pixel.

Usually, if pixels are made up of electron emitters, then a high voltage needs to be applied to the electron emitters to emit light from the pixels. Therefore, for emitting light from the pixels when the pixels are scanned, a high voltage needs to be applied to the pixels during a period (e.g., one frame) for displaying one image, resulting in the problem of increased electric power consumption. Circuits for selecting electron emitters and supplying pixel signals to the selected electron emitters need to be able to handle the high voltage.

According to the present invention, after charges have been accumulated in all the electron emitters, a voltage is applied to all the electron emitters, emitting light from the pixels which correspond to the electron emitters to be turned on.

Because the period (first period) for accumulating charges in electron emitters and the period (second period) for emitting electrons from electron emitters which correspond to the pixels to be turned on are separated from each other, the circuit for applying voltages (an accumulation voltage and an emission voltage) depending on luminance levels to the electron emitters can be driven at a low voltage.

Specific drive methods for driving the display apparatus according to the present invention will be described below.

According to a first drive method, one image is displayed in a period as one frame, the one frame including the first period and the second period, all the electron emitters are scanned, and accumulation voltages depending on the luminance levels of corresponding pixels are applied to the electron emitters which correspond to pixels to emit light therefrom in the first period, to accumulate charges in amounts depending on the luminance levels of corresponding pixels in the electron emitters which correspond to pixels to emit light therefrom in the first period, and a constant emission voltage is applied to all the electron emitters in the second period after the first period, to emit electrons in amounts depending on the luminance levels of corresponding pixels from the electron emitters which correspond to pixels to emit light therefrom in the second period, thereby emitting light from the pixels.

According to a second drive method, one image is displayed in a period as one frame, the one frame being divided into a plurality of periods having respective different luminance levels, each of the periods serving as one subfield, the one subfield including the first period and the second period, all the electron emitters are scanned, and a constant accumulation voltage is applied to the electron emitters to emit light therefrom in the first period, to accumulate a constant amount of charges in the electron emitters to emit light therefrom in the first period, and emission voltages depending on luminance levels assigned to the subfields are applied to all the electron emitters in the second period after the first period, to emit electrons in amounts depending on the luminance levels assigned to the subfields from the electron emitters which correspond to pixels to emit light therefrom in the second period, thereby emitting light from the pixels.

According to a third drive method, one image is displayed in a period as one frame, the one frame being divided into a plurality of periods having respective different luminance levels, each of the periods serving as one subfield, the one subfield including the first period and the second period, all the electron emitters are scanned, and accumulation voltages depending on luminance levels assigned to the subfields are applied to the electron emitters to emit light therefrom in the first period, to accumulate charges in amounts depending on the luminance levels assigned to the subfields in the electron emitters to emit light therefrom in the first period, and a constant emission voltage is applied to all the electron emitters in the second period after the first period, to emit electrons in amounts depending on the luminance levels assigned to the subfields from the electron emitters which correspond to pixels to emit light therefrom in the second period, thereby emitting light from the pixels.

According to a fourth drive method, one image is displayed in a period as one frame, the one frame being divided into a plurality of periods having the same luminance level, each of the periods serving as one linear subfield, the one linear subfield including the first period and the second period, all the electron emitters are scanned, and a constant accumulation voltage is applied to the electron emitters to emit light therefrom in the liner subfields in the first period, to accumulate a constant amount of charges in the electron emitters to emit light therefrom in the linear subfields in the first period, and a constant emission voltage is applied to all the electron emitters in the second period after the first period, to emit a constant amount of electrons from the electron emitters which correspond to pixels to emit light therefrom in the linear subfields in the second period, thereby emitting light from the pixels.

According to a fifth drive method, one image is displayed in a period as one frame, the one frame including the first period and the second period, a constant accumulation voltage is applied to all the electron emitters in the first period to accumulate a constant amount of charges in all the electron emitters in the first period, and all the electron emitters are scanned and emission voltages depending on the luminance levels of corresponding pixels are applied to the electron emitters which correspond to pixels to emit light therefrom in the second period after the first period, to emit electrons in amounts depending on the luminance levels of corresponding pixels from the electron emitters which correspond to pixels to emit light therefrom in the second period, thereby emitting light from the pixels.

According to a sixth drive method, one image is displayed in a period as one frame, the one frame being divided into a plurality of periods having respective different luminance levels, each of the periods serving as one subfield, the one subfield including the first period and the second period, accumulation voltages depending on luminance levels assigned to the subfields are applied to all the electron emitters to emit light therefrom in the first period, to accumulate charges in amounts depending on the luminance levels assigned to the subfields in all the electron emitters in the first period, and all the electron emitters are scanned and a constant emission voltage is applied to the electron emitters to emit light therefrom in the second period after the first period, to emit electrons in amounts depending on the luminance levels assigned to the subfields from the electron emitters which correspond to pixels to emit light therefrom in the second period, thereby emitting light from the pixels.

According to a seventh drive method, one image is displayed in a period as one frame, the one frame being divided into a plurality of periods having respective different luminance levels, each of the periods serving as one subfield, the one subfield including the first period and the second period, a constant accumulation voltage is applied to all the electron emitters in the first period, to accumulate a constant amount of charges in all the electron emitters in the first period, and all the electron emitters are scanned emission voltages depending on the luminance levels assigned to the subfields are applied to the electron emitters to emit light therefrom in the second period after the first period, to emit electrons in amounts depending on the luminance levels assigned to the subfields from the electron emitters which correspond to pixels to emit light therefrom in the second period, thereby emitting light from the pixels.

According to an eighth drive method, one image is displayed in a period as one frame, the one frame being divided into a plurality of periods having the same luminance level, each of the periods serving as one linear subfield, the one linear subfield including the first period and the second period, a constant accumulation voltage is applied to all the electron emitters in the first period, to accumulate a constant amount of charges in the electron emitters to emit light therefrom in the linear subfields in the first period, and all the electron emitters are scanned and a constant emission voltage is applied to the electron emitters to emit light therefrom in the linear subfields in the second period after the first period, to emit a constant amount of electrons from the electron emitters which correspond to pixels to emit light therefrom in the linear subfields in the second period, thereby emitting light from the pixels.

In the above drive methods, particularly, in the first, third, fourth, and sixth drive methods, a pulse signal having a constant pulse amplitude may be generated, and the pulse signal may be amplitude-modulated to generate the accumulation voltage in the first period. Alternatively, a pulse signal applicable to the electron emitters may be generated, the pulse signal having a voltage waveform including a positive-going edge or a negative-going edge which is continuously variable in level, and the pulse signal may be pulse-width-modulated to generate the accumulation voltage in the first period.

In the above drive methods, particularly, in the second, fifth, seventh, and eighth drive methods, a pulse signal having a constant pulse amplitude may be generated, and the pulse signal may be amplitude-modulated to generate the emission voltage in the second period. Alternatively, a pulse signal applicable to the electron emitters may be generated, the pulse signal having a voltage waveform including a positive-going edge or a negative-going edge which is continuously variable in level, and the pulse signal may be pulse-width-modulated to generate the emission voltage in the second period.

If the electron emitters that are used have such characteristics that the electron emitters change to a state (first state) in which electrons are accumulated when an electric field is applied in one direction to the electron emitters, and change from the first state to a state (second state) in which electrons are emitted when an electric field is applied in another direction to the electron emitters, then it is preferable to apply a voltage between a voltage for changing the electron emitters to the first state and a voltage for changing the electron emitters to a state immediately prior to the second state, to electron emitters which are unselected. With such an arrangement, unselected pixels are not affected by signals supplied to selected pixels, and a memory effect can be achieved at each pixel for higher luminance and higher contrast.

According to a ninth drive method, when the electron emitters are selected and unselected through corresponding select lines, the select lines of electron emitters which are unselected may be placed into a high impedance state. In this case, the electron emitters which are not selected in the first row, for example, are not affected by the pixel signal that is supplied to the selected electron emitters in the second row. Furthermore, the power consumption by the unselected rows can be reduced. Specifically, the power consumption by the unselected rows in the ninth drive method can be reduced to about ¼ of the power consumption by the unselected rows in the first drive method.

A display apparatus according to the present invention has a plurality of electron emitters, select lines for selecting and unselecting the electron emitters, signal lines for supplying ON and OFF signals to electron emitters which are selected, and a drive circuit for driving the electron emitters in a selection period, a reset period, and a non-selection period allocated to one frame which is a period for displaying one image, wherein the drive circuit applies a voltage sufficient to cause the electron emitters to emit light, to electron emitters to emit light therefrom which are selected in the selection period, applies a reference voltage serving as a central voltage across which a voltage varies in the non-selection period subsequent to the reset period, to electron emitters which are selected in the reset period, and places the select lines of electron emitters which are unselected in the non-selection period into a high impedance state. With this arrangement, the power consumption can be reduced.

The non-selection period subsequent to the reset period has a time duration which may be set depending on the gradation level of a next frame. For example, the drive circuit may select at least a row of electron emitters, and may set the time duration of the non-selection period after the reset period depending on the gradation level of the corresponding row in a next frame.

The non-selection period has a first non-selection period assigned prior to the reset period and a second non-selection period assigned subsequent to the reset period, and the second non-selection period has a time duration which may be set depending on the gradation level of a next frame.

An electron emitter according to the present invention is characterized by the step of accumulating charges required for electron emission in a first period, and the step of applying a voltage required for electron emission to emit electrons in an amount depending on the accumulated charges in a second period after the first period.

Because the period (first period) for accumulating charges in electron emitters and the period (second period) for emitting electrons from electron emitters which correspond to the pixels to be turned on are separated from each other, a circuit system for driving the electron emitters can be driven at a low voltage.

According to the present invention, an apparatus for driving a plurality of electron emitters by selecting at least one electron emitter from the electron emitters and emitting electrons from the selected electron emitter, is characterized in that if the electron emitters have such characteristics that the electron emitters change to a state (first state) in which electrons are accumulated when an electric field is applied in one direction to the electron emitters, and change from the first state to a state (second state) in which electrons are emitted when an electric field is applied in another direction to the electron emitters, then a voltage between a voltage for changing the electron emitters to the first state and a voltage for changing the electron emitters to a state immediately prior to the second state, is applied to electron emitters which are unselected among the plurality of electron emitters.

Even if a plurality of electron emitters are arrayed in a row or a matrix, and the electron emitters in a column are connected in common and a row of electron emitters is selected, the emission of electrons from unselected electron emitters is not affected by signals supplied to selected electron emitters, and a memory effect can be achieved at each electron emitter. The electron emitters can easily be applied to various display apparatus and illumination units (surface light sources and liquid crystal backlight units). If the electron emitters are applied to a display apparatus, for example, the display apparatus can have higher luminance and higher contrast.

According to the present invention, an electron emission apparatus having a plurality of electron emitters is characterized in that charges required for electron emission are accumulated in all the electron emitters in a first period, and a voltage required for electron emission is applied to all the electron emitters to emit electrons in an amount depending on the charges accumulated in the electron emitters in a second period after the first period.

In the above electron emission apparatus, accumulation voltages depending on charges to be accumulated in the electron emitters may be applied in the first period, and a constant emission voltage may be applied to all the electron emitters in the second period after the first period.

The electron emission apparatus may have a pulse generating circuit for generating a pulse signal having a constant pulse amplitude, and an amplitude modulating circuit for amplitude-modulating the pulse signal to generate the accumulation voltage in the first period.

Alternatively, the electron emission apparatus may have a pulse generating circuit for generating a pulse signal applicable to the electron emitters, the pulse signal having a voltage waveform including a positive-going edge or a negative-going edge which is continuously variable in level, and a pulse width modulating circuit for pulse-width-modulating the pulse signal to generate the accumulation voltage in the first period.

According to the present invention, an electron emission apparatus is characterized in that a constant accumulation voltage is applied to all the electron emitters to accumulate a constant amount of charges in the electron emitters in a first period, and emission voltages depending on amounts of electrons to be emitted are applied to the electron emitters to cause the electron emitters to emit electrons in the amounts depending on the emission voltages in a second period after the first period.

The above electron emission apparatus may have a pulse generating circuit for generating a pulse signal having a constant pulse amplitude, and an amplitude modulating circuit for amplitude-modulating the pulse signal to generate the emission voltage in the second period.

Alternatively, the electron emission apparatus may have a pulse generating circuit for generating a pulse signal applicable to the electron emitters, the pulse signal having a voltage waveform including a positive-going edge or a negative-going edge which is continuously variable in level, and a pulse width modulating circuit for pulse-width-modulating the pulse signal to generate the emission voltage in the second period.

Because the period (first period) for accumulating charges in electron emitters and the period (second period) for emitting electrons from electron emitters which correspond to the pixels to be turned on are separated from each other in the electron emission apparatus according to the present invention, a circuit system for applying voltages (an accumulation voltage and an emission voltage) to the electron emitters can be driven at a low voltage.

In the electron emission apparatus, if the electron emitters have such characteristics that the electron emitters change to a state (first state) in which electrons are accumulated when an electric field is applied in one direction to the electron emitters, and change from the first state to a state (second state) in which electrons are emitted when an electric field is applied in another direction to the electron emitters, then the electron emission apparatus may have a drive circuit for applying a voltage between a voltage for changing the electron emitters to the first state and a voltage for changing the electron emitters to a state immediately prior to the second state, to electron emitters which are unselected.

Even if a plurality of electron emitters are arrayed in a row or a matrix, and the electron emitters in a column are connected in common and a row of electron emitters is selected, the emission of electrons from unselected electron emitters is not affected by signals supplied to selected electron emitters, and a memory effect can be achieved at each electron emitter. The electron emission apparatus according to the present invention can easily be applied to various display apparatus and illumination units (surface light sources and liquid crystal backlight units). If the electron emitters are applied to a display apparatus, for example, the display apparatus can have higher luminance and higher contrast.

A method of driving an electron emitter according to the present invention is characterized by the step of accumulating charges required for electron emission in a first period, and the step of applying a voltage required for electron emission to emit electrons in an amount depending on the accumulated charges in a second period after the first period.

According to the present invention, a method of driving a plurality of electron emitters by selecting at least one electron emitter from the electron emitters and emitting electrons from the selected electron emitter, is characterized in that if the electron emitters have such characteristics that the electron emitters change to a state (first state) in which electrons are accumulated when an electric field is applied in one direction to the electron emitters, and change from the first state to a state (second state) in which electrons are emitted when an electric field is applied in another direction to the electron emitters, then a voltage between a voltage for changing the electron emitters to the first state and a voltage for changing the electron emitters to a state immediately prior to the second state, may be applied to electron emitters which are unselected among the plurality of electron emitters.

A method of driving an electron emission apparatus having a plurality of electron emitters according to the present invention is characterized in that charges required for electron emission are accumulated in all the electron emitters in a first period, and a voltage required for electron emission is applied to all the electron emitters to emit electrons in an amount depending on the charges accumulated in the electron emitters in a second period after the first period.

Accumulation voltages depending on charges to be accumulated in the electron emitters may be applied in the first period, and a constant emission voltage may be applied to all the electron emitters in the second period after the first period.

In this case, a pulse signal having a constant pulse amplitude may be amplitude-modulated to generate the accumulation voltage in the first period. Alternatively, a pulse signal applicable to the electron emitters may be generated, the pulse signal having a voltage waveform including a positive-going edge or a negative-going edge which is continuously variable in level, and the pulse signal may be pulse-width-modulated to generate the accumulated voltage in the first period.

A method of driving an electron emission apparatus having a plurality of electron emitters according to the present invention is characterized by the step of applying a constant accumulation voltage to all the electron emitters to accumulate a constant amount of charges in the electron emitters in a first period, and the step of applying emission voltages depending on amounts of electrons to be emitted to the electron emitters to cause the electron emitters to emit electrons in the amounts depending on the emission voltages in a second period after the first period.

In the above method, a pulse signal having a constant pulse amplitude may be amplitude-modulated to generate the emission voltage in the second period. Alternatively, a pulse signal applicable to the electron emitters may be generated, the pulse signal having a voltage waveform including a positive-going edge or a negative-going edge which is continuously variable in level, and the pulse signal may be pulse-width-modulated to generate the emission voltage in the second period.

In the above methods of driving an electron emission apparatus, if the electron emitters have such characteristics that the electron emitters change to a state (first state) in which electrons are accumulated when an electric field is applied in one direction to the electron emitters, and change from the first state to a state (second state) in which electrons are emitted when an electric field is applied in another direction to the electron emitters, then a voltage between a voltage for changing the electron emitters to the first state and a voltage for changing the electron emitters to a state immediately prior to the second state, may be applied to electron emitters which are unselected.

In an apparatus for driving an electron emitter, an electron emission apparatus, and a method of driving an electron emission apparatus according to the present invention, if at least one of a plurality of electron emitters is selected and electrons are emitted from the selected electron emitter, when the electron emitters are selected and unselected through corresponding select lines, select lines of electron emitters which are unselected are placed into a high impedance state.

In an apparatus for driving an electron emitter, an electron emission apparatus, and a method of driving an electron emission apparatus according to the present invention, the apparatus has a plurality of electron emitters, select lines for selecting and unselecting the electron emitters, and signal lines for supplying ON and OFF signals to electron emitters which are selected, the apparatus being characterized in that the electron emitters are driven in a selection period, a reset period, and a non-selection period allocated to one frame which is a period for displaying one image, a voltage sufficient to cause the electron emitters to emit light is applied to electron emitters to emit light therefrom which are selected in the selection period, a reference voltage serving as a central voltage across which a voltage varies in the non-selection period subsequent to the reset period is applied to electron emitters which are selected in the reset period, and the select lines of electron emitters which are unselected in the non-selection period is placed into a high impedance state.

The non-selection period subsequent to the reset period has a time duration which may be set depending on the gradation level of a next frame. For example, at least a row of electron emitters may be selected, and the time duration of the non-selection period after the reset period may be set depending on the gradation level of the corresponding row in a next frame.

The non-selection period may have a first non-selection period assigned prior to the reset period and a second non-selection period assigned subsequent to the reset period, and the second non-selection period has a time duration which may be set depending on the gradation level of a next frame. For example, at least a row of electron emitters may be selected, and the time duration of the second non-selection period may be set depending on the gradation level of the corresponding row in a next frame.

In the apparatus for driving the electron emitter, the electron emission apparatus, and the method of driving an electron emission apparatus according to the present invention, the power consumption can effectively be reduced.

With the display apparatus and the method of driving the display apparatus according to the present invention, as described above, the display apparatus can have low power consumption and can be driven at a low voltage.

Furthermore, unselected pixels are not affected by signals supplied to selected pixels, and a memory effect can be achieved at each pixel for higher luminance and higher contrast.

In the electron emitter, the apparatus for driving the electron emitter, and the method of driving the electron emitter according to the present invention, a circuit system for applying voltages (an accumulation voltage and an emission voltage) to the electron emitters can be driven at a low voltage, and can have reduced power consumption.

In the electron emission apparatus and the method of driving same according to the present invention, a circuit for voltages (an accumulation voltage and an emission voltage) to the electron emitters can be driven at a low voltage, and can have reduced power consumption.

The above and other objects, features, and advantages will become apparent from the following description of the preferred embodiments when taken in conjunction with the accompanying drawings.

BRIEF DESCRIPTION OF THE DRAWINGS

FIG. 5 is a diagram showing the voltage vs. charge quantity characteristics (voltage vs. polarized quantity characteristics) of an electron emitter used in the display apparatus according to the embodiment of the present invention;

FIG. 6 is a fragmentary cross-sectional view of an electron emitter used in the display apparatus according to the embodiment of the present invention;

FIG. 28 is a diagram showing the relationship of applied voltages according to the first drive method;

FIG. 31 is a diagram showing the relationship of applied voltages according to the second drive method;

FIG. 33 is a diagram showing the relationship of applied voltages according to the third drive method;

FIG. 36 is a diagram showing the relationship of applied voltages according to the fourth drive method;

FIG. 39 is a diagram showing the relationship of applied voltages according to the fifth drive method;

FIG. 41 is a diagram showing the relationship of applied voltages according to the sixth drive method;

FIG. 43 is a diagram showing the relationship of applied voltages according to the seventh drive method;

FIG. 45 is a diagram showing the relationship of applied voltages according to the eighth drive method;

FIG. 48 is a diagram showing the relationship of applied voltages according to the ninth drive method;

FIG. 53 is a diagram showing the relationship of applied voltages according to the tenth drive method;

FIG. 54 is a diagram showing the relationship of applied voltages according to the eleventh drive method;

FIG. 55 is a block diagram of a display apparatus which employs a twelfth drive method;

FIG. 57A is a diagram showing gradation levels in respective rows in an (n−2)th frame shown in FIG. 56;

FIG. 57B is a diagram showing gradation levels in respective rows in an (n−1)th frame shown in FIG. 56;

FIG. 57C is a diagram showing gradation levels in respective rows in an nth frame shown in FIG. 56; and FIG. 58 is a diagram showing the relationship of applied voltages according to the twelfth drive method.

DESCRIPTION OF THE PREFERRED EMBODIMENTS

Display apparatus, an electron emitter, a method of driving an electron emitter, an apparatus for driving an electron emitter, an electron emission apparatus, and a method of driving an electron emission apparatus according to embodiments of the present invention will be described below with reference to FIGS. 1 through 58.

Figure 1:
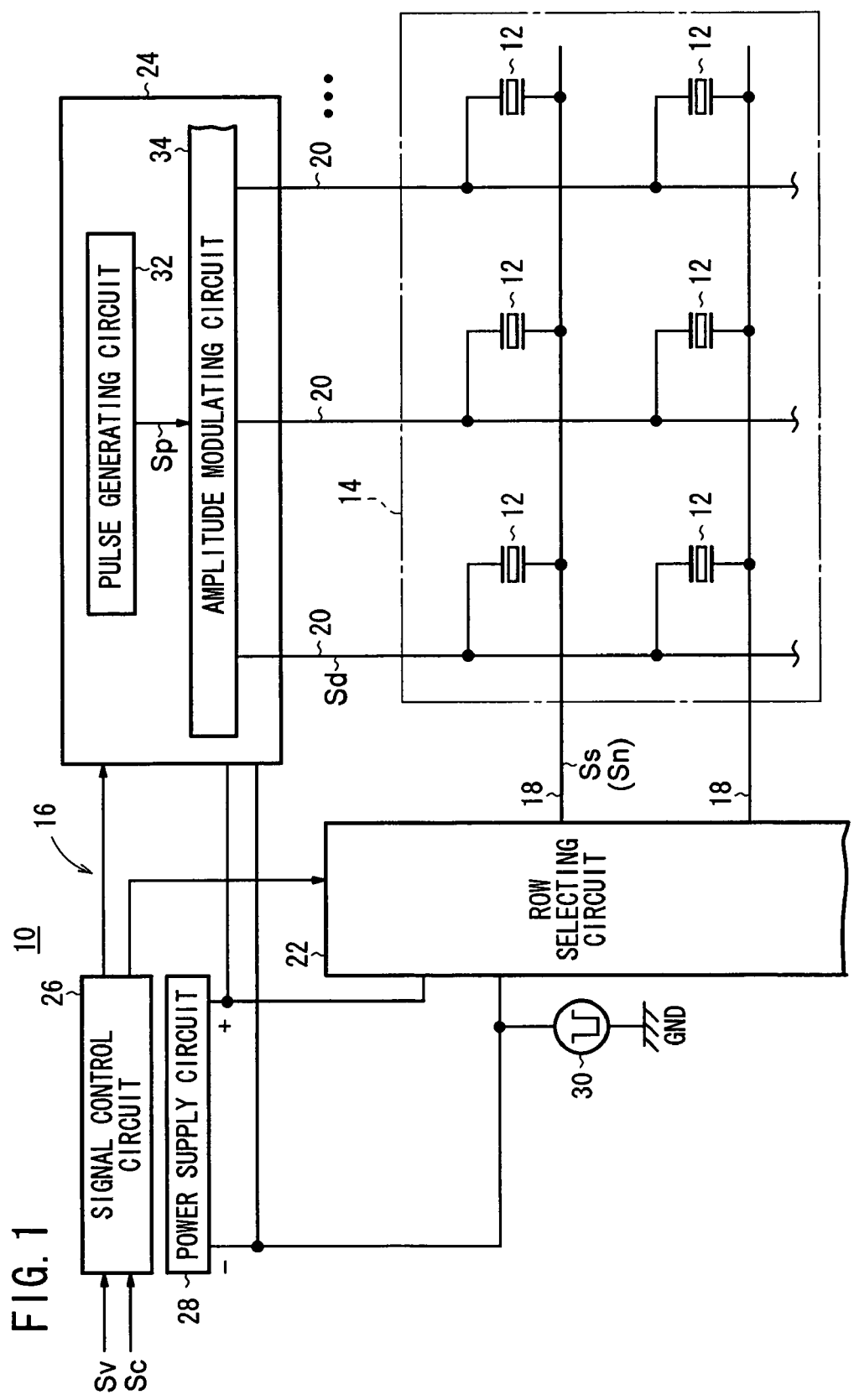
FIG. 1 is a block diagram of a display area and a drive circuit of a display apparatus according to an embodiment of the present invention.

As shown in FIG. 1, a display apparatus 10 according to an embodiment of the present invention has a display unit 14 comprising a matrix or staggered pattern of electron emitters 10 corresponding to respective pixels, and a drive circuit 16 for driving the display unit 14. One electron emitter 12 may be assigned to each pixel, or a plurality of electron emitters 12 may be assigned to each pixel. In the present embodiment, it is assumed for the sake of brevity that one electron emitter 12 is assigned to each pixel.

The drive circuit 16 has a plurality of row select lines 18 for selecting rows in the display unit 14 and a plurality of signal lines 20 for supplying pixel signals Sd to the display unit 14.

The drive circuit 16 also has a row selecting circuit 22 for supplying a selection signal Ss selectively to the row select lines 18 to successively select a row of electron emitters 12, a signal supplying circuit 24 for outputting parallel pixel signals Sd to the signal lines 20 to supply the pixel signals Sd to a row (selected row) selected by the row selecting circuit 22, and a signal control circuit 26 for controlling the row selecting circuit 22 and the signal supplying circuit 24 based on a video signal Sv and a synchronizing signal Sc that are input to the signal control circuit 26.

A power supply circuit 28 (which supplies 50 V and 0 V, for example) is connected to the row selecting circuit 22 and the signal supplying circuit 24. A pulse power supply 30 is connected between a negative line between the row selecting circuit 22 and the power supply circuit 28, and GND (ground). The pulse power supply 30 outputs a pulsed voltage waveform having a reference voltage (e.g., 0 V) during a charge accumulation period Td, to be described later, and a certain voltage (e.g., −400 V) during a light emission period Th.

During the charge accumulation period Td, the row selecting circuit 22 outputs the selection signal Ss to the selected row and outputs a non-selection signal Sn to the unselected rows. During the light emission period Th, the row selecting circuit 22 outputs a constant voltage (e.g., −350 V) which is the sum of a power supply voltage (e.g., 50 V) from the power supply circuit 28 and a voltage (e.g., −400 V) from the pulse power supply 30.

The signal supplying circuit 24 has a pulse generating circuit 32 and an amplitude modulating circuit 34. The pulse generating circuit 32 generates a pulse signal Sp having a constant pulse period and a constant amplitude (e.g., 50 V) during the charge accumulation period Td, and outputs a reference voltage (e.g., 0 V) during the light emission period Th.

During the charge accumulation period Td, the amplitude modulating circuit 34 amplitude-modulates the pulse signal Sp from the pulse generating circuit 32 depending on the luminance levels of the pixels of the selected row, and outputs the amplitude-modulated pulse signal Sp as the pixel signal for the pixels Sd of the selected row. During the light emission period Th, the amplitude modulating circuit 34 outputs the reference voltage from the pulse generating circuit 32 as it is. The timing control in the amplitude modulating circuit 34 and the supply of the luminance levels of the selected pixels to the amplitude modulating circuit 34 are performed by the signal control circuit 26.

Figure 2:
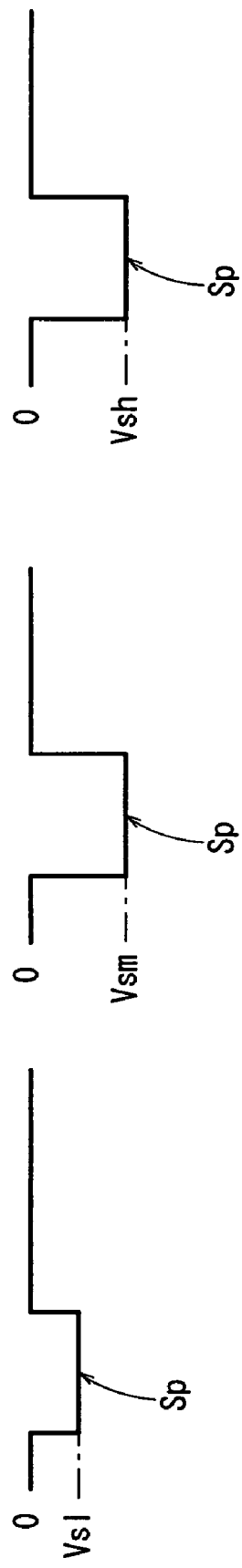
FIGS. 2A through 2C are waveform diagrams illustrative of the amplitude modulation of pulse signals by an amplitude modulating circuit.

For example, as indicated by three examples shown in FIGS. 2A through 2C, if the luminance level is low, then the amplitude of the pulse signal Sp is set to a low level Vsl (see FIG. 2A), if the luminance level is medium, then the amplitude of the pulse signal Sp is set to a medium level Vsm (see FIG. 2B), and if the luminance level is high, then the amplitude of the pulse signal Sp is set to a high level Vsh (see FIG. 2C). Though the amplitude of the pulse signal Sp is modulated into three levels in the above examples, if the amplitude modulation is applied to the display apparatus 10, then the pulse signal Sp is amplitude-modulated to 128 levels or 256 levels depending on the luminance levels of the pixels.

A modification of the signal supplying circuit 24 will be described below with reference to FIGS. 3 through 4C.

Figure 3:
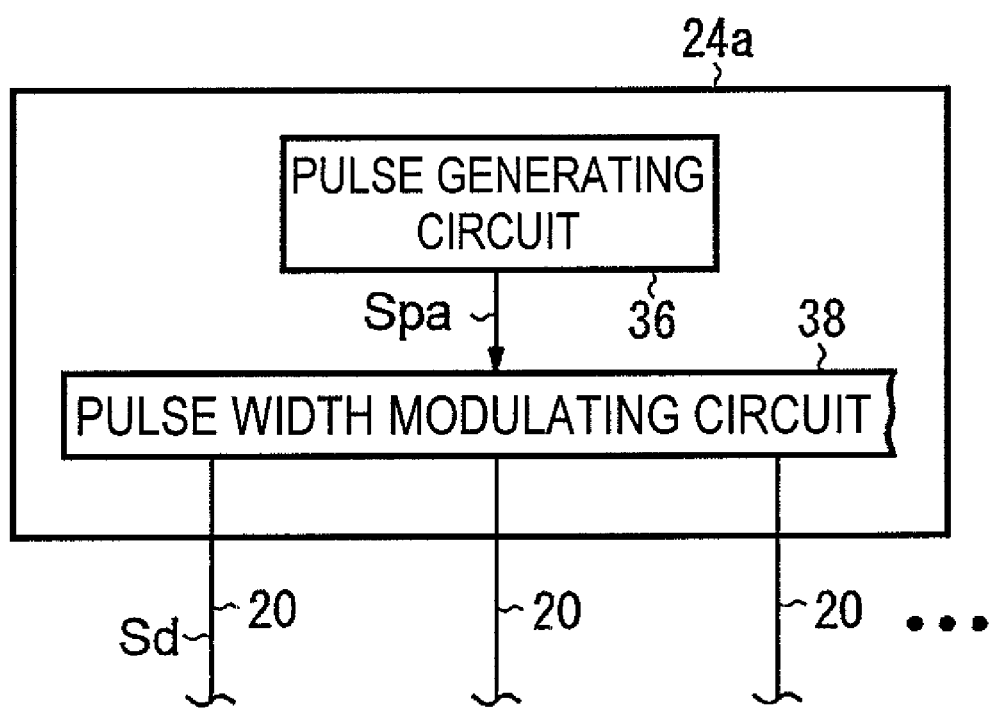
FIG. 3 is a block diagram of a signal supply circuit according to a modification.

As shown in FIG. 3, a modified signal supplying circuit 24a has a pulse generating circuit 36 and a pulse width modulating circuit 38. The pulse generating circuit 36 generates and outputs a pulse signal Spa (indicated by the broken lines in FIGS. 4A through 4C) where the positive-going edge of a voltage waveform (indicated by the solid lines in FIGS. 4A through 4C) applied to the electron emitter 12 is continuously changed in level, during the charge accumulation period Td. The pulse generating circuit 36 outputs a reference voltage during the light emission period Th. During the charge accumulation period Td, the pulse width modulating circuit 38 modulates the pulse width Wp (see FIGS. 4A through 4C) of the pulse signal Spa from the pulse generating circuit 36 depending on the luminance levels of the pixels of the selected row, and outputs the pulse signal Spa with the modulated pulse width Wp as the pixel signal Sd for the pixels of the selected row. During the light emission period Th, the pulse width modulating circuit 38 outputs the reference voltage from the pulse generating circuit 36 as it is. The timing control in the pulse width modulating circuit 38 and the supply of the luminance levels of the selected pixels to the pulse with modulating circuit 38 are also performed by the signal control circuit 26.

Figure 4A:
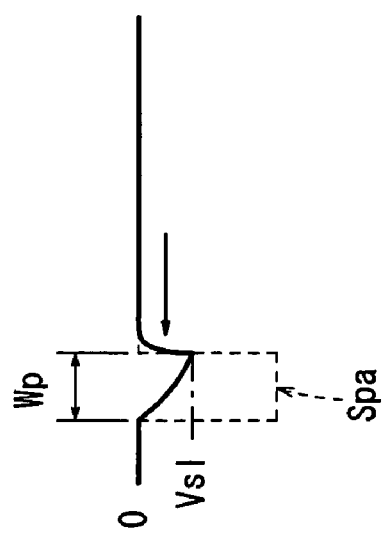
FIGS. 4A through 4C are waveform diagrams illustrative of the pulse width modulation of pulse signals by a pulse width modulating circuit.
Figure 4B:
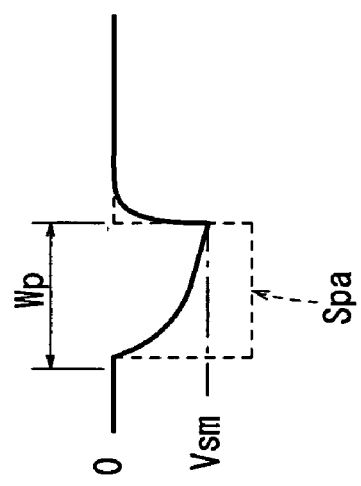
Figure 4C:
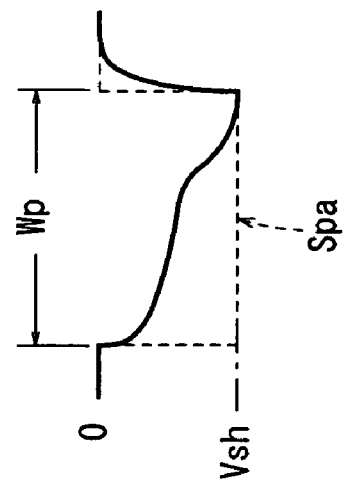

For example, as indicated by three examples shown in FIGS. 4A through 4C, if the luminance level is low, then the pulse width p of the pulse signal Sp is set to a short width, setting the substantial amplitude to a low level Vsl (see FIG. 4A), if the luminance level is medium, then the pulse width Wp of the pulse signal Sp is set to a medium width, setting the substantial amplitude to a medium level Vsm (see FIG. 4B), and if the luminance level is high, then the pulse width Wp of the pulse signal Sp is set to a long width, setting the substantial amplitude to a high level Vsh (see FIG. 4C). Though the pulse width Wp of the pulse signal Sp is modulated into three levels in the above examples, if the amplitude modulation is applied to the display apparatus 10, then the pulse signal Sp is pulse-width-modulated to 128 levels or 256 levels depending on the luminance levels of the pixels.

Preferable characteristics of the electron emitter 12 will be described below. The electron emitter 12 has an electron emission region (a region from which electrons are emitted) characterized by an asymmetric hysteresis curve based on the reference voltage=0 (V) in vacuum, as indicated by the voltage vs. charge quantity characteristics shown in FIG. 5.

The voltage vs. charge quantity characteristics will be described below. At a point p1 (initial state) where the reference voltage is applied, almost no electrons are stored in the electron emission region. Thereafter, when a negative voltage is applied, the amount of positive charges in the electron emission region increases, storing electrons. When the level of the negative voltage increases in a negative direction, electrons are progressively stored in the electron emission region until the amount of positive charges and the amount of electrons are held in equilibrium with each other at a point p2 of the negative voltage. As the level of the negative voltage further increases in the negative direction, the stored amount of electrons increases, making the amount of negative charges greater than the amount of positive charges. The accumulation of electrons is saturated at a point P3.

As the level of the negative voltage further increases, and a positive voltage is applied in excess of the reference voltage, electrons start being emitted at a point p4. When the positive voltage increases in a positive direction, the amount of emitted electrons increases until the amount of positive charges and the amount of electrons are held in equilibrium with each other at a point p5. At a point p6, almost all the stored electrons are emitted, bringing the difference between the amount of positive charges and the amount of negative charges into substantial conformity with a value in the initial state.

The voltage vs. charge quantity characteristics have the following features:

(1) If the negative voltage at the point p2 where the amount of positive charges and the amount of electrons are held in equilibrium with each other is represented by V1 and the positive voltage at the point p5 by V2, then these voltages satisfy the following relationship:

$$|V1|<|V2|$$

(2) More specifically, the relationship is expressed as $$1.5 \times |V1|<|V2|$$

(3) If the rate of change of the amount of positive charges and the amount of electrons at the point p2 is represented by $\Delta Q1/\Delta V1$ and the rate of change of the amount of positive charges and the amount of electrons at the point p5 by $\Delta Q2/\Delta V2$, then these rates satisfy the following relationship:

$$(\Delta Q1/\Delta V1)>(\Delta Q2/\Delta V2)$$

(4) If the voltage at which the accumulation of electrons is saturated is represented by V3 and the voltage at which electrons start being emitted by V4, then these voltages satisfy the following relationship:

$$1 \leq |V4|/|V3| \leq 1.5$$

An example of electron emitter 12 which satisfy the above characteristics will be described below with reference to FIGS. 6 through 26.

As shown in FIG. 6, the electron emitter 12 comprises a plate-like emitter (a substance serving as an emitter) 40 made of a dielectric material, an upper electrode 42 formed on an upper surface, for example, of the emitter 40 and connected to a signal line 20, and a lower electrode 44 formed on a lower surface, for example, of the emitter .40 and connected to a row select line 18. In this embodiment, the signal line 20 is connected to the upper electrode 42, and the row select line 18 is connected to the lower electrode 44. Conversely, the row select line 18 may be connected to the upper electrode 42, and the signal line 20 may be connected to the lower electrode 44.

The upper electrode 42 has a plurality of through regions 46 where the emitter 40 is exposed. The emitter 40 has surface irregularities 48 due to the grain boundary of the dielectric material. The through regions 46 of the upper electrode 42 are formed in areas corresponding to concavities 50 due to the grain boundary of the dielectric material. In the embodiment shown in FIG. 6, one through region 46 is formed in association with one recess 50. However, one through region 46 may be formed in association with a plurality of concavities 50. The particle diameter of the dielectric material of the emitter 40 should preferably be in the range from 0.1 µm to 10 µm, and more preferably be in the range from 2 µm to 7 µm. In the embodiment shown in FIG. 6, the particle diameter of the dielectric material is of 3 µm.

Figure 7:
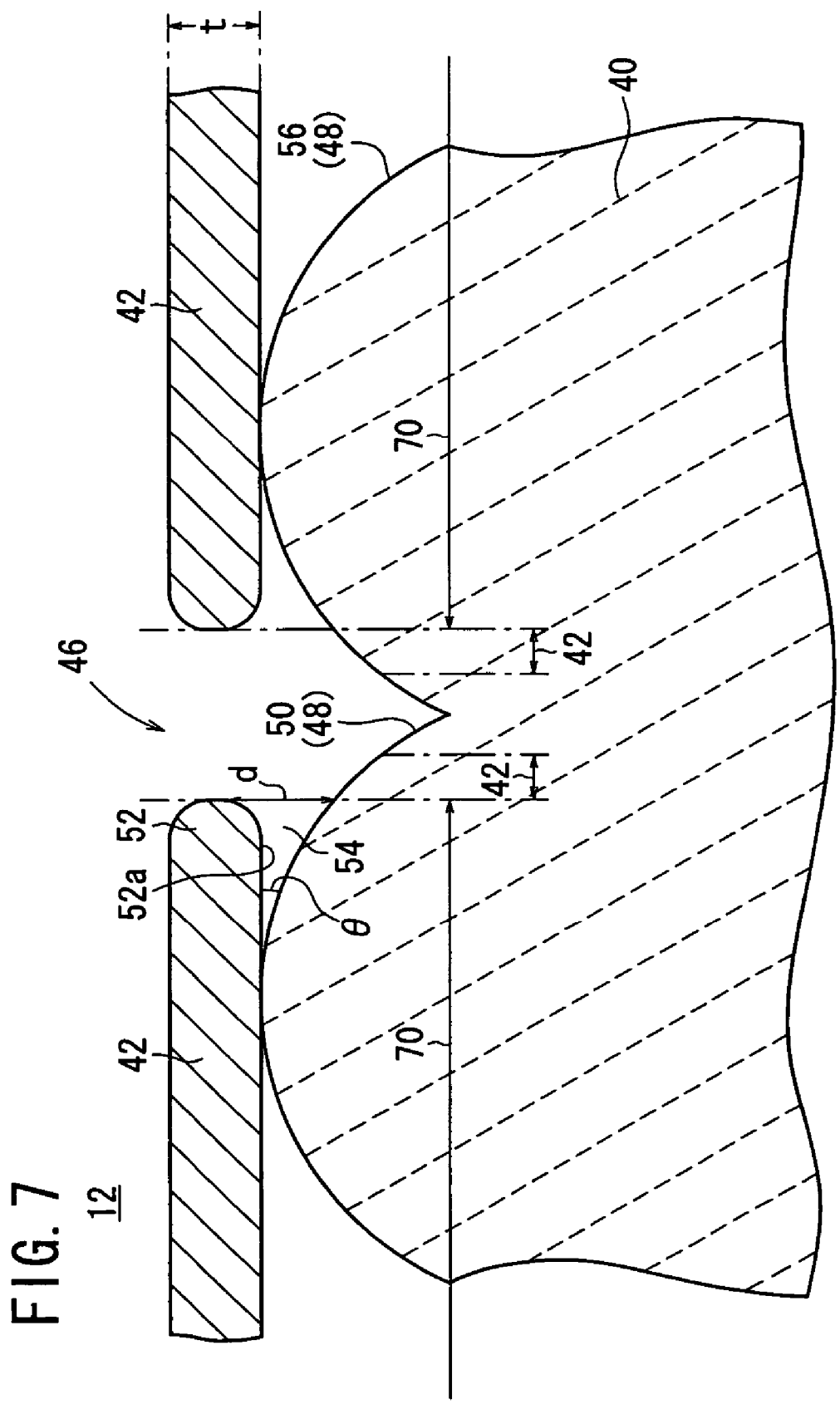
FIG. 7 is an enlarged fragmentary cross-sectional view of the electron emitter.

In this embodiment, as shown in FIG. 7, each of the through regions 46 of the upper electrode 42 has a peripheral portion 52 having a surface 52a facing the emitter 40, the surface 52a being spaced from the emitter 40. Specifically, a gap 54 is formed between the surface 52a, facing the emitter 40, of the peripheral portion 52 of the through region 46 and the emitter 40, and the peripheral portion 52 of the through region 46 of the upper electrode 42 is formed as an overhanging portion (flange). In the description which follows, "the peripheral portion 52 of the through region 46 of the upper electrode 42" is referred to as "the overhanging portion 52 of the upper electrode 42". In FIGS. 6, 7, 9, 10, 11A through 11C, 12A through 12C, 19 through 21, and 26, convexities 56 of the surface irregularities 48 of the grain boundary of the dielectric material are shown as having a semicircular cross-sectional shape. However, the convexities 56 are not limited to the semicircular cross-sectional shape.

With the electron emitter 12, the upper electrode 42 has a thickness t in the range of 0.01 µm≤t≤10 µm, and the maximum angle θ between the upper surface of the emitter 40, i.e., the surface of the convexity 56 (which is also the inner wall surface of the concavity 50) of the grain boundary of the dielectric material, and the lower surface 56a of the overhanging portion 52 of the upper electrode 42 is in the range of 1°≤θ≤60°. The maximum distance d in the vertical direction between the surface of the convexity 56 (the inner wall surface of the concavity 50) of the grain boundary of the dielectric material and the lower surface 56a of the overhanging portion 52 of the upper electrode 42 is in the range of 0 µm<d≤10 µm.

Figure 8:
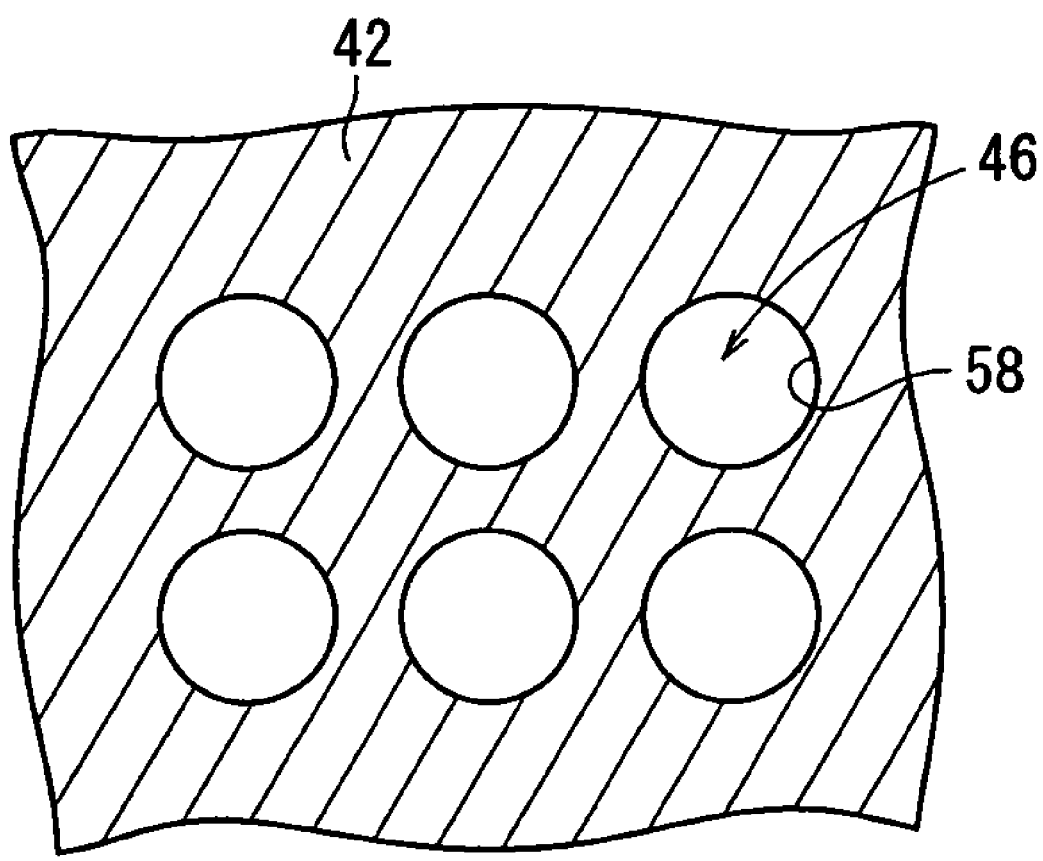
FIG. 8 is a plan view showing an example of the shape of through regions defined in an upper electrode.

In the electron emitter 12, the shape of the through region 46, particularly the shape as seen from above, as shown in FIG. 8, is the shape of a hole 58, which may be a circular shape, an elliptical shape, a track shape, a shape including a curve, or a polygonal shape such as a quadrangular shape or a triangular shape. In FIG. 8, the shape of the hole 58 is a circular shape.

The hole 58 has an average diameter ranging from 0.1 µm to 10 µm. The average diameter represents the average of the lengths of a plurality of different line segments passing through the center of the hole 58.

Materials of the various components will be described below. The dielectric material which the emitter 40 is made of may be a dielectric material having a relatively high dielectric constant, e.g., a dielectric constant of 1000 or higher. Dielectric materials of such a nature may be ceramics including barium titanate, lead zirconate, lead magnesium niobate, lead nickel niobate, lead zinc niobate, lead manganese niobate, lead magnesium tantalate, lead antimony tinate, lead titanate, lead magnesium tungstenate, lead cobalt niobate, etc. or a combination of any of these materials, a material which chiefly contains 50 weight % or more of any of these materials, or such ceramics to which there is added an oxide such as lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger specific dielectric constant at room temperature if the molar ratio of PMN is increased.

Particularly, a dielectric material where n=0.85-1.0 and m=1.0-n is preferable because its specific dielectric constant is 3000 or higher. For example, a dielectric material where n=0.91 and m=0.09 has a specific dielectric constant of 15000 at room temperature, and a dielectric material where n=0.95 and m=0.05 has a specific dielectric constant of 20000 at room temperature.

For increasing the specific dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ=0.375:0.375:0.25 has a specific dielectric constant of 5500; and a dielectric material where PMN:PT:PZ=0.5:0.375:0.125 has a specific dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

The emitter 40 may be in the form of a piezoelectric/electrostrictive layer or an anti-ferroelectric layer. If the emitter 40 comprises a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony tinate, lead titanate, barium titanate, lead magnesium tungstenate, lead cobalt niobate, or the like, or a combination of any of these materials.

The emitter 40 may be made of chief components including 50 wt % or more of any of the above compounds. Of the above ceramics, the ceramics including lead zirconate is mostly frequently used as a constituent of the piezoelectric/electrostrictive layer of the emitter 40.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics. Alternatively, ceramics produced by adding $SiO_2$, $CeO_2$, $Pb_5Ge_3O_{11}$, or a combination of any of these compounds to the above ceramics may be used. Specifically, a material produced by adding 0.2 wt % of $SiO_2$, 0.1 wt % of $CeO_2$, or 1 to 2 wt % of $Pb_5Ge_3O_{11}$ to a PT-PZ-PMN piezoelectric material is preferable.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter 40 is in the form of an anti-ferroelectric layer, then the anti-ferroelectric layer may be made of lead zirconate as a chief component, lead zirconate and lead tin as chief components, lead zirconate with lanthanum oxide added thereto, or lead zirconate and lead tin as components with lead zirconate and lead niobate added thereto.

The anti-ferroelectric layer may be porous. If the anti-ferroelectric layer is porous, then it should preferably have a porosity of 30% or less.

If the emitter 40 is made of strontium tantalate bismuthate ($SrBi_2Ta_2O_9$), then its polarization reversal fatigue is small. Materials whose polarization reversal fatigue is small are laminar ferroelectric compounds and expressed by the general formula of $(BiO_2)^{2+} (A_{m-1}B_mO_{3m+1})^{2-}$. Ions of the metal A are $Ca^{2+}$, $Sr^{2+}$, $Ba^{2+}$, $Pb^{2+}$, $Bi^{3+}$, $La^{3+}$, etc., and ions of the metal B are $Ti^{4+}$, $Ta^{5+}$, $Nb^{5+}$, etc.

The baking temperature can be lowered by adding glass such as lead borosilicate glass or the like or other compounds of low melting point (e.g., bismuth oxide or the like) to the piezoelectric/electrostrictive/anti-ferroelectric ceramics.

If the emitter 40 is made of piezoelectric/electrostrictive/anti-ferroelectric ceramics, then it may be a sheet-like molded body, a sheet-like laminated body, or either one of such bodies stacked or bonded to another support substrate.

If the emitter 40 is made of a non-lead-based material, then it may be a material having a high melting point or a high evaporation temperature so as to be less liable to be damaged by the impingement of electrons or ions.

The emitter 12 may be made by any of various thick-film forming processes including screen printing, dipping, coating, electrophoresis, aerosol deposition, etc., or any of various thin-film forming processes including an ion beam process, sputtering, vacuum evaporation, ion plating, chemical vapor deposition (CVD), plating, etc.

The upper electrode 42 is made of an organic metal paste which can produce a thin film after being baked. For example, a platinum resinate paste or the like, should preferably be used. An oxide electrode for suppressing a polarization reversal fatigue, which is made of ruthenium oxide ($RuO_2$), iridium oxide ($IrO_2$), strontium ruthenate ($SrRuO_3$), $La_{1-x}Sr_xCoO_3$ (e.g., x=0.3 or 0.5), $La_{1-x}Ca_xMnO_3$, (e.g., x=0.2), $La_{1-x}Ca_xMn_{1-y}Co_yO_3$ (e.g., x=0.2, y=0.05), or a mixture of any one of these compounds and a platinum resinate paste, for example, is preferable.

Graphite formed in the shape of scales may also preferably be used as the upper electrode 42. In this case, the surface of the emitter 40 is not fully covered with scales of graphite, but the emitter 40 has an exposed portion serving as an electron emission region.

The upper electrode 42 may be made of any of the above materials by any of thick-film forming processes including screen printing, spray coating, coating, dipping, electrophoresis, etc., or any of various thin-film forming processes including sputtering, an ion beam process, vacuum evaporation, ion plating, chemical vapor deposition (CVD), plating, etc. Preferably, the upper electrode 42 is made by any of the above thick-film forming processes.

The lower electrode 44 is made of platinum, molybdenum, tungsten, or the like. Alternatively, the lower electrode 44 is made of an electric conductor which is resistant to a high-temperature oxidizing atmosphere, e.g., a metal, an alloy, a mixture of insulative ceramics and a metal, a mixture of insulative ceramics and an alloy, or the like. Preferably, the lower electrode 44 should be made of a precious metal having a high melting point such as platinum, iridium, palladium, rhodium, molybdenum, or the like, or a material chiefly composed of an alloy of silver and palladium, silver and platinum, platinum and palladium, or the like, or a cermet of platinum and ceramics. Further preferably, the lower electrode 44 should be made of platinum only or a material chiefly composed of a platinum-base alloy.

The lower electrode 44 may be made of carbon or a graphite-base material. Ceramics to be added to the electrode material should preferably have a proportion ranging from 5 to 30 volume %. The lower electrode 44 may be made of the same material as the upper electrode, as described above.

The lower electrode 44 should preferably be formed by any of various thick-film forming processes. The lower electrode 44 has a thickness of 20 µm or less or preferably a thickness of 5 µm or less.

Each time the emitter 40, the upper electrode 42, or the lower electrode 44 is formed, the assembly is heated (sintered) into an integral structure.

The sintering process for integrally combining the emitter 40, the upper electrode 42, and the lower electrode 44 may be carried out at a temperature ranging from 500 to 1400° C., preferably from 1000 to 1400° C. For heating the emitter 40 which is in the form of a film, the emitter 40 should be sintered together with its evaporation source while their atmosphere is being controlled, so that the composition of the emitter 40 will not become unstable at high temperatures.

By performing the sintering process, the film which will serve as the upper electrode 42 is shrunk from the thickness of 10 µm to the thickness of 0.1 µm, and simultaneously a plurality of holes are formed therein. As a result, as shown in FIG. 6, a plurality of through regions 46 are formed in the upper electrode 42, and the peripheral portions 52 of the through regions 46 are turned into overhanging portions. In advance (of the sintering process), the film which will serve as the upper electrode 42 may be patterned by etching (wet etching or dry etching) or lift-off, and then may be sintered. In this case, recesses or slits may easily be formed as the through regions 46.

The emitter 40 may be covered with a suitable member, and then sintered such that the surface of the emitter 40 will not be exposed directly to the sintering atmosphere.

Figure 9:
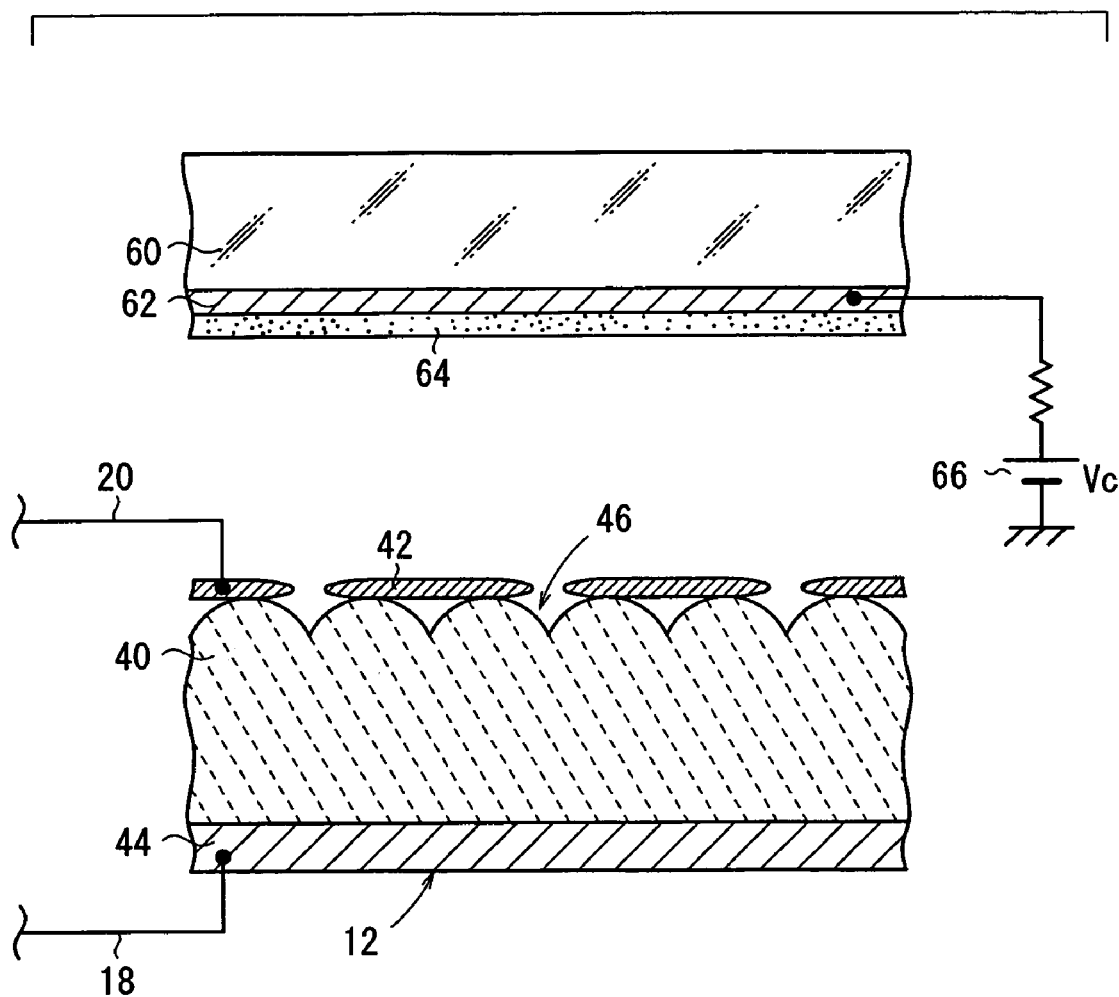
FIG. 9 is a view showing a layout of a collector electrode, a phosphor, and a transparent plate on the upper electrode.

For using the electron emitter 12 as light-emitting device or a pixel of a display apparatus, as shown in FIG. 9, a transparent plate 60 made of glass or acrylic resin is placed above the upper electrode 42, and a collector electrode 62 in the form of a transparent electrode, for example, is placed on the reverse side of the transparent plate 60 (which faces the upper electrode 42), the collector electrode 62 being coated with a phosphor 64. A bias voltage source 66 (collector voltage Vc) is connected to the collector electrode 62 through a resistor. The electron emitter 12 is naturally placed in a vacuum. The vacuum level in the atmosphere should preferably in the range from $10^2$ to $10^{-6}$ Pa and more preferably in the range from $10^{-3}$ to $10^{-5}$ Pa.

The reason for the above range is that in a lower vacuum, (1) many gas molecules would be present in the space, and a plasma can easily be generated and, if too an intensive plasma were generated, many positive ions thereof would impinge upon the upper electrode 42 and damage the same, and (2) emitted electrons would tend to impinge upon gas molecules prior to arrival at the collector electrode 62, failing to sufficiently excite the phosphor 64 with electrons that are sufficiently accelerated under the collector voltage Vc.

In a higher vacuum, though electrons would be liable to be emitted from a point where electric field concentrates, structural body supports and vacuum seals would be large in size, posing disadvantages on efforts to make the emitter smaller in size.

Figure 10:
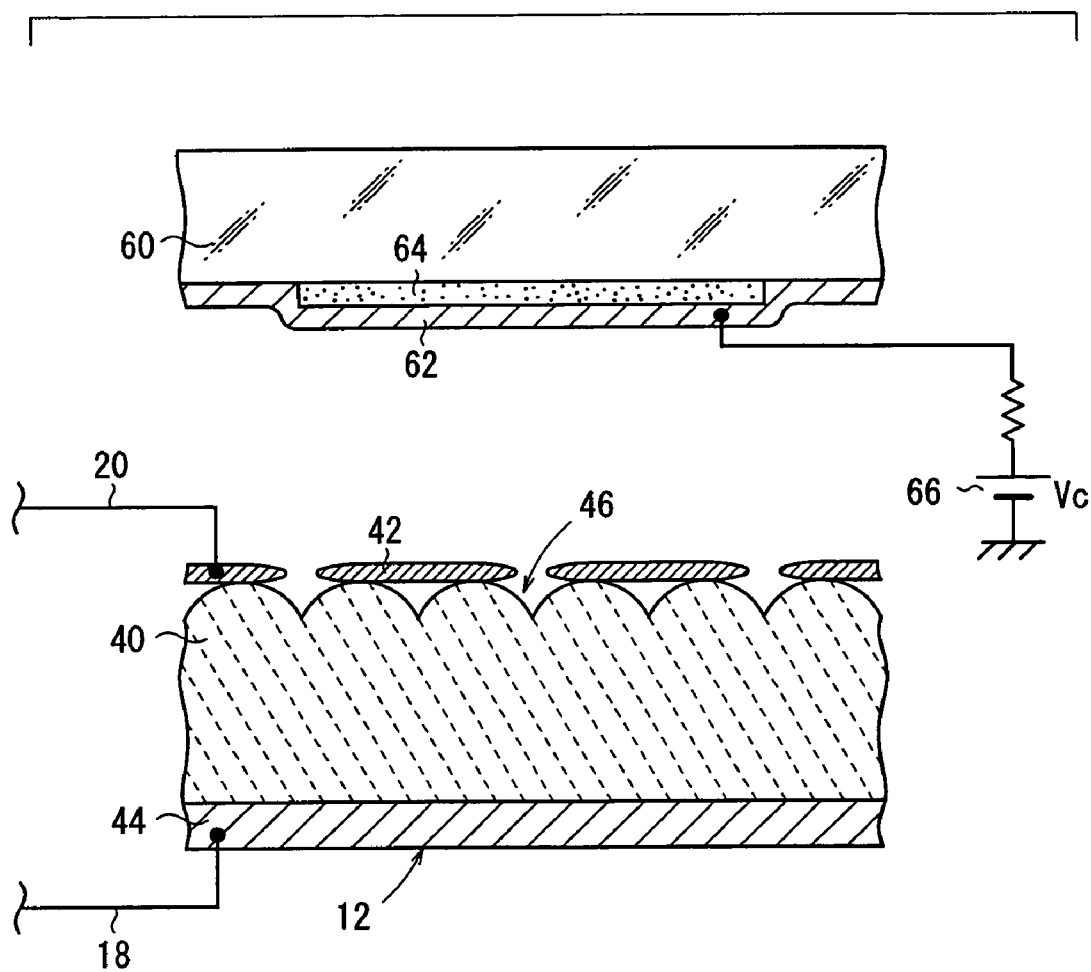
FIG. 10 is a view showing another layout of a collector electrode, a phosphor, and a transparent plate on the upper electrode.

In the embodiment shown in FIG. 9, the collector electrode 62 is formed on the reverse side of the transparent plate 60, and the phosphor 64 is formed on the surface of the collector electrode 62 (which faces the upper electrode 42). According to another arrangement, as shown in FIG. 10, the phosphor 64 may be formed on the reverse side of the transparent plate 60, and the collector electrode 62 may be formed in covering relation to the phosphor 64.

Such another arrangement is for use in a CRT or the like where the collector electrode 62 functions as a metal back. Electrons emitted from the emitter 40 pass through the collector electrode 62 into the phosphor 64, exciting the phosphor 64. Therefore, the collector electrode 62 is of a thickness which allows electrons to pass therethrough, preferably be 100 nm or less thick. As the kinetic energy of the emitted electrons is larger, the thickness of the collector electrode 62 may be increased.

This arrangement offers the following advantages:

(a) If the phosphor 64 is not electrically conductive, then the phosphor 64 is prevented from being charged (negatively), and an electric field for accelerating electrons can be maintained.

(b) The collector electrode 62 reflects light emitted from the phosphor 64, and discharges the light emitted from the phosphor 64 efficiently toward the transparent plate 60 (light emission surface).

(c) Electrons are prevented from impinging excessively upon the phosphor 64, thus preventing the phosphor 64 from being deteriorated and from producing a gas.

The principles of electron emission of the electron emitter 12 will be described below with reference to FIG. 5 and FIGS. 11A through 12C.

First, the electron emitter 12 emits electrons when a drive voltage is applied between the upper electrode 42 and the lower electrode 44. The drive voltage is defined as a voltage, such as a pulse voltage or an alternating-current voltage, which abruptly changed from a reference voltage (e.g., 0 V) or a voltage level that is higher or lower than the reference voltage to a voltage level that is lower or higher than the reference voltage.

A triple junction is formed in a region of contact between the upper surface of the emitter 40, the upper electrode 42, and a medium (e.g., a vacuum) around the electron emitter 12. The triple junction is defined as an electric field concentration region formed by a contact between the upper electrode 42, the emitter 40, and the vacuum. The triple junction includes a triple point where the upper electrode 42, the emitter 40, and the vacuum exist as one point.

With the arrangement of the electron emitter 12, the triple junction is formed on the overhanging portion 52 of the upper electrode 42 and the peripheral area of the upper electrode 42. Therefore, when the above drive voltage is applied between the upper electrode 42 and the lower electrode 44, an electric field concentration occurs at the triple junction.

Figure 11A:
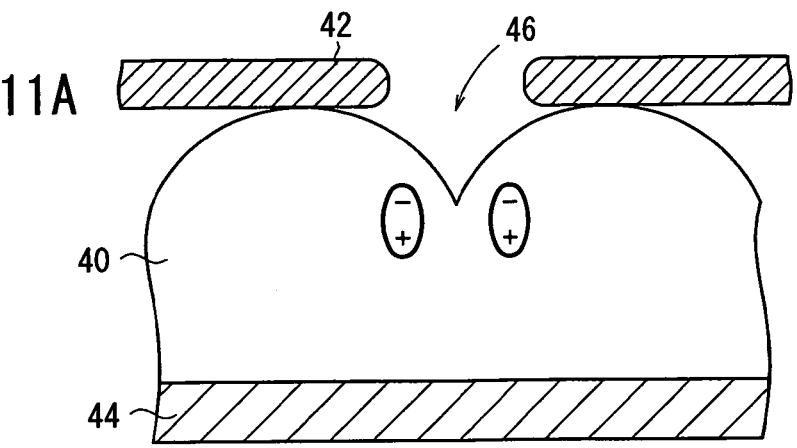
FIG. 11A is a view illustrative of a state at a point p1 shown in FIG. 5.
Figure 11B:
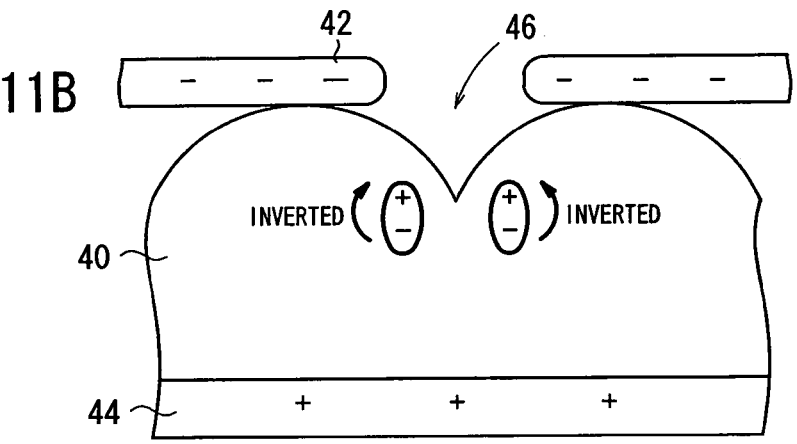
FIG. 11B is a view illustrative of a state at a point p2 shown in FIG. 5.
Figure 11C:
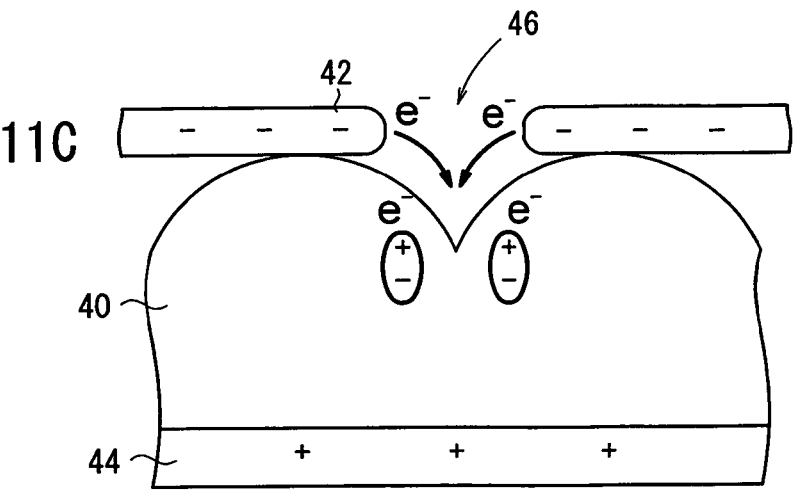
FIG. 11C is a view illustrative of a state from the point p2 to a point p3 shown in FIG. 5.

In the description which follows, it is assumed that the emitter 40 is polarized in one direction, with dipoles having negative poles facing toward the upper surface of the emitter 40 (see FIG. 11A).

At the point p1 (initial state) where the reference voltage (e.g., 0 V) is applied as shown in FIG. 5, since the negative poles of the dipole moments face toward the upper surface of the emitter 40, as shown in FIG. 11, almost no electrons are accumulated on the upper surface of the emitter 40.

Thereafter, when a negative voltage is applied and the level of the negative voltage is increased in the negative direction, the polarization starts being reversed substantially at the time the negative voltage exceeds a negative coercive voltage (see the point p2 in FIG. 5). All the polarization is reversed at the point p3 shown in FIG. 5 (see FIG. 11B). Because of the polarization reversal, an electric field concentration occurs at the triple junction, causing electrons to be accumulated in the portion of the emitter 40 which is exposed through the through region 46 of the upper electrode 42 and the portion of the emitter 40 which is near the peripheral portion of the upper electrode 42 (see FIG. 11C). In particular, electrons are emitted (emitted inwardly) from the upper electrode 42 toward the portion of the emitter 40 which is exposed through the through region 46 of the upper electrode 42. At the point p3 shown in FIG. 5, the accumulation of electrons is saturated.

Figure 12A:
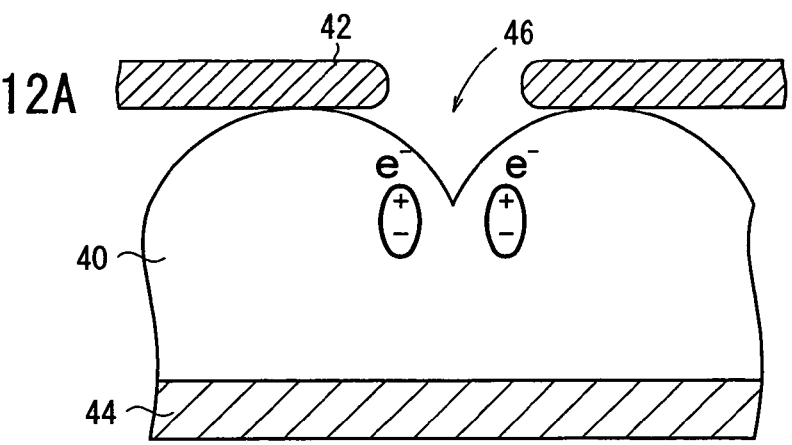
FIG. 12A is a view illustrative of a state from the point p3 to a point p4 shown in FIG. 5.
Figure 12B:
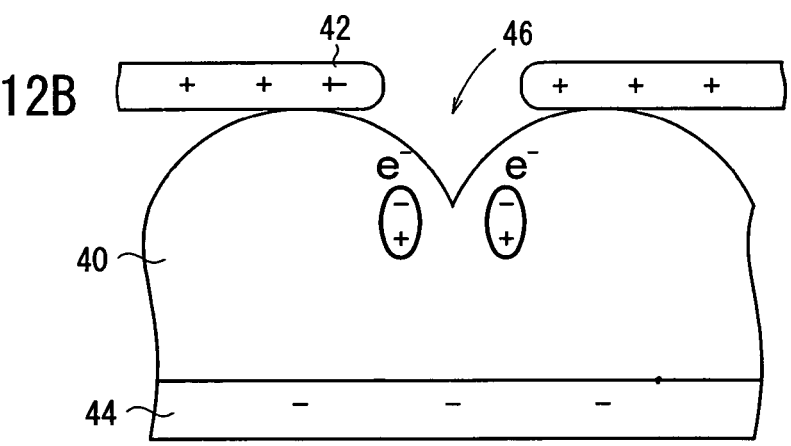
FIG. 12B is a view illustrative of a state immediately prior to a point p4 shown in FIG. 5.

Thereafter, when the level of the negative voltage is reduced and a positive voltage is applied in excess of the reference voltage, the upper surface of the emitter 40 is kept charged up to a certain voltage level (see FIG. 12A). As the level of the positive voltage is increased, there is produced a region where the negative poles of dipole moments start facing the upper surface of the emitter 40 (see FIG. 12B) immediately prior to the point p4 in FIG. 5. When the level is further increased, electrons start being emitted after the point p4 in FIG. 5 (see FIG. 12C). When the positive voltage is increased in the positive direction, the amount of emitted electrons is increased. Substantially at the time the positive voltage exceeds the positive coercive voltage (the point p5), a region where the polarization is reversed again is increased. At the point p6, almost all the accumulated electrons are emitted, and the amount of polarization at this time is essentially the same as the amount of polarization in the initial state.

The characteristics of the electron emitter 12 has have the following features:

(A) If the negative coercive voltage is represented by v1 and the positive coercive voltage by v2, then $|v1|<|v2|$ (B) More specifically, $1.5 \times |v1| < |v2|$ (C) If the rate of change of the polarization at the time the negative coercive voltage v1 is applied is represented by $\Delta q1/\Delta v1$ and the rate of change of the amount of positive charges and the rate of change of the polarization at the time the positive coercive voltage v2 is applied is represented by $\Delta q2/\Delta v2$, then $(\Delta q1/\Delta v1) > (\Delta q2/\Delta v2)$ (4) If the voltage at which the accumulation of electrons is saturated is represented by v3 and the voltage at which electrons start being emitted by v4, then $1 \leq |v4|/|v3| \leq 1.5$ It can thus be seen that the electron emitter 12 has substantially the same characteristics as the features (1) through (4) of the characteristics of the electron emitter as described above.

Figure 13A:
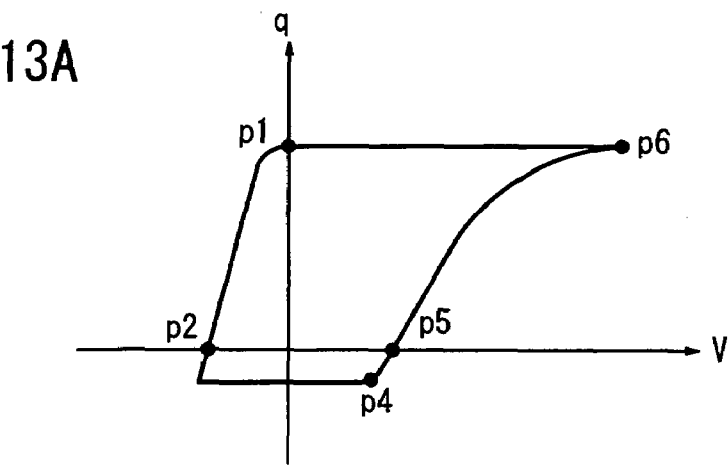
FIG. 13A is a diagram showing a hysteresis curve plotted when a voltage Vsl shown in FIG. 2A or 4A is applied.
Figure 13B:
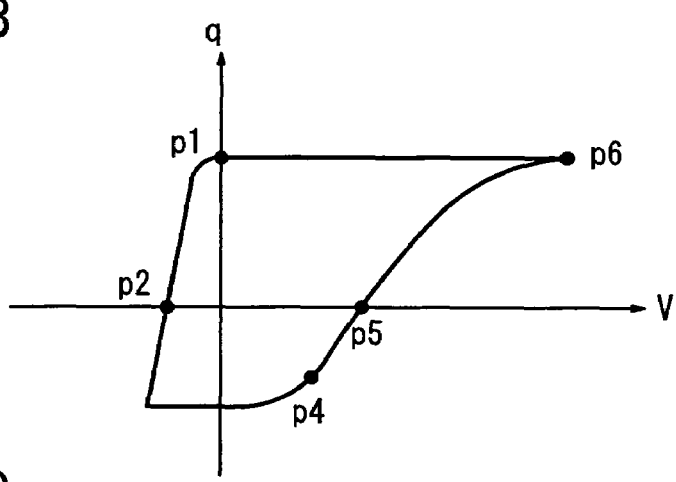
FIG. 13B is a diagram showing a hysteresis curve plotted when a voltage Vsm shown in FIG. 2B or 4B is applied.

Changes of the characteristics at the time the level of the negative voltage for the accumulation of electrons will be reviewed in relation to the three examples of amplitude modulation on the pulse signal Sp shown in FIGS. 2A through 2C and the three examples of pulse width modulation on the pulse signal Spa shown in FIGS. 4A through 4C. At the level Vsl of the negative voltage shown in FIGS. 2A and 4A, the amount of electrons accumulated in the electron emitter 12 is small as shown in FIG. 13A. At the level Vsm of the negative voltage shown in FIGS. 2B and 4b, the amount of electrons accumulated in the electron emitter 12 is medium as shown in FIG. 13B. At the level Vsh of the negative voltage shown in FIGS. 2C and 4C, the amount of electrons accumulated in the electron emitter 12 is large and is substantially saturated as shown in FIG. 13C.

Figure 13C:
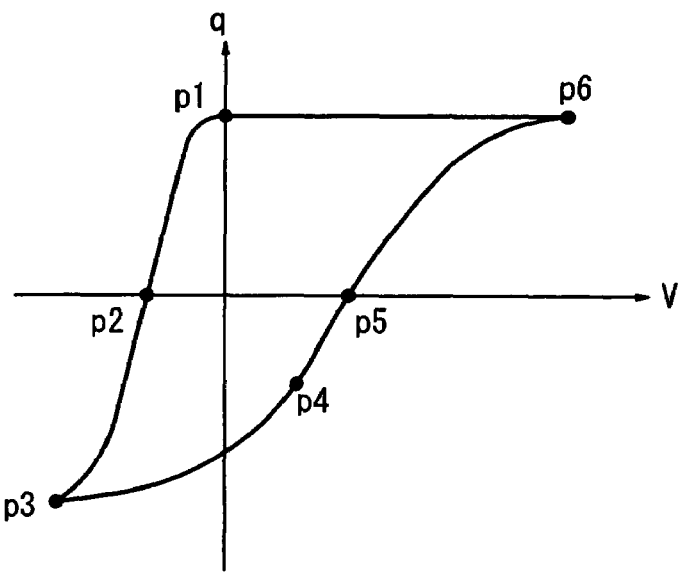
FIG. 13C is a diagram showing a hysteresis curve plotted when a voltage Vsh shown in FIG. 2C or 4C is applied.

However, as shown in FIGS. 13A through 13C, the voltage level at the point p4 where electrons start being emitted is substantially the same. That is, even if the applied voltage changes to the voltage level indicated at the point p4 after electrons are accumulated, the amount of accumulated electrons does not change essentially. It can thus be seen that a memory effect has been caused.

Four experimental examples (first through fourth experimental examples) of the electron emitter 12 according to the present embodiment will be shown.

Figure 14A:
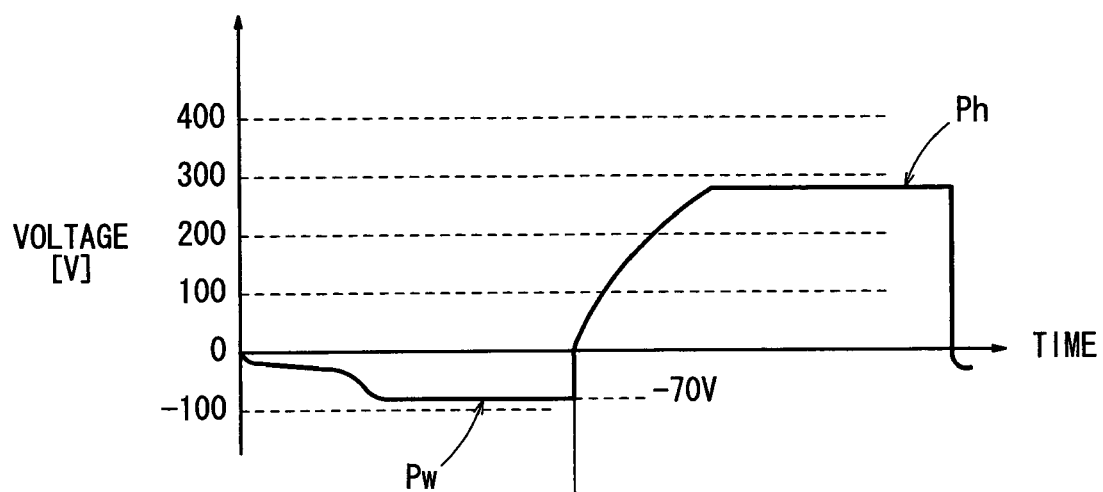
FIG. 14A is a diagram showing the waveform of a write pulse and an turn-on pulse that are used in a first experimental example (an experiment for observing the emission of electrons from an electron emitter)
Figure 14B:
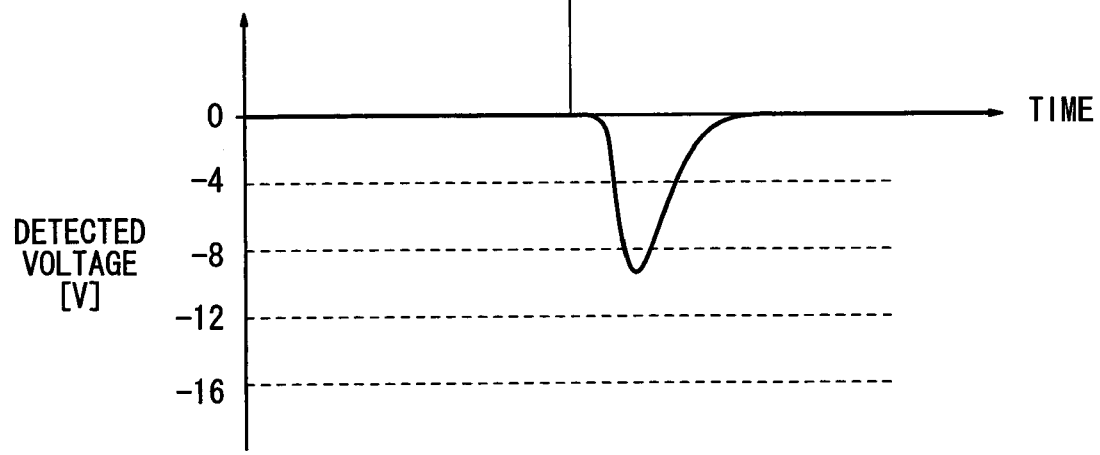
FIG. 14B is a diagram showing the waveform of a detected voltage of a light-detecting device, which is representative of the emission of electrons from the electron emitter in the first experimental example.

According to the first experimental example, the emission of electrons from the electron emitter 12 was observed. Specifically, as shown in FIG. 14A, a write pulse Pw having a voltage of –70 V was applied to the electron emitter 12 to cause the electron emitter 12 to accumulate electrons, and thereafter a turn-on pulse Ph having a voltage of 280 V was applied to cause the electron emitter 12 to emit electrons. The emission of electrons was measured by detecting the light emission from the phosphor 64 with a light-detecting device (photodiode). The detected waveform is shown in FIG. 14B. The write pulse Pw and the turn-on pulse Ph had a duty cycle of 50%.

It can be seen from the first experimental example that light starts to be emitted on a positive-going edge of the turn-on pulse Ph and the light emission is finished in an initial stage of the turn-on pulse Ph. Therefore, it is considered that the light emission will not be affected by shortening the period of the turn-on pulse Ph. This period shortening will lead to a reduction in the period in which to apply the high voltage, resulting in a reduction in power consumption.

Figure 15:
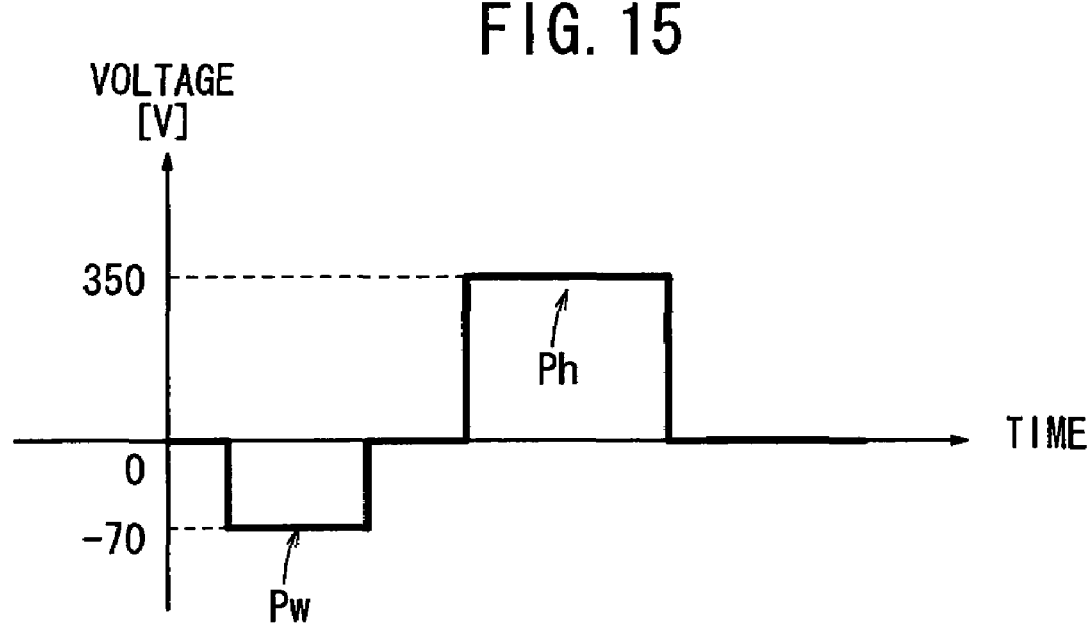
FIG. 15 is a diagram showing the waveform of a write pulse and a turn-on pulse that are used in second through fourth experimental examples.

According to the second experimental example, how the amount of electrons emitted from the electron emitter 12 is changed by the amplitude of the write pulse Pw shown in FIG. 15 was observed. Changes in the amount of emitted electrons were measured by detecting the light emission from the phosphor 64 with a light-detecting device (photodiode), as with the first experimental example. The experimental results are shown in FIG. 16.

Figure 16:
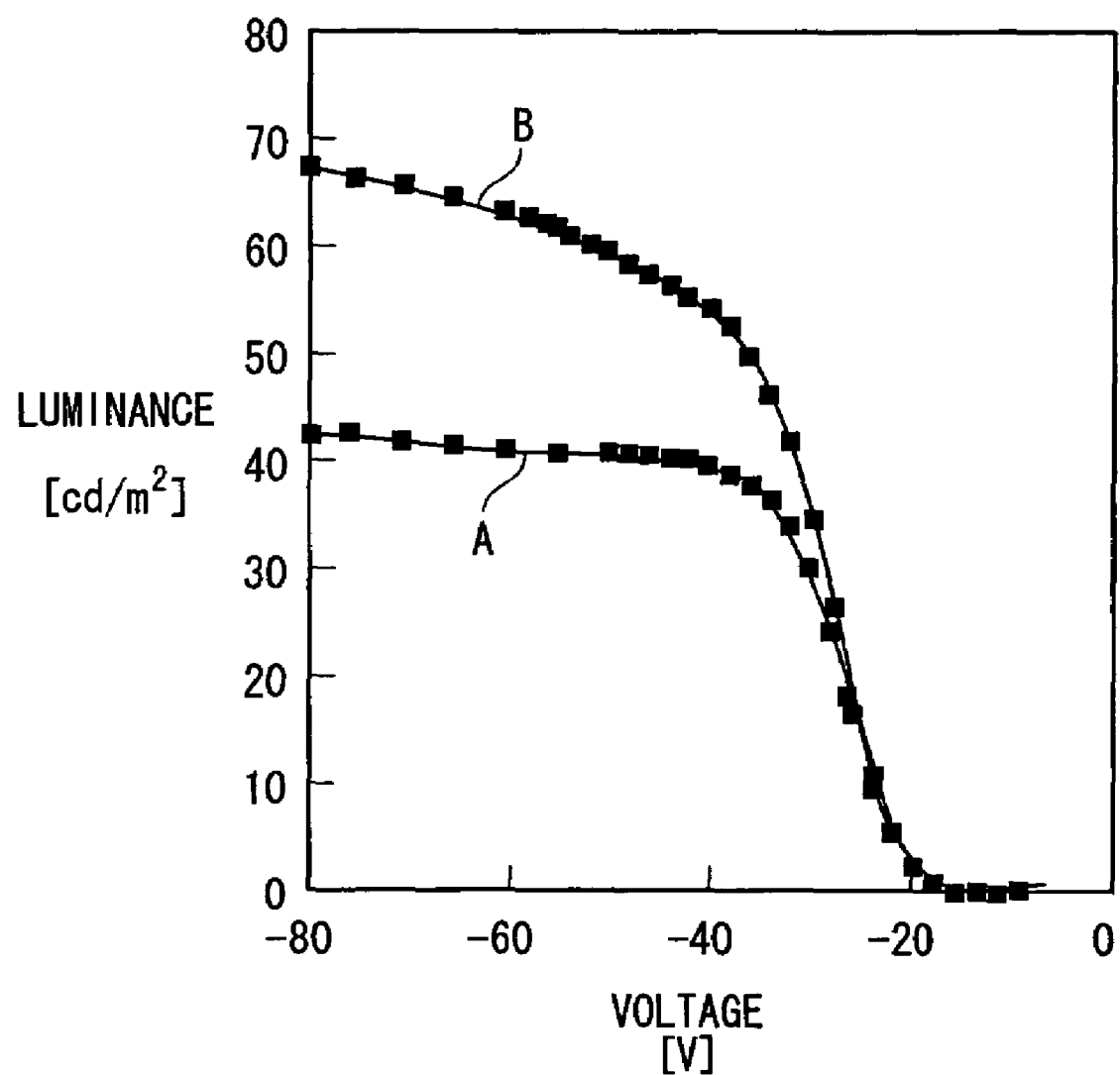
FIG. 16 is a characteristic diagram showing the results of a second experimental example (an experiment for observing how the amount of electrons emitted from the electron emitter changes depending on the amplitude of a write pulse)

In FIG. 16, the solid-line curve A represents the characteristics at the time the turn-on pulse Ph had an amplitude of 200 V and the write pulse Pw had an amplitude changing from –10 V to –80 V, and the solid-line curve B represents the characteristics at the time the turn-on pulse Ph had an amplitude of 350 V and the write pulse Pw had an amplitude changing from –10 V to –80 V.

As illustrated in FIG. 16, when the write pulse Pw is changed from –20 V to –40 V, it can be understood that the light emission luminance changes substantially linearly. A comparison between the amplitudes 350 V and 200 V of the turn-on pulse Ph in particular indicates that a change in the light emission luminance in response to the write pulse Pw at the time the amplitude of the turn-on pulse Ph is 350 V has a wider dynamic range, which is advantageous for increased luminance and contrast for the display of images. This tendency appears to be more advantageous as the amplitude of the turn-on pulse Ph increases in a range until the light emission luminance is saturated with respect to the setting of the amplitude of the turn-on pulse Ph. It is preferable to set the amplitude of the turn-on pulse Ph to an optimum value in relation to the withstand voltage and power consumption of the signal transmission system.

According to the third experimental example, how the amount of electrons emitted from the electron emitter 12 is changed by the amplitude of the turn-on pulse Ph shown in FIG. 15 was observed. Changes in the amount of emitted electrons were measured by detecting the light emission from the phosphor 64 with a light-detecting device (photodiode), as with the first experimental example. The experimental results are shown in FIG. 17.

Figure 17:
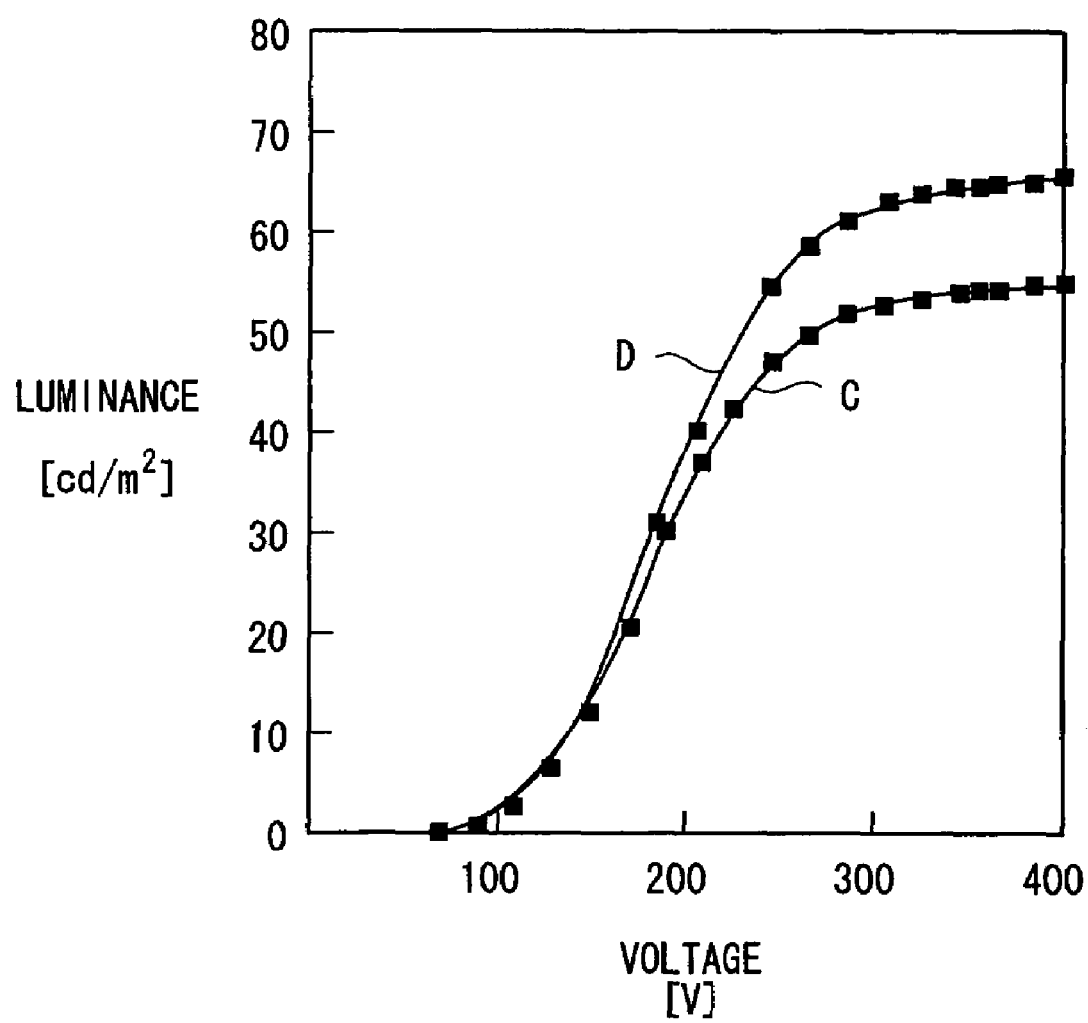
FIG. 17 is a characteristic diagram showing the results of a third experimental example (an experiment for observing how the amount of electrons emitted from the electron emitter changes depending on the amplitude of a turn-on pulse)

In FIG. 17, the solid-line curve C represents the characteristics at the time the write pulse Pw had an amplitude of −40 V and the turn-on pulse Ph had an amplitude changing from 50 V to 400 V, and the solid-line curve D represents the characteristics at the time the write pulse Pw had an amplitude of −70 V and the turn-on pulse Ph had an amplitude changing from 50 V to 400 V.

As illustrated in FIG. 17, when the turn-on pulse Ph is changed from 100 V to 300 V, it can be understood that the light emission luminance changes substantially linearly. A comparison between the amplitudes −40 V and −70 V of the write pulse Pw in particular indicates that a change in the light emission luminance in response to the turn-on pulse Ph at the time the amplitude of the write pulse Pw is −70 V has a wider dynamic range, which is advantageous for increased luminance and contrast for the display of images. This tendency appears to be more advantageous as the amplitude of the write pulse Pw increases in a range until the light emission luminance is saturated with respect to the setting of the amplitude of the write pulse Pw. It is preferable also in this case to set the amplitude (absolute value) of the write pulse Pw to an optimum value in relation to the withstand voltage and power consumption of the signal transmission system.

According to the fourth experimental example, how the amount of electrons emitted from the electron emitter 12 is changed by the level of the collector voltage Vc shown in FIG. 9 or 10 was observed. Changes in the amount of emitted electrons were measured by detecting the light emission from the phosphor 64 with a light-detecting device (photodiode), as with the first experimental example. The experimental results are shown in FIG. 18.

Figure 18:
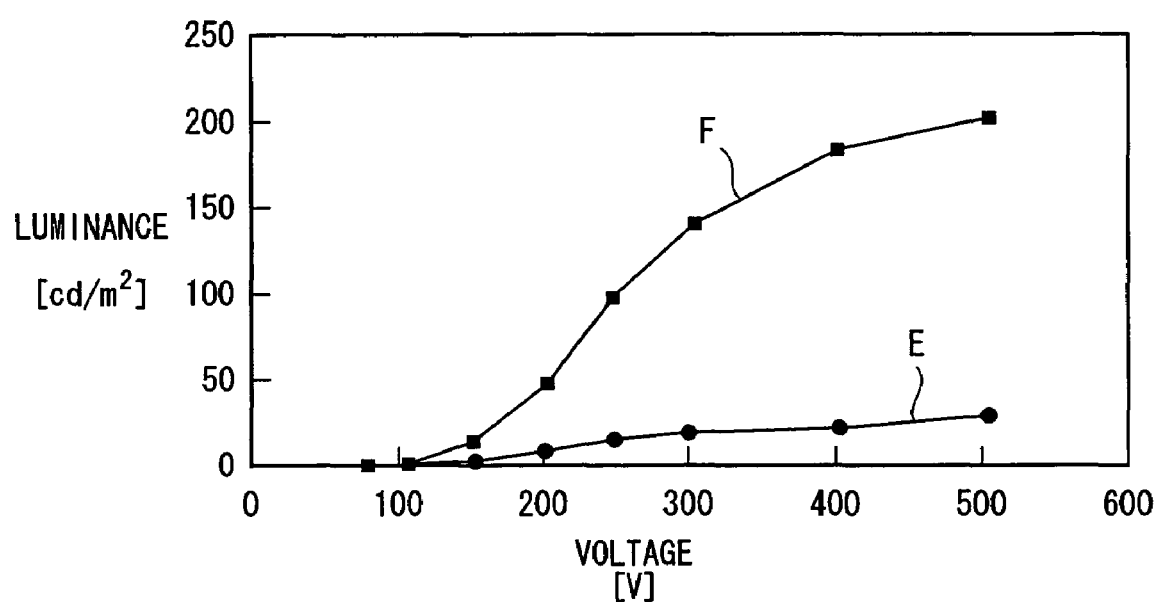
FIG. 18 is a characteristic diagram showing the results of a fourth experimental example (an experiment for observing how the amount of electrons emitted from the electron emitter changes depending on the level of a collector voltage)

In FIG. 18, the solid-line curve E represents the characteristics at the time the level of the collector voltage Vc was 3 kV and the amplitude of the turn-on pulse Ph was changed from 80 V to 500 V, and the solid-line curve F represents the characteristics at the time the level of the collector voltage Vc was 7 kV and the amplitude of the turn-on pulse Ph was changed from 80 V to 500 V.

As illustrated in FIG. 18, it can be understood that a change in the light emission luminance in response to the turn-on pulse Ph has a wider dynamic range when the collector voltage Vc is 7 kV than when the collector voltage Vc is 3 kV, which is advantageous for increased luminance and contrast for the display of images. This tendency appears to be more advantageous as the level of the collector voltage Vc increases. It is preferable also in this case to set the level of the collector voltage Vc to an optimum value in relation to the withstand voltage and power consumption of the signal transmission system.

The electron emitter 12 also offers the following advantages: Since the upper electrode 42 has the plural through regions 46, electrons are uniformly emitted from each of the through regions 46 and the outer peripheral portions of the upper electrode 42. Thus, any variations in the overall electron emission characteristics of the electron emitter 12 are reduced, making it possible to facilitate the control of the electron emission and increase the electron emission efficiency.

Because the gap 54 is formed between the overhanging portion of the upper electrode 42 and the emitter 40, when the drive voltage is applied, an electric field concentration tends to be produced in the region of the gap 54. This leads to a higher efficiency of the electron emission, making the drive voltage lower (emitting electrons at a lower voltage level).

As described above, since the upper electrode 42 has the overhanging portion 52 on the peripheral portion of the through hole 46, together with the increased electric field concentration in the region of the gap 54, electrons are easily emitted from the overhanging portion 52 of the upper electrode 42. This leads to a higher output and higher efficiency of the electron emission, making the drive voltage lower. As the overhanging portion 52 of the upper electrode 42 functions as a gate electrode (a control electrode, a focusing electronic lens, or the like), the linearity of emitted electrons can be increased. This is effective in reducing crosstalk if a number of electron emitters 12 are arrayed for use as an electron source of the display apparatus 10.

As described above; the electron emitter 12 is capable of easily developing a high electric field concentration, provides many electron emission regions, has a higher output and higher efficiency of the electron emission, and can be driven at a lower voltage (lower power consumption).

With the electron emitter 12 in particular, at least the upper surface of the emitter 40 has the surface irregularities 48 due to the grain boundary of the dielectric material. As the upper electrode 42 has the through regions 46 in portions corresponding to the concavities 50 of the grain boundary of the dielectric material, the overhanging portions 52 of the upper electrode 42 can easily be realized.

The maximum angle θ between the upper surface of the emitter 40, i.e., the surface of the convexity 56 (which is also the inner wall surface of the concavity 50) of the grain boundary of the dielectric material, and the lower surface 56*a* of the overhanging portion 52 of the upper electrode 42 is in the range of 1°θ60°. The maximum distance d in the vertical direction between the surface of the convexity 56 (the inner wall surface of the concavity 50) of the grain boundary of the dielectric material and the lower surface 56*a* of the overhanging portion 52 of the upper electrode 42 is in the range of 0 μm<d 10 μm. These arrangements make it possible to increase the degree of the electric field concentration in the region of the gap 54, resulting in a higher output and higher efficiency of the electron emission and making the drive voltage lower efficiently.

With the electron emitter 12, the through region 46 is in the shape of the hole 58. As shown in FIG. 7, the portions of the emitter 40 where the polarization is reversed or changed depending on the drive voltage applied between the upper electrode 42 and the lower electrode 44 (see FIG. 6) include a portion (first portion) 70 directly below the upper electrode 42 and a portion (second portion) 72 corresponding to a region extending from the inner peripheral edge of the through region 46 inwardly of the through region 46. Particularly, the second portion 72 changes depending on the level of the drive voltage and the degree of the electric field concentration. With the electron emitter 12, the average diameter of the hole 58 is in the range from 0.1 μm to 10 μm. Insofar as the average diameter of the hole 58 is in this range, the distribution of electrons emitted through the through region 46 is almost free of any variations, allowing electrons to be emitted efficiently.

If the average diameter of the hole 58 is less than 0.1 μm, then the region where electrons are accumulated is made narrower, reducing the amount of emitted electrons. While one solution would be to form many holes 58, it would be difficult and highly costly to form many holes 58. If the average diameter of the hole 58 is in excess of 10 μm, then the proportion (share) of the portion (second portion) 72 which contributes the emission of electrons in the portion of the emitter 40 that is exposed through the through region 46 is reduced, resulting in a reduction in the-electron emission efficiency.

Figure 19:
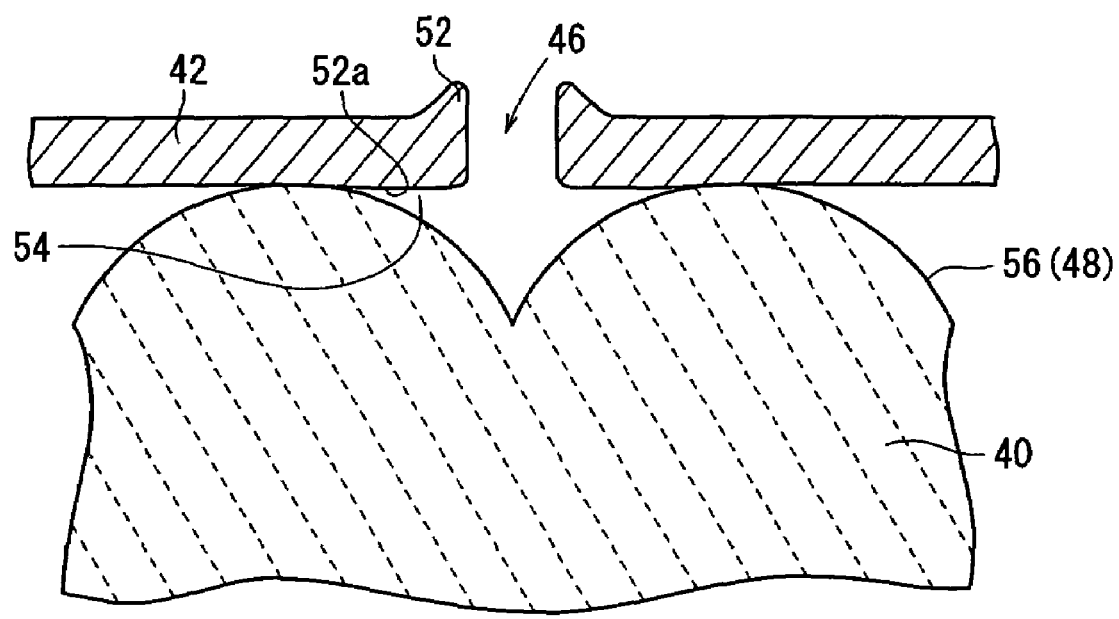
FIG. 19 is a view showing a cross-sectional shape of an overhanging portion of the upper electrode of the electron emitter.
Figure 20:
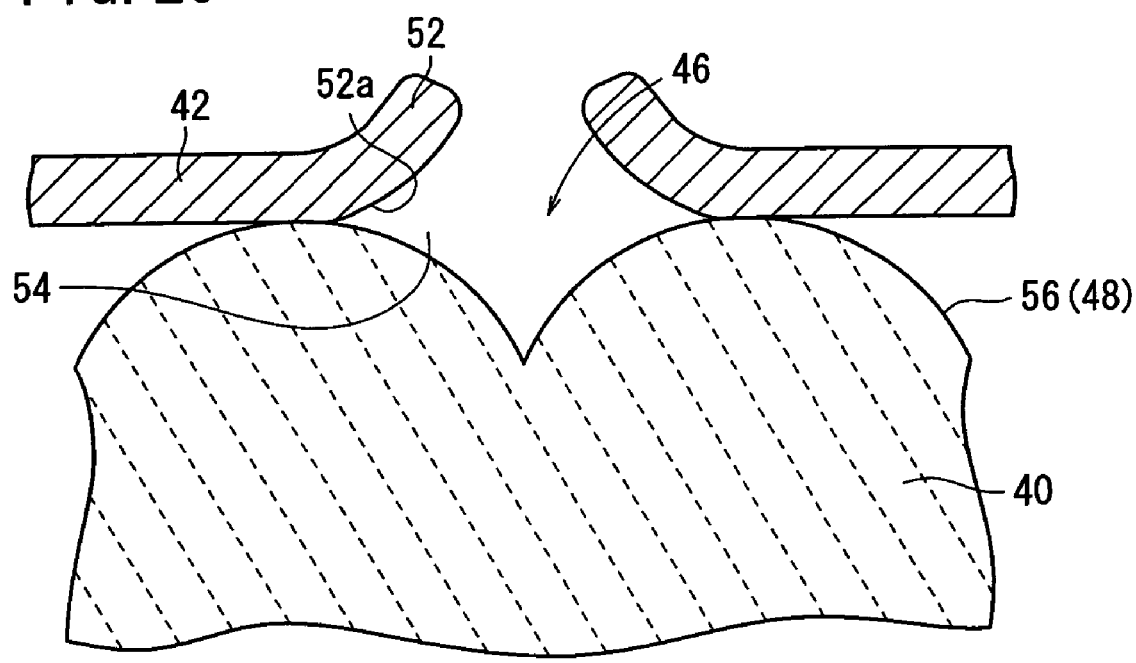
FIG. 20 is a view showing a cross-sectional shape of another overhanging portion of the upper electrode of the electron emitter.
Figure 21:
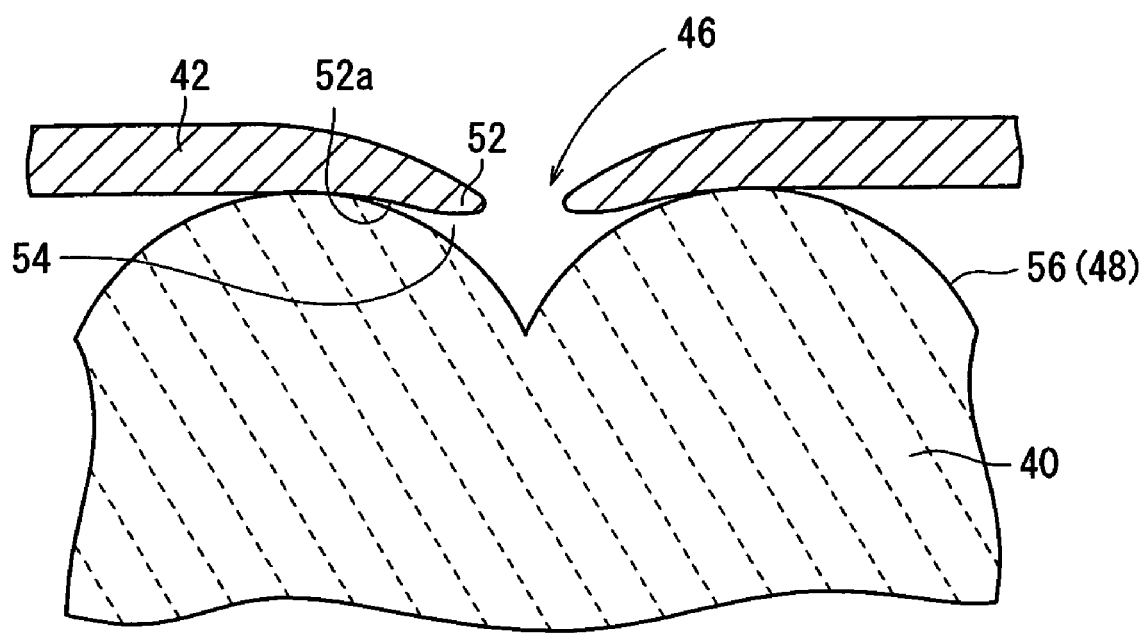
FIG. 21 is a view showing a cross-sectional shape of still another overhanging portion of the upper electrode of the electron emitter.
Figure 22:
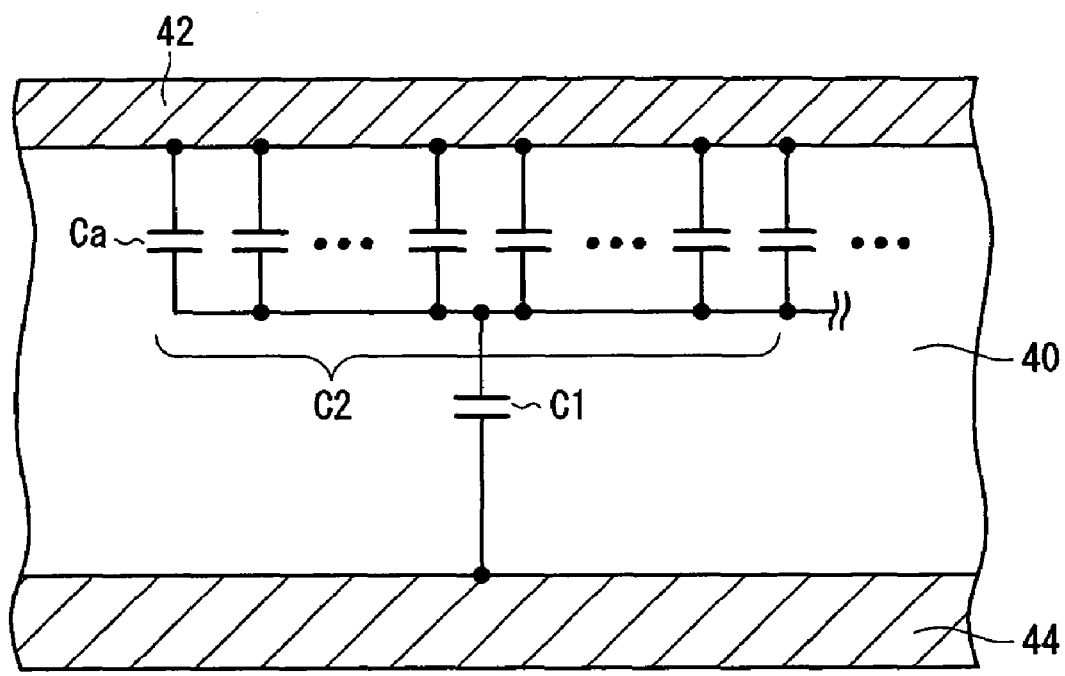
FIG. 22 is an equivalent circuit diagram showing a connected state of various capacitors connected between an upper electrode and a lower electrode.

The overhanging portion 52 of the upper electrode 42 may have upper and lower surfaces extending horizontally as shown in FIG. 7. Alternatively, as shown in FIG. 19, the overhanging portion 52 may have a lower surface 52a extending substantially horizontally and an upper end raised upwardly. Alternatively, as shown in FIG. 20, the overhanging portion 52 may have a lower surface 52a inclined progressively upwardly toward the center of the through hole 46. Further alternatively, as shown in FIG. 21, the overhanging portion 52 may have a lower surface 52a inclined progressively downwardly toward the center of the through hole 46. The arrangement shown in FIG. 19 is capable of increasing the function as a gate electrode. The arrangement shown in FIG. 21 makes it easier to produce a higher electric field concentration for a higher output and higher efficiency of the electron emission because the gap 54 is narrower.

As shown in FIG. 21, the electron emitter 12 has in its electrical operation a capacitor C1 due to the emitter 40 and a cluster of capacitors Ca due to respective gaps 54, disposed between the upper electrode 42 and the lower electrode 44. The capacitors Ca due to the respective gaps 54 are connected parallel to each other into a single capacitor C2. In terms of an equivalent circuit, the capacitor C1 due to the emitter 40 is connected in series to the capacitor C2 which comprises the cluster of capacitors Ca.

Actually, the capacitor C1 due to the emitter 40 is not directly connected in series to the capacitor C2 which comprises the cluster of capacitors Ca, but the capacitive component that is connected in series varies depending on the number of the through regions 46 formed in the upper electrode 42 and the overall area of the through regions 46.

Figure 23:
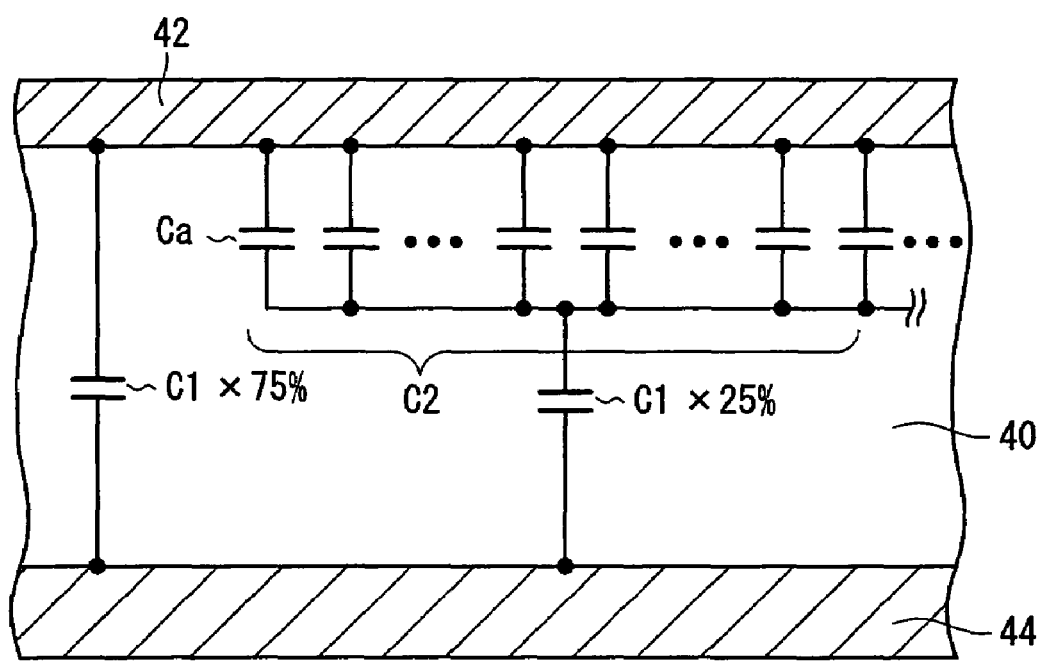
FIG. 23 is a diagram illustrative of calculations of capacitances of the various capacitors connected between the upper electrode and the lower electrode.

Capacitance calculations will be performed on the assumption that 25% of the capacitor C1 due to the emitter 40 is connected in series to the capacitor C2 which comprises the cluster of capacitors Ca, as shown in FIG. 23. Since the gaps 54 are in vacuum, the relative permittivity thereof is 1. It is assumed that the maximum distance d of the gaps 54 is 0.1 μm, the area S of each gap 54 is S=1 μm×1 μm, and the number of the gaps 54 is 10,000. It is also assumed that the emitter 40 has a relative permittivity of 2000, the emitter 40 has a thickness of 20 μm, and the confronting area of the upper and lower electrodes 42, 44 is 200 μm×200 μm. The capacitor C2 which comprises the cluster of capacitors Ca has a capacitance of 0.885 pF, and the capacitor C1 due to the emitter 40 has a capacitance of 35.4 pF. If the portion of the capacitor C1 due to the emitter 40 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Because the series-connected portion and the remaining portion are connected parallel to each other, the overall capacitance is 27.5 pF. This capacitance is 78% of the capacitance 35.4 pF of the capacitor C1 due to the emitter 40. Therefore, the overall capacitance is smaller than the capacitance of the capacitor C1 due to the emitter 40.

Consequently, the capacitance of the cluster of capacitors Ca due to the gaps 54 is relatively small. Because of the voltage division between the cluster of capacitors Ca and the capacitor C1 due to the emitter 40, almost the entire applied voltage Va is applied across the gaps 54, which are effective to produce a higher output of the electron emission.

Since the capacitor C2 which comprises the cluster of capacitors Ca is connected in series to the capacitor C1 due to the emitter 40, the overall capacitance is smaller than the capacitance of the capacitor C1 due to the emitter 40. This is effective to provide such preferred characteristics that the electron emission is performed for a higher output and the overall power consumption is lower.

Three modifications of the electron emitter 12 described above will be described below with reference to FIGS. 24 through 26.

Figure 24:
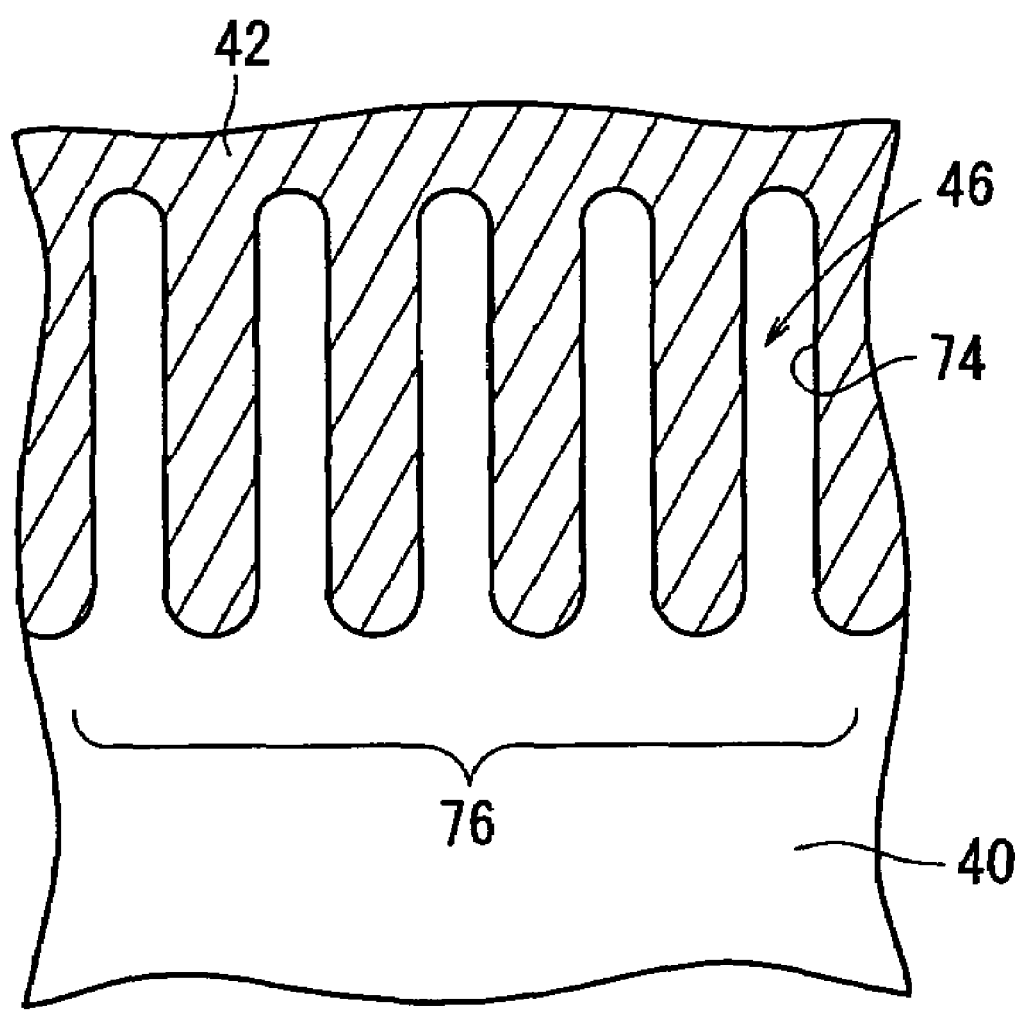
FIG. 24 is a fragmentary plan view of an electron emitter according to a first modification of the embodiment.

As shown in FIG. 24, an electron emitter 12a according to a first modification differs from the above electron emitter 12 in that the through region 46 has a shape, particularly a shape viewed from above, in the form of a recess 74. As shown in FIG. 24, the recess 74 should preferably be shaped such that a number of recesses 74 are successively formed into a saw-toothed recess 76. The saw-toothed recess 76 is effective to reduce variations in the distribution of electrons emitted through the through region 46 for efficient electron emission. Particularly, it is preferable to have the average width of the recesses 74 in the range from 0.1 μm to 10 μm. The average width represents the average of the lengths of a plurality of different line segments extending perpendicularly across the central line of the recess 74.

Figure 25:
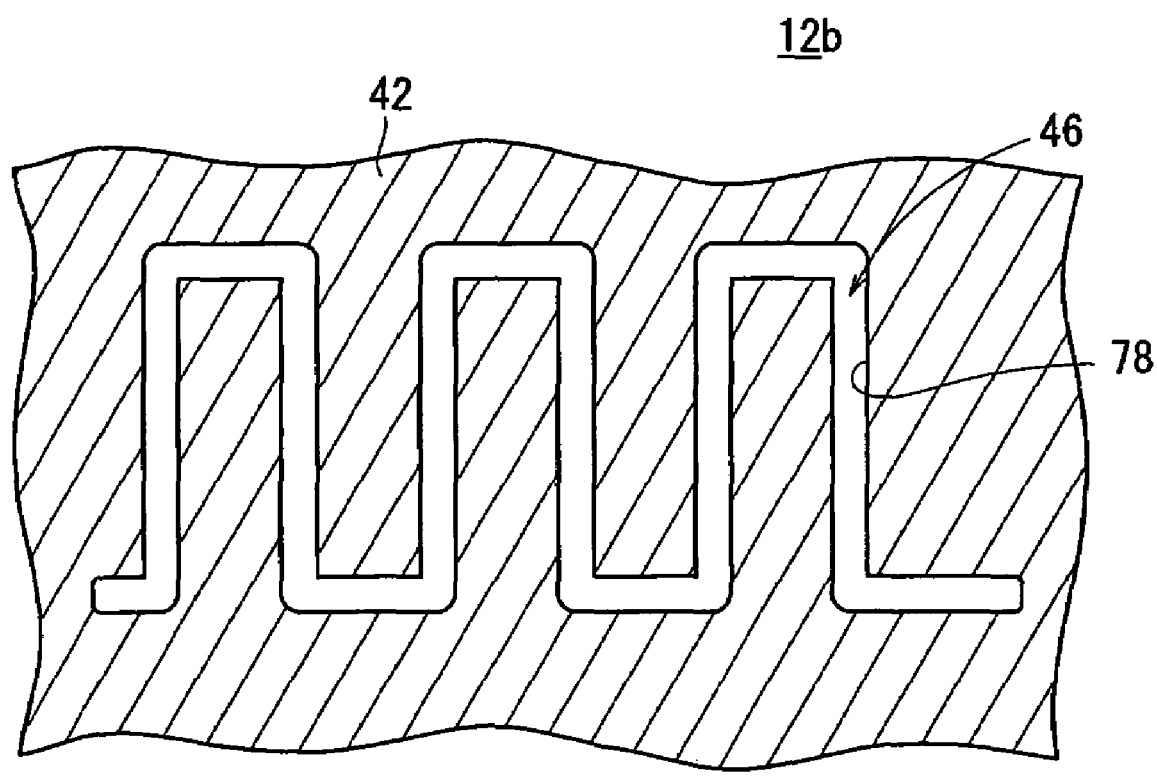
FIG. 25 is a fragmentary plan view of an electron emitter according to a second modification of the embodiment.

As shown in FIG. 25, an electron emitter 12a according to a second modification differs from the above electron emitter 12 in that the through region 46 has a shape, particularly a shape viewed from above, in the form of a slit 78. The slit 78 is defined as something having a major axis (extending in a longitudinal direction) whose length is 10 times or more the length of the minor axis (extending in a transverse direction) thereof. Those having a major axis (extending in a longitudinal direction) whose length is less than 10 times the length of the minor axis (extending in a transverse direction) thereof are defined as holes 58 (see FIG. 8). The slit 78 includes a succession of holes 58 in communication with each other. The slit 78 should preferably have an average width ranging from 0.1 μm to 10 μm for reducing variations in the distribution of electrons emitted through the through region 46 for efficient electron emission. The average width represents the average of the lengths of a plurality of different line segments extending perpendicularly across the central line of the slit 78.

Figure 26:
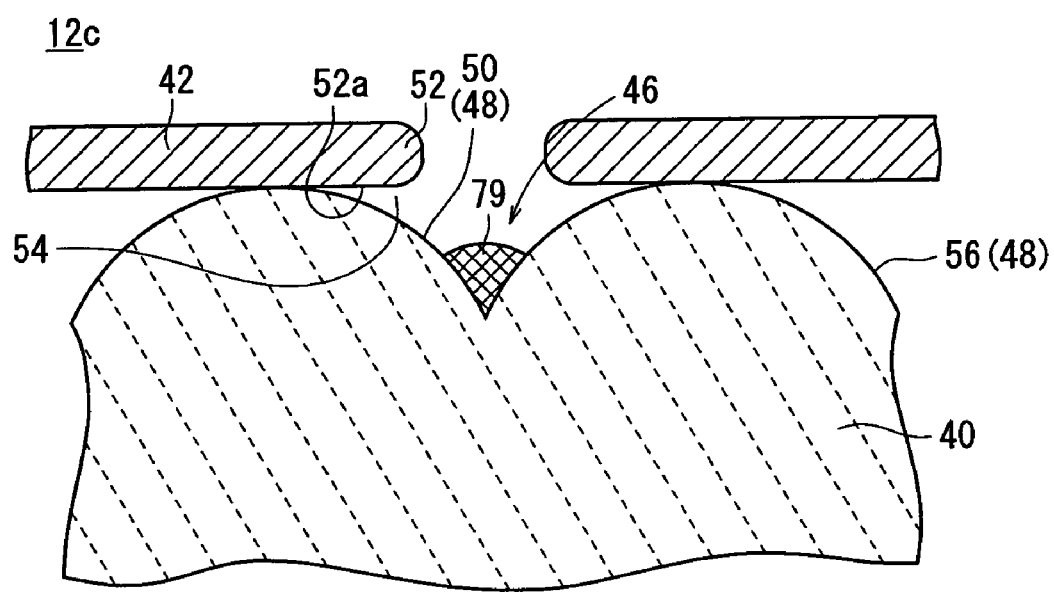
FIG. 26 is a fragmentary plan view of an electron emitter according to a third modification of the embodiment.

As shown in FIG. 26, an electron emitter 12c according to a third modification differs from the above electron emitter 12 in that a floating electrode 79 exists on the portion of the upper surface of the emitter 40 which corresponds to the through region 46, e.g., in the concavity 50 due to the grain boundary of the dielectric material. With this arrangement, in the state shown in FIG. 1C, the floating electrode 79 forms a false lower electrode for promoting the emission (inward emission) of electrons from the upper electrode 42.

Various drive methods for the display apparatus 10 according to the present embodiment will be described below with reference to FIGS. 27 through 45. In the description of those drive methods, the electron emitter 12 shown in FIG. 6 is used.

Figure 27:
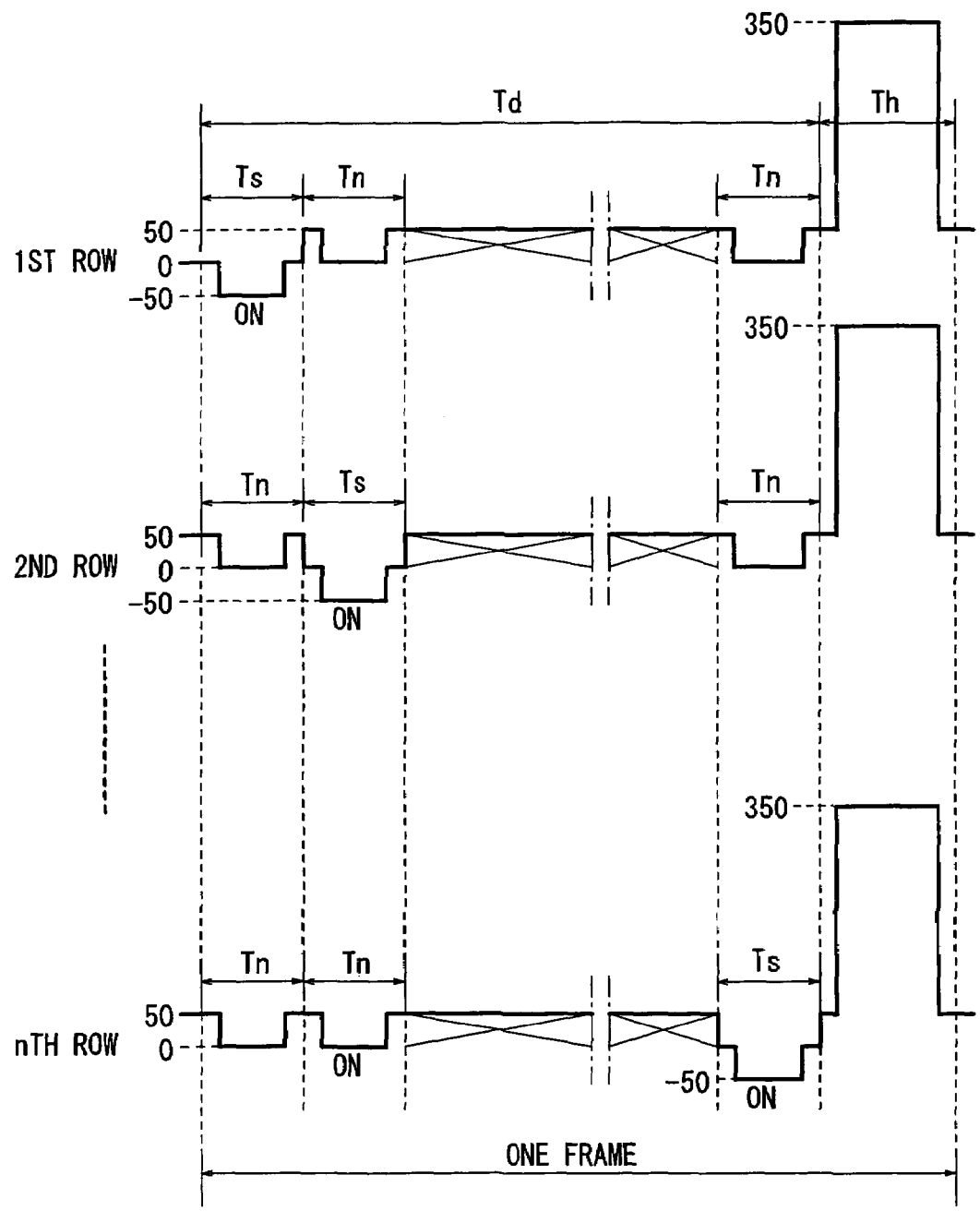
FIG. 27 is a timing chart illustrative of a first drive method.

A first drive method will first be described below with reference to FIGS. 27 and 28. FIG. 27 shows operation of pixels in the first row and the first column, the second row and the first column, and the nth row and the first column. The electron emitter 12 used in the first drive method has such characteristics that the coercive voltage v1 at the point p2 shown in FIG. 5 is −20 V, for example, the coercive voltage v2 at the point p5 is +70 V, the voltage v3 at the point p3 is −50 V, and the voltage v4 at the point p4 is +50 V.

As shown in FIG. 27, if the period in which to display one image is defined as one frame, then one charge accumulation period Td and one light emission period Th are included in one frame, and n selection periods Ts are included in one charge accumulation period Td. Since each selection period Ts becomes a selection period Ts for a corresponding row, it becomes a non-selection period Tn for non-corresponding n−1 rows.

According to the first drive method, all the electron emitters 12 are scanned in the charge accumulation period Td, and voltages depending on the luminance levels of corresponding pixels are applied to a plurality of electron emitters 12 which correspond to pixels to be turned on (to emit light), thereby accumulating charges (electrons) in amounts depending on the luminance levels of the corresponding pixels in the electron emitters 12 which correspond to the pixels to be turned on. In the next light emission period Th, a constant voltage is applied to all the electron emitters 12 to cause the electron emitters 12 which correspond to the pixels to be turned on to emit electrons in amounts depending on the luminance levels of the corresponding pixels, thereby emitting light from the pixels to be turned on.

More specifically, as shown in FIG. 28, in the selection period Ts for the first row, a selection signal Ss of 50 V, for example, is supplied to the row selection line 18 of the first row, and a non-selection signal Sn of 0 V, for example, is applied to the row selection lines 18 of the other rows. A pixel signal Sd supplied to the signal lines 20 of the pixels to be turned on (to emit light) of all the pixels of the first row has a voltage in the range from 0 V to 30 V, depending on the luminance levels of the corresponding pixels. If the luminance level is maximum, then the voltage of the pixel signal Sd is 0 V. The pixel signal Sd is modulated depending on the luminance level by the amplitude modulating circuit 34 shown in FIG. 1 or the pulse width modulating circuit 38 shown in FIG. 3.

Thus, a voltage ranging from −50 V to −20 V depending on the luminance level is applied between the upper and lower electrodes 42, 44 of the electron emitter 12 which corresponds to each of the pixels to be turned on in the first row. As a result, each electron emitter 12 accumulates electrons depending on the applied voltage. For example, the electron emitter 12 corresponding to the pixel in the first row and the first column is in a state at the point p3 shown in FIG. 5 as the luminance level of the pixel is maximum, and the portion of the emitter 40 which is exposed through the through region 46 of the upper electrode 42 accumulates a maximum amount of electrons.

A pixel signal Sd supplied to the electron emitters 12 which correspond to pixels to be turned off (to extinguish light) has a voltage of 50 V, for example. Therefore, a voltage of 0 V is applied to the electron emitters 12 which correspond to pixels to be turned off, bringing those electron emitters 12 into a state at the point p1 shown in FIG. 5, so that no electrons are accumulated in those electron emitters 12.

After the supply of the pixel signal Sd to the first row is finished, in the selection period Ts for the second row, a selection signal Ss of 50 V is supplied to the row selection line 18 of the second row, and a non-selection signal Sn of 0 V is applied to the row selection lines 18 of the other rows. In this case, a voltage ranging from −50 V to −20 V depending on the luminance level is also applied between the upper and lower electrodes 42, 44 of the electron emitter 12 which corresponds to each of the pixels to be turned on. At this time, a voltage ranging from 0 V to 50 V is applied between the upper and lower electrodes 42, 44 of the electron emitter 12 which corresponds to each of unselected pixels in the first row, for example. Since this voltage is of a level not reaching the point 4 in FIG. 5, no electrons are emitted from the electron emitters 12 which correspond to the pixels to be turned on in the first row. That is, the unselected pixels in the first row are not affected by the pixel signal that is supplied to the selected pixels in the second row.

Similarly, in the selection period Ts for the nth row, a selection signal Ss of 50 V is supplied to the row selection line 18 of the nth row, and a non-selection signal Sn of 0 V is applied to the row selection lines 18 of the other rows. In this case, a voltage ranging from −50 V to −20 V depending on the luminance level is also applied between the upper and lower electrodes 42, 44 of the electron emitter 12 which corresponds to each of the pixels to be turned on. At this time, a voltage ranging from 0 V to 50 V is applied between the upper and lower electrodes 42, 44 of the electron emitter 12 which corresponds to each of unselected pixels in the first through (n−1)th rows. However, no electrons are emitted from the electron emitters 12 which correspond to the pixels to be turned on, of those unselected pixels.

Figure 12C:
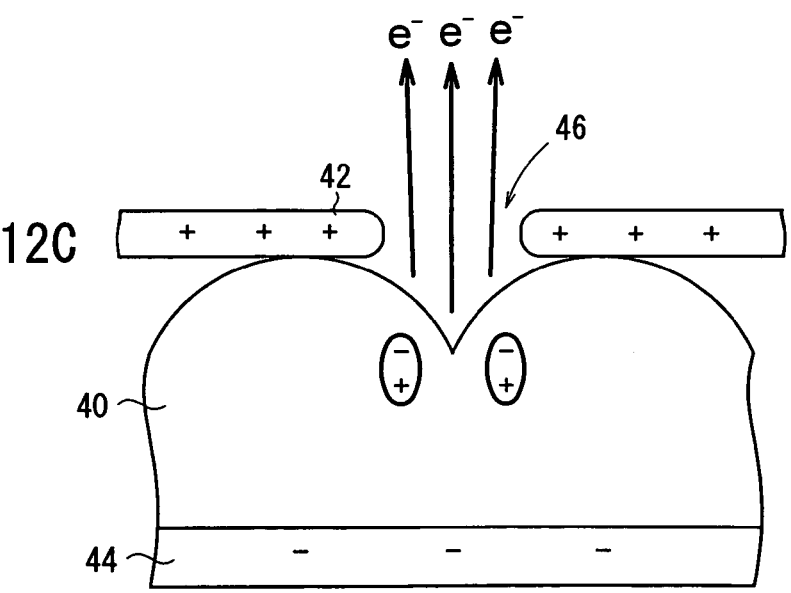
FIG. 12C is a view illustrative of a state from the point p4 to a point p6 shown in FIG. 5.

After elapse of the selection period Ts for the nth row, it is followed by the light emission period Th. In the light emission period Th, a reference voltage (e.g., 0 V) is applied from the signal supplying circuit 24 to the upper electrodes 42 of all the electron emitters 12, and a voltage of −350 V (the sum of the voltage of −400 V from the pulse power supply 30 and the power supply voltage 50 V from the row selecting circuit 22) is applied to the lower electrodes 44 of all the electron emitters 12. Thus, a high voltage (+350 V) is applied between the upper and lower electrodes 42, 44 of all the electron emitters 12. All the electron emitters 12 are now brought into a state at the point p6 shown in FIG. 5. As shown in FIG. 12C, electrons are emitted from the portion of the emitter 40 where the electrons have been accumulated, through the through region 46. Electrons are also emitted from near the outer peripheral portion of the upper electrode 42.

Electrons are thus emitted from the electron emitters 12 which correspond to the pixels to be turned on, and the emitted electrons are led to the collector electrodes 62 which correspond to those electron emitters 12, exciting the corresponding phosphors 64 which emit light. In this manner, an image is displayed on the surface of the transparent plate 60.

Subsequently, electrons are accumulated in the electron emitters 12 which correspond to the pixels to be turned on (to emit light) in the charge accumulation period Td, and the accumulated electrons are emitted for fluorescent light emission in the light emission period Th, for thereby displaying a moving image or a still image on the surface of the transparent plate 60.

Figure 29:
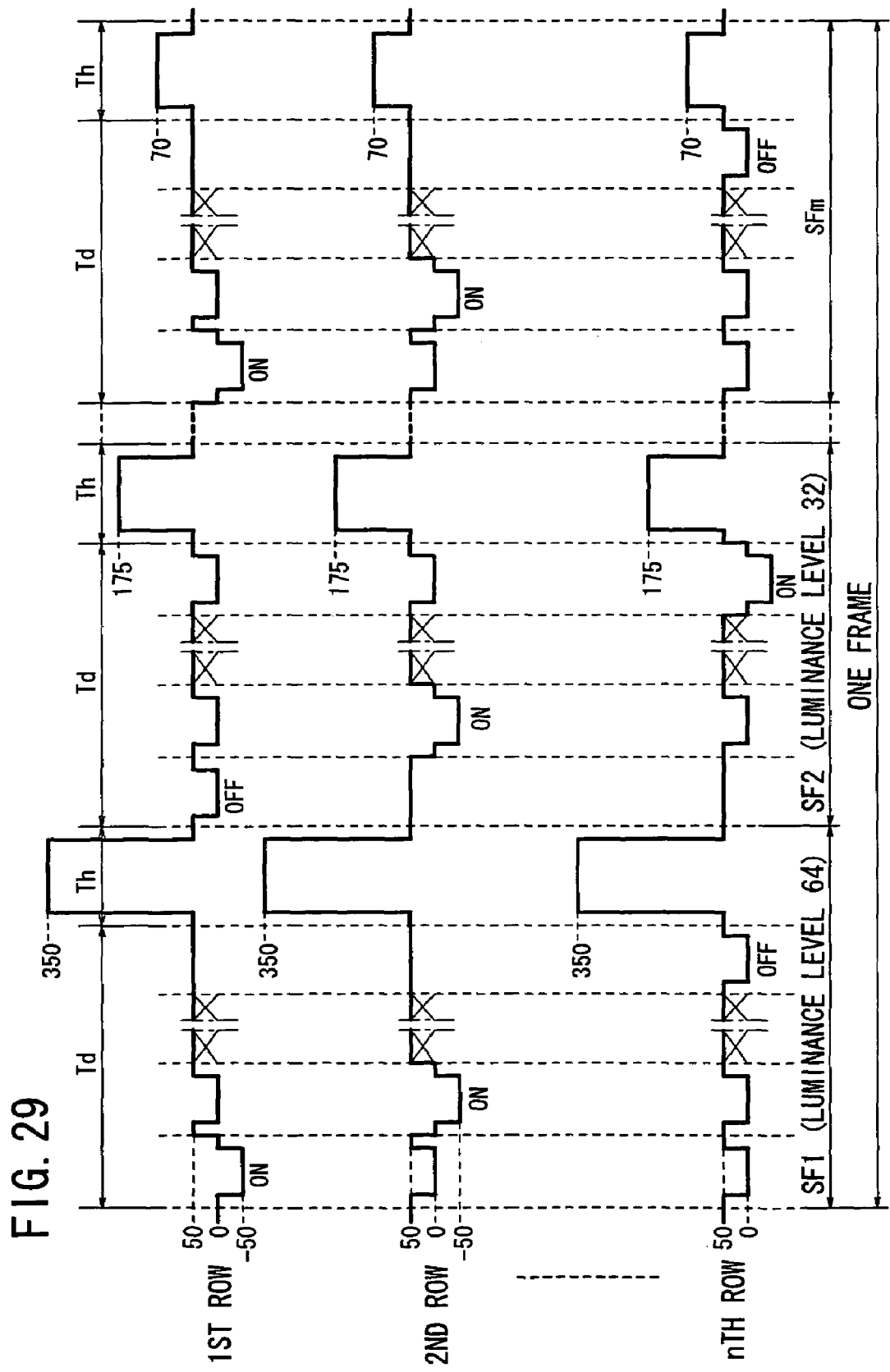
FIG. 29 is a timing chart illustrative of a second drive method.

A second drive method will be described below with reference to FIGS. 29 through 31. According to the second drive method, as shown in FIG. 29, one frame is divided into a plurality of periods referred to as subfields SF1, SF2, . . . , SFm, respectively, each including one charge accumulation period Td and one light emission period Th. The subfields SF1, SF2, . . . , SFm have the same time intervals.

The luminance level assigned to the first subfield (the subfield SF1) is highest, and is progressively lowered as the subfields elapse successively.

According to the second drive method, all the electron emitters 12 are scanned in the charge accumulation period Td, and a constant voltage is applied to electron emitters 12 to be turned on, thereby accumulating a constant amount of charges in the electron emitters 12 to be turned on. In the next light emission period Th, voltages depending on the luminance levels assigned to the subfield (the subfield being currently scanned) are applied to all the electron emitters 12 to cause a plurality of electron emitters 12 which correspond to the pixels to be turned on to emit electrons in amounts depending on the luminance levels assigned to the subfield, thereby emitting light from the pixels to be turned on. The second drive method employs a combination of the pulse number modulating process and the amplitude modulating process (the amplitude modulation of the voltage in the light emission period Th).

Figure 30:
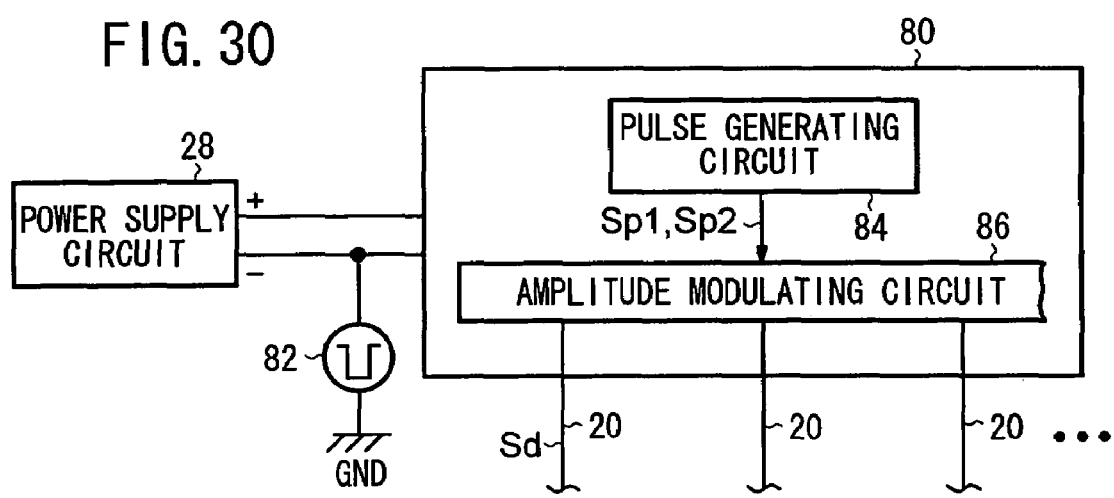
FIG. 30 is a block diagram of a signal supply circuit used in the second drive method.

The second drive method employs a signal supplying circuit 80 shown in FIG. 30. A pulse power supply 82 is connected between a negative line between the signal supplying circuit 80 and the power supply circuit 28, and GND (ground). The pulse power supply 82 outputs a pulsed voltage waveform having a voltage of 0 V, for example, during the charge accumulation period Td, and a voltage of −330 V, for example, during the light emission period Th.

A pulse generating circuit 84 generates and outputs a pulse signal Sp1 having a constant pulse period and a constant amplitude (e.g., 50 V) during the charge accumulation period Td, and also generates and outputs a pulse signal Sp2 having a constant pulse period and a constant amplitude (e.g., −280 V) during the light emission period Th.

As shown in FIG. 31, in the charge accumulation period Td, an amplitude modulating circuit 86 is controlled by the signal control circuit 26 to amplitude-modulate the voltage of the pulse signal Sp1 to be applied to the pixels to be turned on of the selected pixels into 0 V, for example, amplitude-modulate the voltage of the pulse signal Sp1 to be applied to the pixels to be turned off of the selected pixels into 50 V, for example, and output the signals as the pixel signal Sd.

Therefore, as shown in FIG. 29, a voltage of −50 V is applied to the electron emitters 12 which correspond to the pixels to be turned on of the selected pixels, and a voltage of 0 V is applied to the electron emitters 12 which correspond to the pixels to be turned off. A voltage of 0 V or 50 V is applied to the electron emitters 12 which correspond to the unselected pixels.

In the light emission period Th, the amplitude modulating circuit 86 is controlled by the signal control circuit 26 to amplitude-modulate the voltage into a voltage depending on the luminance level in the present subfield. In this example, as shown in FIG. 31, the voltage is amplitude-modulated in the range from −280 V to 0 V. For example, in the light emission period Th of the first subfield SF1, the amplitude modulating circuit 86 applies a voltage of 0 V through the signal lines 20 to the upper electrodes 42 of all the electron emitters 12. In the light emission period Th of the second subfield SF2, the amplitude modulating circuit 86 applies a voltage of −175 V to the upper electrodes 42 of all the electron emitters 12. In the light emission period Th of the mth subfield SFm, the amplitude modulating circuit 86 applies a voltage of −280 V to the upper electrodes 42 of all the electron emitters 12. In the light emission periods Th of the subfields SF1, SF2, . . . , SFm, the row selecting circuit 22 applies a voltage of −350 V through all the row select lines 18 to the lower electrodes 44 of all the electron emitters 12.

Accordingly, as shown in FIG. 29, in the light emission period Th of the first subfield SF1, a voltage of 350 V is applied to all the electron emitters 12. In the light emission period Th of the second subfield SF2, a voltage of 175 V is applied to all the electron emitters 12. In the light emission period Th of the mth subfield SFm, a voltage of 70 V is applied to all the electron emitters 12.

Specifically, only the first subfield SF1 and the second subfield SF2 will be considered below. If the luminance level of the first subfield SF1 is 64, for example, and the luminance level of the second subfield SF2 is 32, the pixel in the first row and the first column has a luminance level of 64 because the first subfield SF1 is turned on and the second subfield SF2 is turned off. The pixel in the second row and the first column has a luminance level of 64+32=96 because the first subfield SF1 is turned on and the second subfield SF2 is turned on. Similarly, the pixel in the nth row and the first column has a luminance level of 32 because the first subfield SF1 is turned off and the second subfield SF2 is turned on.

In this manner, in each subfield, a constant amount of electrons are accumulated in the electron emitters 12 which correspond to the pixels to be turned on (to emit light) in the charge accumulation period Td, and a voltage depending on the luminance level of the subfield is applied to emit the accumulated electrons for fluorescent light emission in the light emission period Th, for thereby displaying a moving image or a still image on the surface of the transparent plate 60.

Figure 32:
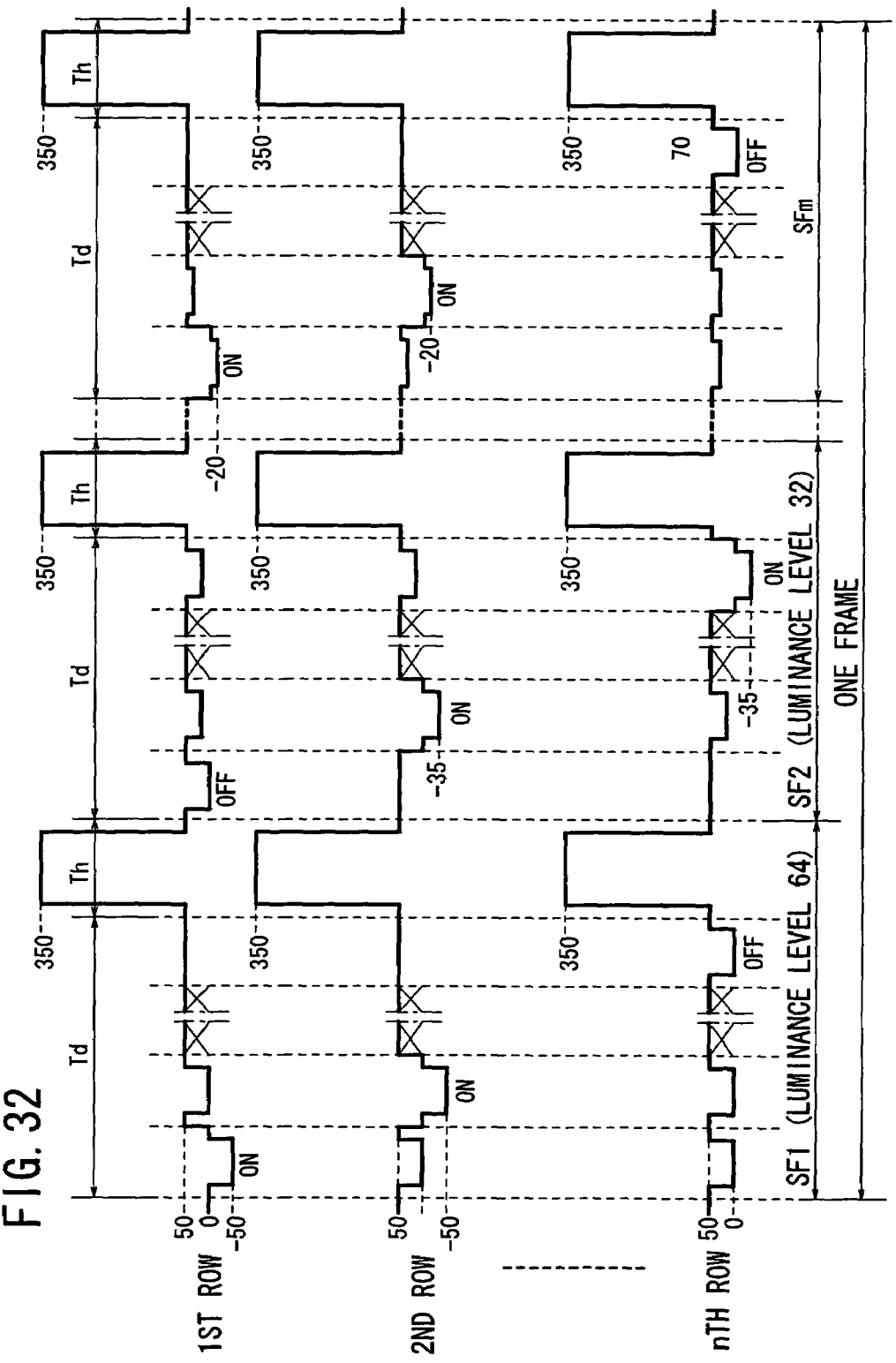
FIG. 32 is a timing chart illustrative of a third drive method.

A third drive method will be described below with reference to FIGS. 32 and 33. According to the third drive method, as shown in FIG. 32, the concept of subfields is employed as with the second drive method. The subfields SF1, SF2, . . . , SFm have the same time intervals. The luminance level assigned to the first subfield (the subfield SF1) is highest, and is progressively lowered as the subfields elapse successively.

According to the third drive method, all the electron emitters 12 are scanned in the charge accumulation period Td, and voltages depending on the luminance levels assigned to a subfield are applied to electron emitters 12 to be turned on, thereby accumulating charges in amounts depending on the luminance levels assigned to the subfield in the electron emitters 12 to be turned on. In the next light emission period Th, a constant voltage is applied to all the electron emitters 12 to cause the electron emitters 12 which correspond to the pixels to be turned on to emit electrons in amounts depending on the luminance levels assigned to the subfield, thereby emitting light from the pixels to be turned on. The third drive method employs a combination of the pulse number modulating process and the amplitude modulating process (the amplitude modulation of the voltage in the charge accumulation period) or a combination of the pulse number modulating process and the pulse width modulating process (the pulse width modulation of the voltage in the charge accumulation period).

The third drive method employs the signal supplying circuit 24, 24*a* shown in FIG. 1 or 3. If the amplitude modulating circuit 34 shown in FIG. 1, for example, is employed, then in the charge accumulation period Td as shown in FIG. 33, the amplitude modulating circuit 34 is controlled by the signal control circuit 26 to amplitude-modulate the voltage of the pulse signal Sp to be applied to the pixels to be turned on of the selected pixels into a voltage depending on the luminance level of the present subfield, and outputs the modulated voltage as the pixel signal Sd. In this example, the voltage is amplitude-modulated in a range from 0 V to 30 V.

Accordingly, as shown in FIG. 32, in the charge accumulation period Td of the first subfield SF1, a voltage of 0 V is applied to the upper electrodes 42 of the electron emitters 12 which correspond to the pixels to be turned on when all the electron emitters 12 are scanned. In the charge accumulation period Td of the second subfield SF2, a voltage of 15 V is applied to the upper electrodes 42 of the electron emitters 12 which correspond to the pixels to be turned on. In the charge accumulation period Td of the mth subfield SFm, a voltage of 30 V is applied to the upper electrodes 42 of the electron emitters 12 which correspond to the pixels to be turned on.

Therefore, as shown in FIG. 32, in the charge accumulation period Td of the first subfield SF1, a voltage of −50 V is applied to the electron emitters 12 which correspond to the pixels to be turned on. In the charge accumulation period Td of the second subfield SF2, a voltage of −35 V is applied to the electron emitters 12 which correspond to the pixels to be turned on. In the charge accumulation period Td of the mth subfield SFm, a voltage of −20 V is applied to the electron emitters 12 which correspond to the pixels to be turned on.

In the light emission periods Th of the subfields SF1, SF2, . . . , SFm, the amplitude modulating circuit 34 applies a voltage of 0 V through the signal lines 20 to the upper electrodes 42 of all the electron emitters 12, and the row selecting circuit 22 applies a voltage of −350 V through all the row select lines 18 to the lower electrodes 44 of all the electron emitters 12. Thus, a voltage of 350 V is applied to all the electron emitters 12 in the light emission periods Th of the subfields SF1, SF2, . . . , SFm.

In this manner, in each subfield, an amount of electrons depending on the luminance level of the subfield are accumulated in the electron emitters 12 which correspond to the pixels to be turned on (to emit light) in the charge accumulation period Td, and the accumulated electrons are emitted for fluorescent light emission in the light emission period Th, for thereby displaying a moving image or a still image on the surface of the transparent plate 60.

A fourth drive method will be described below with reference to FIGS. 34 through 36. According to the fourth drive method, one frame is divided into a plurality of periods, each having the same luminance level, referred to as linear subfields LSF1, LSF2, . . . , LSFm, respectively, each including one charge accumulation period Td and one light emission period Th. The linear subfields LSF1, LSF2, . . . , LSFm have the same time intervals.

According to the fourth drive method, all the electron emitters 12 are scanned in the charge accumulation period Td, and a constant voltage is applied to electron emitters 12 to be turned on in a linear subfield (a linear subfield being presently scanned), thereby accumulating a constant amount of charges in the electron emitters 12 to be turned on in the linear subfield. In the next light emission period Th, a constant voltage is applied to all the electron emitters 12 to cause a plurality of electron emitters 12 which correspond to the pixels to be turned on in the linear subfield to emit electrons in a constant amount, thereby emitting light from the pixels to be turned on. The fourth drive method employs the pulse number modulating process.

Figure 35:
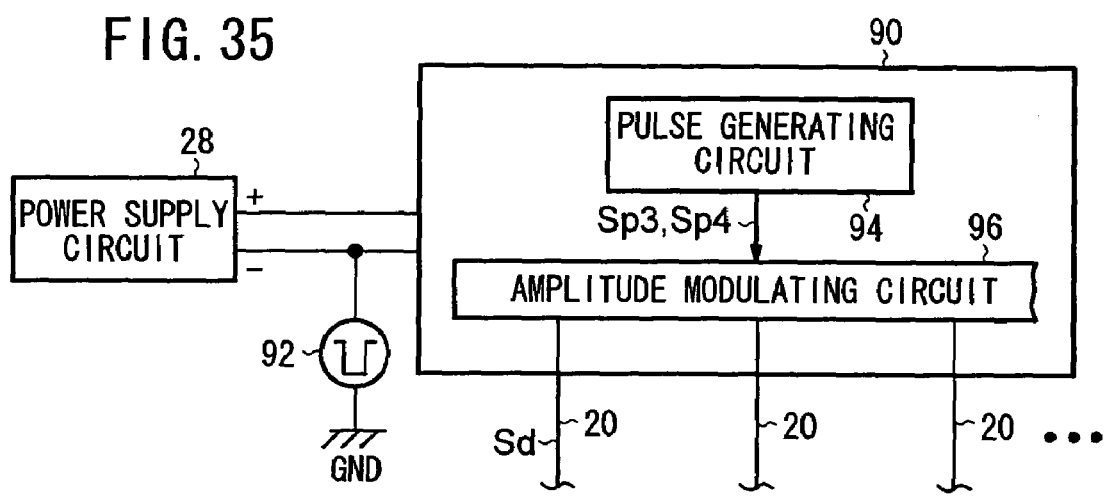
FIG. 35 is a block diagram of a signal supply circuit used in the fourth drive method.

The fourth drive method employs a signal supplying circuit 90 shown in FIG. 35. A pulse power supply 92 is connected between a negative line between the signal supplying circuit 90 and the power supply circuit 28, and GND (ground). The pulse power supply 92 outputs a pulsed voltage waveform having a voltage of 0 V, for example, during the charge accumulation period Td, and a voltage of −200 V, for example, during the light emission period Th.

A pulse generating circuit 94 generates and outputs a pulse signal Sp3 having a constant pulse period and a constant amplitude (e.g., 50 V) during the charge accumulation period Td, and also generates and outputs a pulse signal Sp4 having a constant pulse period and a constant amplitude (e.g., −150 V) during the light emission period Th.

As shown in FIG. 36, in the charge accumulation period Td, an amplitude modulating circuit 96 is controlled by the signal control circuit 26 to amplitude-modulate the voltage of the pulse signal Sp3 to be applied to the pixels to be turned on of the selected pixels into 0 V, for example, amplitude-modulate the voltage of the pulse signal Sp3 to be applied to the pixels to be turned off of the selected pixels into 50 V, for example, and output the signals as the pixel signal Sd.

Figure 34:
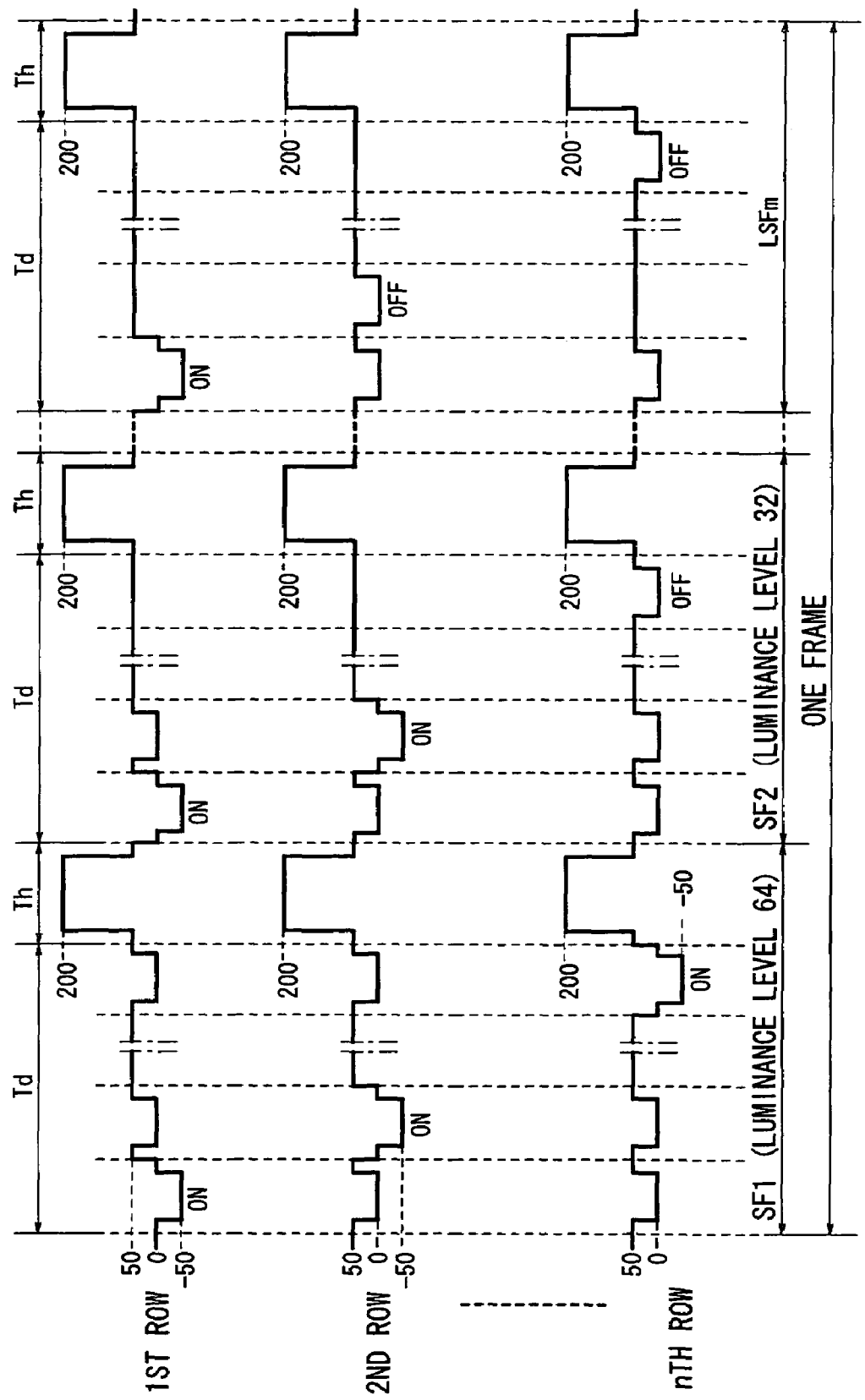
FIG. 34 is a timing chart illustrative of a fourth drive method.

Therefore, as shown in FIG. 34, a voltage of −50 V is applied to the electron emitters 12 which correspond to the pixels to be turned on of the selected pixels, and a voltage of 0 V is applied to the electron emitters 12 which correspond to the pixels to be turned off. A voltage of 0 V or 50 V is applied to the electron emitters 12 which correspond to the unselected pixels.

In the light emission periods Th of the linear subfields LSF1, LSF2, . . . , LSFm, the amplitude modulating circuit 96 applies a voltage of −150 V through the signal lines 20 to the upper electrodes 42 of all the electron emitters 12, and the row selecting circuit 22 applies a voltage of −350 V through all the row select lines 18 to the lower electrodes 44 of all the electron emitters 12. In the light emission periods Th of the linear subfields LSF1, LSF2, . . . , LSFm, therefore, a voltage of 200 V is applied to all the electron emitters 12. If the signal supplying circuit 90 is designed to apply a voltage of 350 V to all the electron emitters 12 in the light emission periods Th, then the signal supplying circuit 24 shown in FIG. 1 can be employed.

Each pixel is turned on in the charge accumulation periods Td of a succession of linear subfields LSF1, LSF2, . . . , LSFm depending on the corresponding luminance level, and is turned off in the charge accumulation periods Td of the remaining linear subfields.

For example, as shown in FIG. 34, if the luminance level of the pixel in the first row and the first column is "64", then a voltage of −50 V is applied to the electron emitter 12 which corresponds to the pixel in the charge accumulation periods Td of a number of successive linear subfields depending on the luminance level "64", causing the electron emitter 12 to emit light in the light emission periods Th. If the luminance level of the pixel in the second row and the first column is "32", then a voltage of −50 V is applied to the electron emitter 12 which corresponds to the pixel in the charge accumulation periods Td of a number of successive linear subfields depending on the luminance level "32" (which number is half the number corresponding to the luminance level "64"), causing the electron emitter 12 to emit light in the light emission periods Th. If the luminance level of the pixel in the nth row and the first column is "8", then a voltage of −50 V is applied to the electron emitter 12 which corresponds to the pixel in the charge accumulation periods Td of a number of successive linear subfields depending on the luminance level "8" (which number is ⅛ of the number corresponding to the luminance level "64"), causing the electron emitter 12 to emit light in the light emission periods Th.

In this manner, in each linear subfield, a constant amount of electrons are accumulated in the electron emitters 12 which correspond to the pixels to be turned on (to emit light) in the charge accumulation period Td, and the accumulated electrons are emitted for fluorescent light emission in the light emission period Th, for thereby displaying a moving image or a still image on the surface of the transparent plate 60.

A fifth drive method will be described below with reference to FIGS. 37 through 39. According to the fifth drive method, one frame includes one charge accumulation period Td and one light emission period Th, as with the first drive method.

In the description which follows, it is assumed that the electron emitter 12 has such characteristics that the coercive voltage v1 at the point p2 shown in FIG. 5 is −20 V, for example, the coercive voltage v2 at the point p5 is +140 V, the voltage v3 at the point p3 is −70 V, and the voltage v4 at the point p4 is +110 V.

According to the fifth drive method, in the charge accumulation period Td, a constant voltage is applied to all the electron emitters 12 to accumulate a constant amount of charges in all the electron emitters 12. In the next light emission period Th, all the electron emitters 12 are scanned, and voltages depending on the luminance levels of corresponding pixels to be turned on are applied to a plurality of electron emitters 12 which correspond to the pixels to be turned on, causing the electron emitters 12 which correspond to the pixels to be turned on to emit amounts of electrons depending on the luminance levels of the corresponding pixels thereby to emit light from the pixels to be turned on. The fifth drive method employs the amplitude modulating process (the amplitude modulation of the voltage in the light emission period Th).

Figure 38:
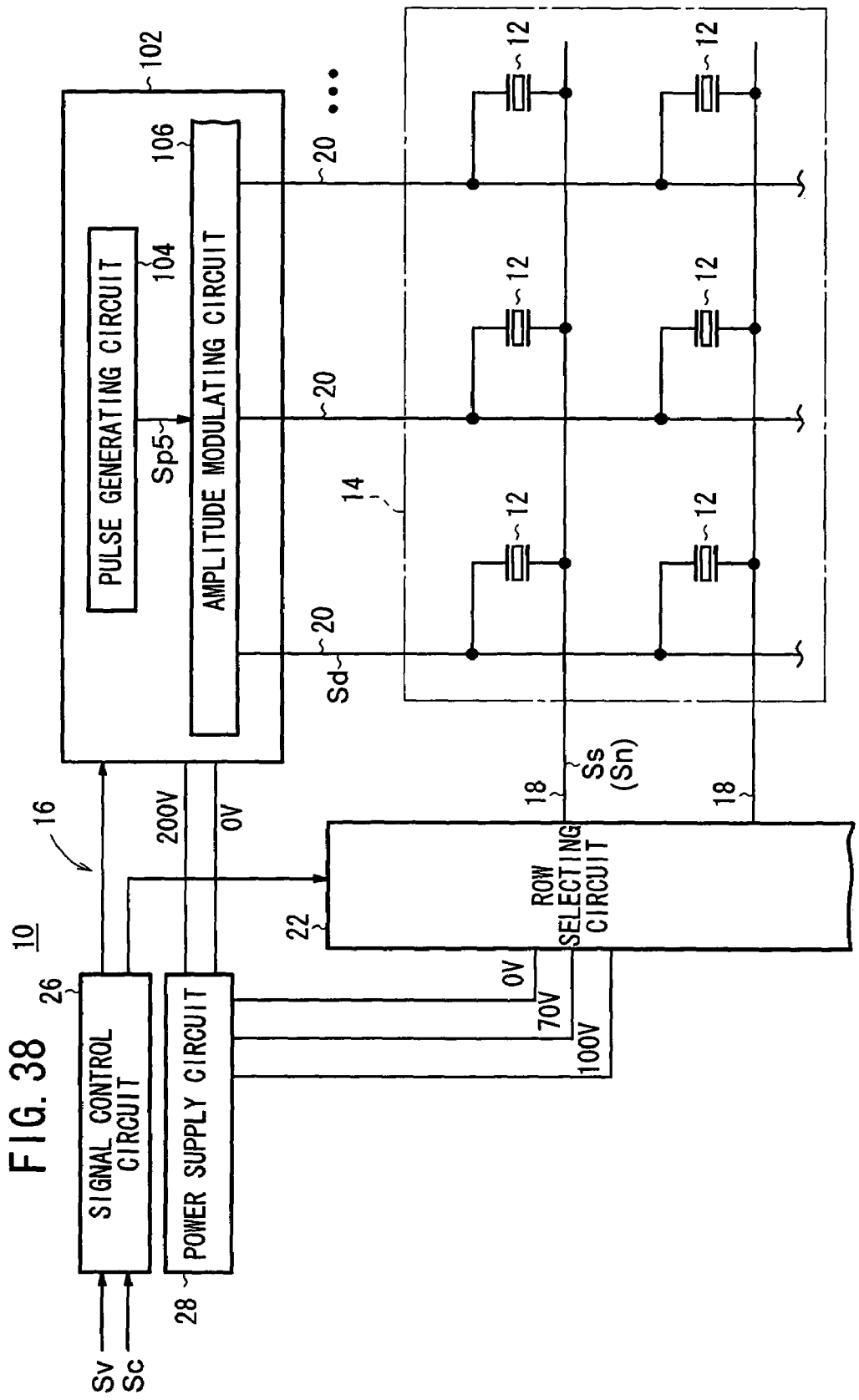
FIG. 38 is a block diagram of a row selecting circuit and a signal supplying circuit used in the fifth drive method.

The fifth drive method employs a row selecting circuit 100 and a signal supplying circuit 102 shown in FIG. 38. The row selecting circuit 100 is supplied with voltages of 100 V, 70 V, and 0 V, for example, from the power supply circuit 28. The signal supplying circuit 102 is supplied with voltages of 200 V and 0 V, for example, from the power supply circuit 28.

As shown in FIG. 39, the row selecting circuit 100 outputs a constant voltage (e.g., 70 V) in the charge accumulating period Td. In the light emission period Th, the row selecting circuit 100 outputs a voltage of 0 V, for example, to the selected rows, and outputs a voltage of 100 V, for example, to the unselected rows.

A pulse generating circuit 104 of the signal supplying circuit 102 outputs a reference voltage (e.g., 0 V) during the charge accumulation period Td, and generates and outputs a pulse signal Sp5 having a constant period and a constant amplitude (e.g., 200 V) during the light emission period Th.

An amplitude modulating circuit 106 outputs the reference voltage from the pulse generating circuit 104 as it is in the charge accumulation period Td. In the light emission period Th, the amplitude modulating circuit 106 amplitude-modulates the voltage of the pulse signal Sp5 to be applied to the pixels to be turned on of the selected pixels in a range from 110 V to 200 V depending on the luminance levels of those pixels, amplitude-modulates the voltage of the pulse signal Sp5 be applied to the pixels to be turned off into a voltage of 100 V, for example, and outputs the signals as the pixel signal Sd.

Figure 37:
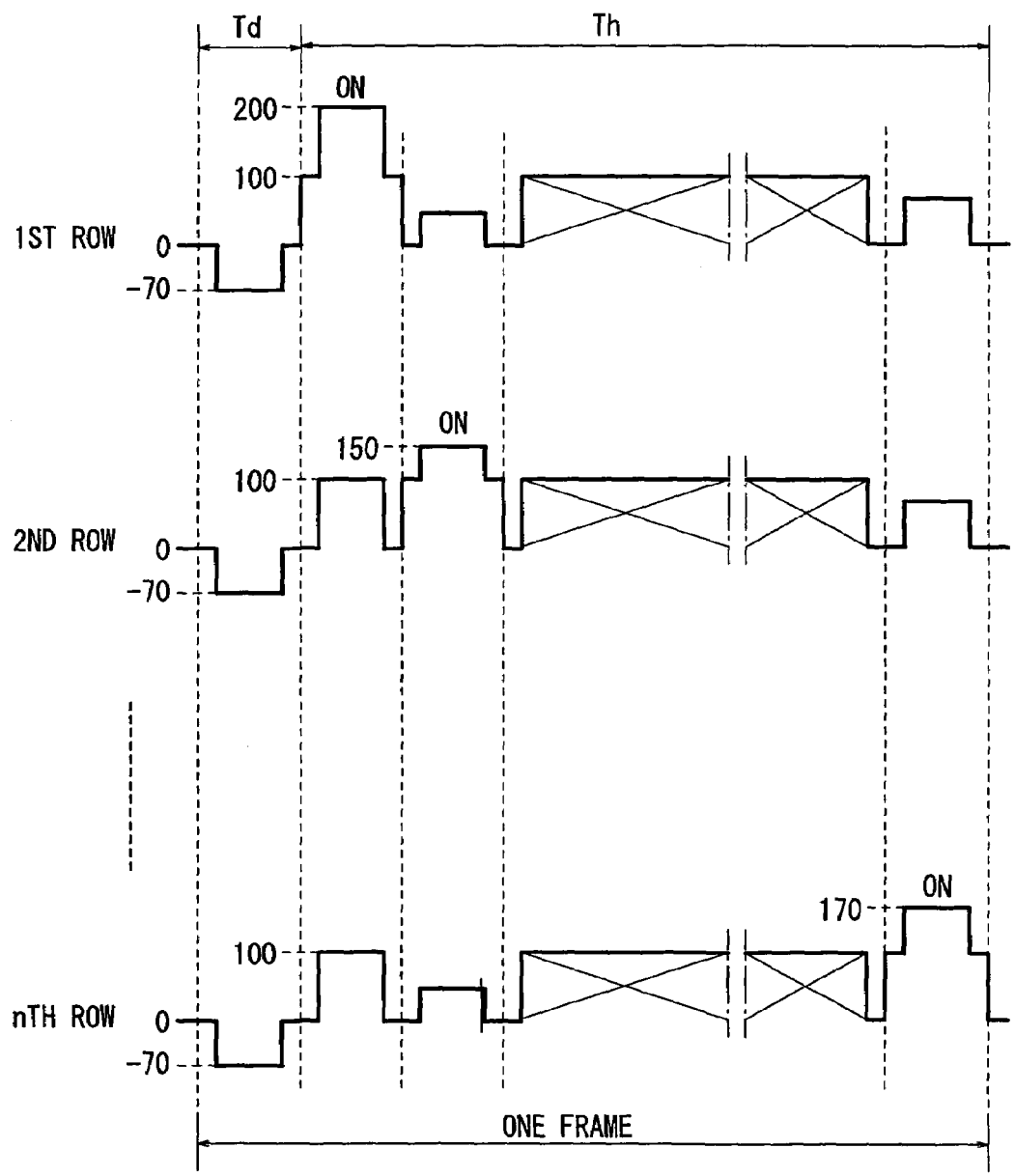
FIG. 37 is a timing chart illustrative of a fifth drive method.

In this manner, as shown in FIG. 37, in the charge accumulation period Td, a voltage of −70 V is applied to all the electron emitters 12 to accumulate a constant amount of charges (electrons) in all the electron emitters 12.

In the next light emission period Th, a voltage ranging from 110 V to 200 V depending on the luminance level is applied to the electron emitters 12 which correspond to the pixels to be turned on of the selected pixels, and a voltage of 100 V is applied to the electron emitters 12 which correspond to the pixels to be turned off, not shown. A voltage ranging from 10 V to 100 V is applied to the electron emitters 12 which correspond to the unselected pixels.

In the example shown in FIG. 37, a voltage of 200 V is applied to the electron emitter 12 which corresponds to the pixel in the first row and the first column to cause the electron emitter 12 to emit light at a luminance level of "64". A voltage of 150 V is applied to the electron emitter 12 which corresponds to the pixel in the second row and the first column to cause the electron emitter 12 to emit light at a luminance level of "32". A voltage of 170 V is applied to the electron emitter 12 which corresponds to the pixel in the nth row and the first column to cause the electron emitter 12 to emit light at a luminance level of "48". Though a voltage ranging from 10 V to 100 V is applied to the electron emitters 12 which correspond to the unselected pixels, since this voltage is of a level not reaching the point 4 (110 V in this example) in FIG. 5, no electrons are emitted from the electron emitters 12 which correspond to the unselected pixels. That is, the unselected pixels are not affected by the pixel signal Sd that is supplied to the selected pixels.

In this manner, in each subfield, a constant amount of electrons are accumulated in the electron emitters 12 which correspond to the pixels to be turned on (to emit light) in the charge accumulation period Td, and voltages depending on the luminance levels of the pixels to be turned on are applied to emit the accumulated electrons for fluorescent light emission in the light emission period Th, for thereby displaying a moving image or a still image on the surface of the transparent plate 60.

Figure 40:
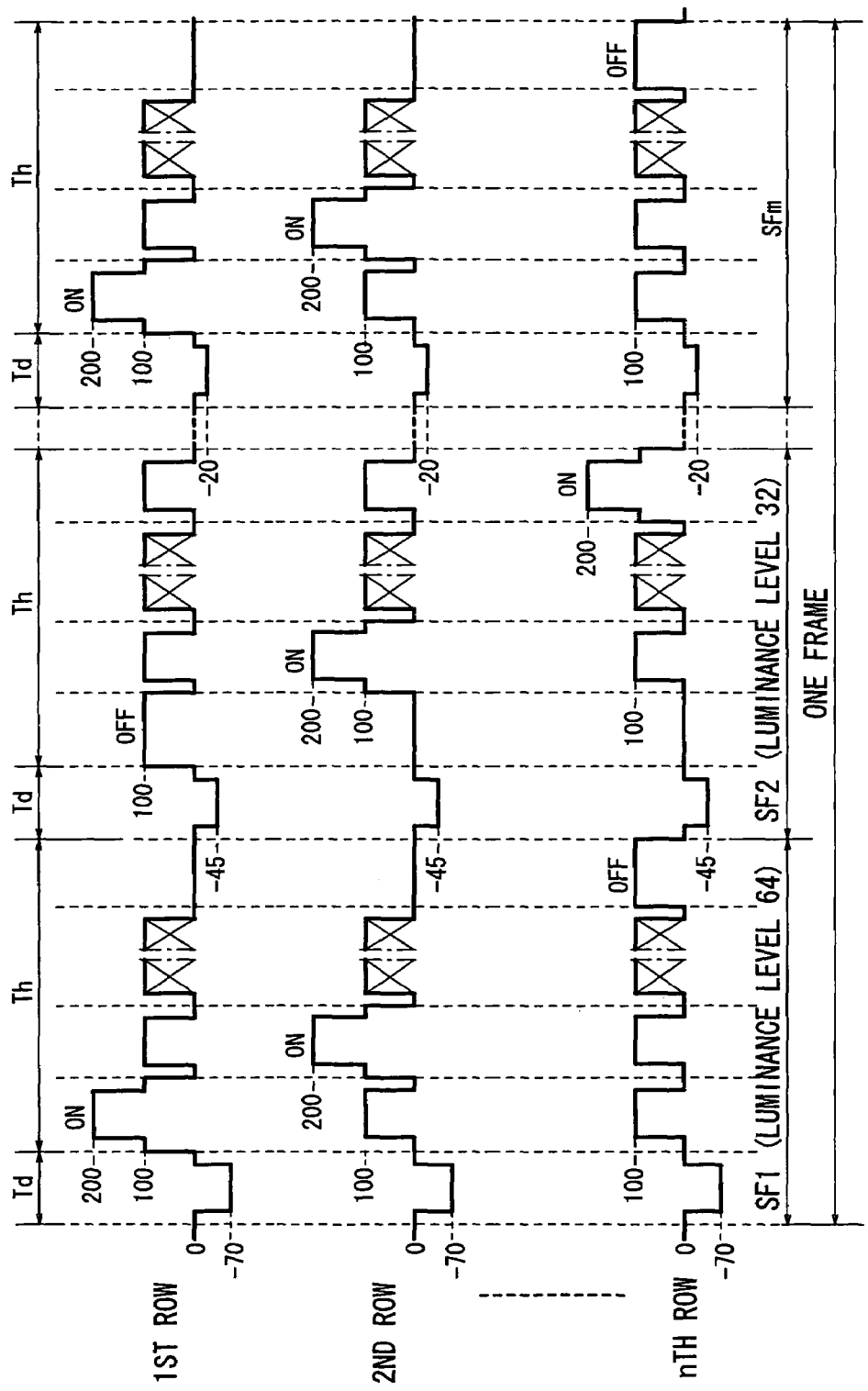
FIG. 40 is a timing chart illustrative of a sixth drive method.

A sixth drive method will be described below with reference to FIGS. 40 and 41. According to the sixth drive method, as shown in FIG. 40, the concept of subfields is employed as with the second drive method. The subfields SF1, SF2, . . . , SFm have the same time intervals. The luminance level assigned to the first subfield (the subfield SF1) is highest, and is progressively lowered as the subfields elapse successively.

According to the sixth drive method, voltages depending on the luminance levels assigned to a subfield are applied to all the electron emitters 12, thereby accumulating charges in amounts depending on the luminance levels assigned to the subfield in all the electron emitters .12. In the next light emission period Th, all the electron emitters 12 are scanned, and a constant voltage is applied to the electron emitters 12 to be turned on to cause the electron emitters 12 which correspond to the pixels to be turned on to emit electrons in amounts depending on the luminance levels assigned to the subfield, thereby emitting light from the pixels to be turned on. The sixth drive method employs a combination of the pulse number modulating process and the amplitude modulating process (the amplitude modulation of the voltage in the charge accumulation period Td) or a combination of the pulse number modulating process and the pulse width modulating process (the pulse width modulation of the voltage in the charge accumulation period Td).

The sixth drive method can employ the signal supplying circuit 102 shown in FIG. 38. In particular, the sixth drive method can employ the amplitude modulating circuit 34 shown in FIG. 1 or the pulse width modulating circuit 38 shown in FIG. 3. If the amplitude modulating circuit 34 shown in FIG. 1, for example, is employed, then in the charge accumulation period Td, the amplitude modulating circuit 34 is controlled by the signal control circuit 26 to amplitude-modulate the voltages of all the pulse signals Sp5 into a voltage depending on the luminance level of the present subfield, and output the modulated voltages as the pixel signal Sd. In this example, the voltages are amplitude-modulated in a range from 0 V to 50 V.

Accordingly, as shown in FIG. 40, in the charge accumulation period Td of the first subfield SF1, a voltage of 0 V is applied to the upper electrodes 42 of all the electron emitters 12. In the charge accumulation period Td of the second subfield SF2, a voltage of 25 V is applied to the upper electrodes 42 of all the electron emitters 12. In the charge accumulation period Td of the mth subfield SFm, a voltage of 50 V is applied to the upper electrodes 42 of all the electron emitters 12.

Therefore, in the charge accumulation period Td of the first subfield SF1, a voltage of −70 V is applied to all the electron emitters 12. In the charge accumulation period Td of the second subfield SF2, a voltage of −45 V is applied to all the electron emitters 12. In the charge accumulation period Td of the mth subfield SFm, a voltage of −20 V is applied to all the electron emitters 12.

In the light emission periods Th of the subfields SF1, SF2, . . . , SFm, the amplitude modulating circuit 34 is controlled by the signal control circuit 26 to amplitude-modulate the voltage of the pulse signal Sp5 to be applied to the pixels to be turned on of the selected pixels into a voltage of 200 V, amplitude-modulate the voltage of the pulse signal Sp5 to be applied to the pixels to be turned off into a voltage of 100 V, and output the voltages as the pixel signal Sd.

Consequently, as shown in FIG. 41, the light emission periods Th of the subfields SF1, SF2, . . . , SFm, a voltage of 200 V is applied to the electron emitters 12 which correspond to the pixels to be turned on, and a voltage of 100 V is applied to the electron emitters 12 which correspond to the pixels to be turned off. A voltage of 0 V or 100 V is applied to the electron emitters 12 which are not selected.

Specifically, only the first subfield SF1 and the second subfield SF2 will be considered below. If the luminance level of the first subfield SF1 is 64, for example, and the luminance level of the second subfield SF2 is 32, the pixel in the first row and the first column has a luminance level of 64 because the first subfield SF1 is turned on and the second subfield SF2 is turned off. The pixel in the second row and the first column has a luminance level of 64+32=96 because the first subfield SF1 is turned on and the second subfield SF2 is turned on. Similarly, the pixel in the nth row and the first column has a luminance level of 32 because the first subfield SF1 is turned off and the second subfield SF2 is turned on.

In this manner, in each subfield, electrons depending on the luminance level of the subfield are accumulated in all the electron emitters 12 in the charge accumulation period Td, and the accumulated electrons in the pixels to be turned on (to emit light) are emitted for fluorescent light emission in the light emission period Th, for thereby displaying a moving image or a still image on the surface of the transparent plate 60.

Figure 42:
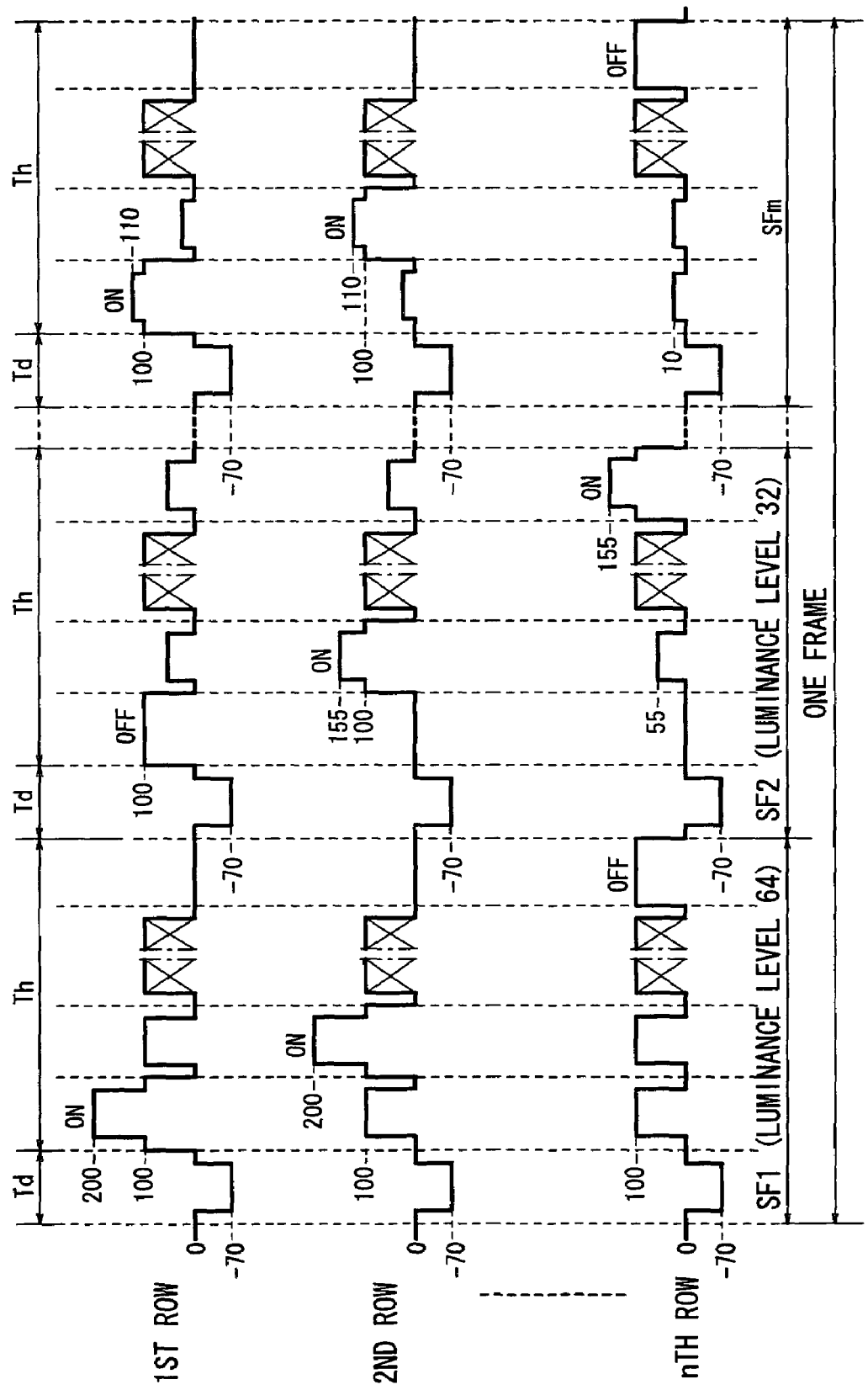
FIG. 42 is a timing chart illustrative of a seventh drive method.

A seventh drive method will be described below with reference to FIGS. 42 and 43. According to the seventh drive method, as shown in FIG. 42, the concept of subfields is employed as with the second drive method. The subfields SF1, SF2, . . . , SFm have the same time intervals. The luminance level assigned to the first subfield (the subfield SF1) is highest, and is progressively lowered as the subfields elapse successively.

According to the seventh drive method, a constant voltage is applied to all the electron emitters 12, thereby accumulating a constant amount of charges in all the electron emitters 12. In the next light emission period Th, all the electron emitters 12 are scanned, and voltages depending on the luminance levels assigned to a subfield are applied to the electron emitters 12 to be turned on, to cause the electron emitters 12 which correspond to the pixels to be turned on to emit electrons in amounts depending on the luminance levels assigned to the subfield, thereby emitting light from the pixels to be turned on. The seventh drive method employs a combination of the pulse number modulating process and the amplitude modulating process (the amplitude modulation of the voltage in the charge accumulation period Td).

The seventh drive method can employ the signal supplying circuit 102 shown in FIG. 38. As shown in FIG. 43, the amplitude modulating circuit 106 is controlled by the signal control circuit 26 to output the reference voltage from the pulse generating circuit 104 as it is in the charge accumulation period Td. In the light emission period Th, the amplitude modulating circuit 106 is controlled by the signal control circuit 26 to amplitude-modulate the voltage of the pulse signal Sp5 to be applied to the pixels to be turned on of the selected pixels in a range from 110 V to 200 V depending on the luminance level of the present subfield, amplitude-modulate the voltage of the pulse signal Sp5 be applied to the pixels to be turned off into a voltage of 100 V, for example, and output the signals as the pixel signal Sd.

Therefore, as shown in FIG. 42, in the charge accumulation period Td, a voltage of −70 V is applied to all the electron emitters 12, accumulating a constant amount of charges (electrons) in all the electron emitters 12.

In the next light emission period Th, as shown in FIG. 43, a voltage ranging from 110 V to 200 V depending on the luminance levels of the present subfield is applied to the electron emitters 12 which correspond to the pixels to be turned on of the selected pixels, and a voltage of 100 V is applied to the electron emitters 12 which correspond to the pixels to be turned off. For example, as shown in FIG. 42, in the light emission period Th of the first subfield SF1, a voltage of 200 V is applied to the electron emitters 12 which correspond to the pixels to be turned on. In the light emission period Th of the second subfield SF2, a voltage of 155 V is applied to the electron emitters 12 which correspond to the pixels to be turned on. In the light emission period Th of the mth subfield SFm, a voltage of 110 V is applied to the electron emitters 12 which correspond to the pixels to be turned on. A voltage ranging from 10 V to 100 V is applied to the electron emitters 12 which correspond to the unselected pixels.

In this manner, in each subfield, a constant amount of electrons are accumulated in the electron emitters 12 which correspond to the pixels to be turned on (to emit light) in the charge accumulation period Td, and voltages depending on the luminance levels of the subfield are applied to emit the accumulated electrons for fluorescent light emission in the light emission period Th, for thereby displaying a moving image or a still image on the surface of the transparent plate 60.

Figure 44:
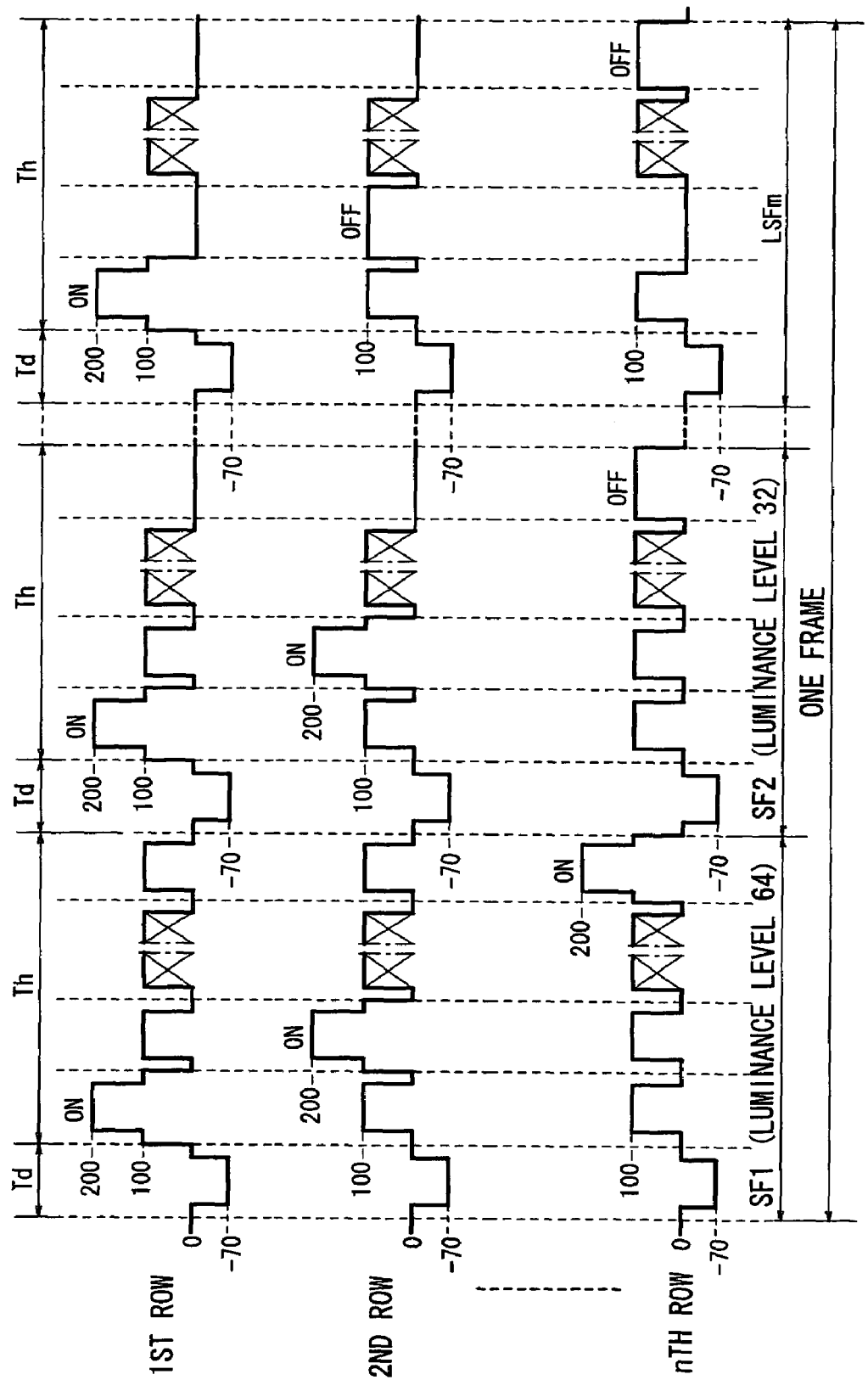
FIG. 44 is a timing chart illustrative of an eighth drive method.

An eighth drive method will be described below with reference to FIGS. 44 and 45. According to the eighth drive method, as shown in FIG. 44, the concept of linear subfields is employed as with the fourth drive method. The linear subfields LSF1, LSF2, . . . , LSFm have the same time intervals and luminance levels.

According to the eighth drive method, a constant voltage is applied to all the electron emitters 12 to accumulate a constant amount of charges in the electron emitters 12 to be turned on in a linear subfield in the charge accumulation period Td. In the next light emission period Th, all the electron emitters 12 are scanned, and a constant voltage is applied to the electron emitters 12 to be turned on in the linear subfield, causing the electron emitters 12 which correspond the pixels to be turned on in the linear subfield to emit light thereby to emit light from the pixels to be turned on. The eighth drive method employs the pulse number modulating process.

The eighth drive method can employ the signal supplying circuit 102 shown in FIG. 38. The amplitude modulating circuit 106 is controlled by the signal control circuit 26 to output the reference voltage from the pulse generating circuit 104 as it is in the charge accumulation period Td. In the light emission period Th, the amplitude modulating circuit 106 is controlled by the signal control circuit 26 to amplitude-modulate the voltage of the pulse signal Sp5 to be applied to the pixels to be turned on of the selected pixels into a voltage of 200 V, for example, amplitude-modulate the voltage of the pulse signal Sp5 be applied to the pixels to be turned off into a voltage of 100 V, for example, and output the signals as the pixel signal Sd.

Therefore, as shown in FIG. 45, in the charge accumulation period Td, a voltage of −70 V is applied to all the electron emitters 12, accumulating a constant amount of charges (electrons) in all the electron emitters 12.

In the next light emission period Th, as shown in FIG. 45, a voltage of 200 V is applied to the electron emitters 12 which correspond to the pixels to be turned on of the selected pixels, and a voltage of 100 V is applied to the electron emitters 12 which correspond to the pixels to be turned off. A voltage ranging from 10 V to 100 V is applied to the electron emitters 12 which correspond to the unselected pixels.

Each pixel is turned on in the light emission periods Th of a succession of linear subfields LSF1, LSF2, . . . , LSFm depending on the corresponding luminance level, and is turned off in the light emission period periods Th of the remaining linear subfields.

For example, as shown in FIG. 44, if the luminance level of the pixel in the first row and the first column is "64", then a voltage of 200 V is applied to the electron emitter 12 which corresponds to the pixel in the light emission periods Th of a number of successive linear subfields depending on the luminance level "64", causing the electron emitter 12 to emit light in the light emission periods Th. If the luminance level of the pixel in the second row and the first column is "32", then a voltage of 200 V is applied to the electron emitter 12 which corresponds to the pixel in the light emission period Th of a number of successive linear subfields depending on the luminance level "32", causing the electron emitter 12 to emit light in the light emission periods Th. If the luminance level of the pixel in the nth row and the first column is "8", then a voltage of 200 V is applied to the electron emitter 12 which corresponds to the pixel in the light emission periods Th of a number of successive linear subfields depending on the luminance level "8", causing the electron emitter 12 to emit light in the light emission periods Th.

In this manner, in each linear subfield, a constant amount of electrons are accumulated in all the electron emitters 12 in the charge accumulation period Td, and a constant voltage is applied to the electron emitters 12 which correspond to the pixels to be turned on (to emit light) to emit the accumulated electrons for fluorescent light emission in the light emission period Th, for thereby displaying a moving image or a still image on the surface of the transparent plate 60.

In the display apparatus 10 according to the present embodiment, as described above, necessary charges are accumulated in all the electron emitters 12 in the charge accumulation period Td. In the subsequent light emission period Th, a voltage required to emit electrons is applied to all the electron emitters 12 to cause a plurality of electron emitters 12 which correspond to the pixels to be turned on to emit the electrons for thereby emitting light from the pixels to be turned on.

Usually, if pixels are made up of electron emitters 12, then a high voltage needs to be applied to the electron emitters 12 to emit light from the pixels. Therefore, for accumulating charges in the pixels and emitting light from the pixels when the pixels are scanned, a high voltage needs to be applied to the pixels during a period (e.g., one frame) for displaying one image, resulting in the problem of increased electric power consumption. Circuits for selecting electron emitters 12 and supplying the pixel signals Sd to the selected electron emitters 12 need to be able to handle the high voltage.

According to the present embodiment, after charges have been accumulated in all the electron emitters 12, a voltage is applied to all the electron emitters 12, emitting light from the pixels which correspond to the electron emitters 12 to be turned on.

Therefore, the period Th during which a voltage (emission voltage) for emitting electrons is applied to all the electron emitters 12 is necessarily shorter than one frame. As can be seen from the first experimental example, shown in FIGS. 14A and 14B, since the period during which to apply the emission voltage can be reduced, the power consumption can be made much smaller than if charges are accumulated and light is emitted when the pixels are scanned.

Because the period Td for accumulating charges in electron emitters 12 and the period Th for emitting electrons from electron emitters 12 which correspond to the pixels to be turned on are separated from each other, the circuit for applying voltages depending on luminance levels to the electron emitters 12 can be driven at a low voltage.

The pixel signal Sd depending on an image and the selection signal Ss/non-selection signal Sn in the charge accumulation period Td need to be applied for each row or each column. As can be seen from the above embodiment, as the drive voltage may be of a few tens of volts, an inexpensive multi-output driver for use with fluorescent display tubes may be used. In the light emission period Th, a voltage for emitting sufficient electrons is likely to be higher than the drive voltage. Since all the pixels to be turned on may be driven altogether, no multi-output circuit component is required. For example, a one-output drive circuit in the form of a discrete component having a high withstand voltage may be sufficient. Therefore, the drive circuit may be inexpensive and may be small in circuit scale.

According to the drive methods described above, non-selection signals Sn are supplied through the row selecting circuit 22 to row select lines 18 for unselected rows, and a certain voltage depending on the drive method is applied to the electron emitters 12 of the unselected rows. However, the row select lines 18 for unselected rows may be placed in a high impedance state (a ninth drive method).

Figure 46:
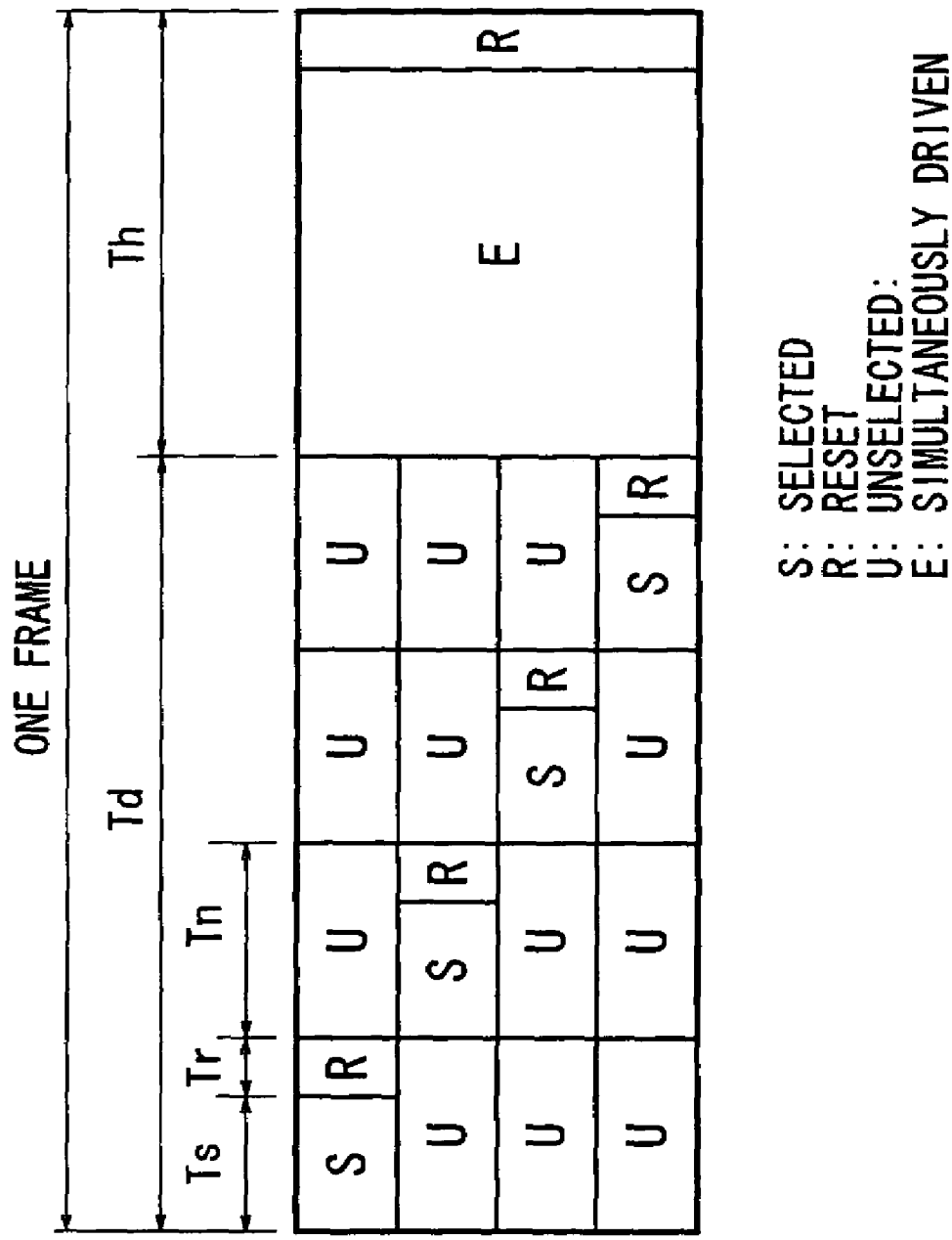
FIG. 46 is a timing chart illustrative of a ninth drive method.
Figure 47:
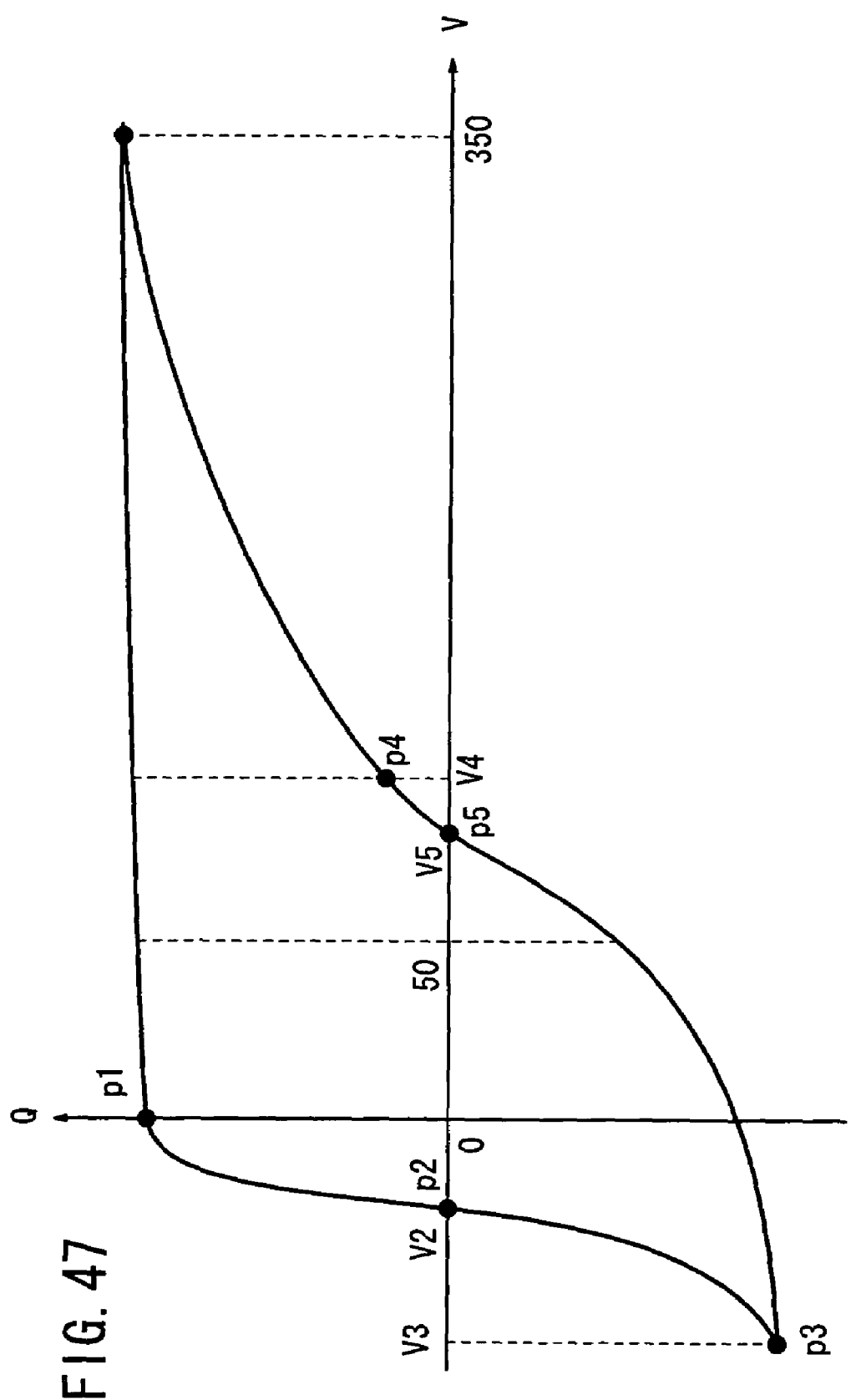
FIG. 47 is a diagram showing voltage vs. charged amount characteristics (voltage vs. polarization amount characteristics) of an electron emitter used in the ninth drive method.

The ninth drive method will be described below with reference to FIGS. 46 through 48. FIG. 46 shows a simple model of a four-row scanning sequence, illustrating a representative mode of operation of pixels in the first row and the first column, the second row and the first column, the third row and the first column, and the fourth row and the first column. The electron emitter 12 used in the ninth drive method has such characteristics that the coercive voltage v2 at the point p2 shown in FIG. 47 is −20 V, for example, the coercive voltage v5 at the point p5 is +75 V, the voltage v3 at the point p3 is −50 V, and the voltage v4 at the point p4 is +100 V.

As shown in FIG. 46, if the period for displaying one image is one frame, then that one frame includes one charge accumulation period Td and one light emission period Th, the charge accumulation period Td including four selection periods Ts and four reset periods Tr. Since each selection period Ts and each reset period Tr become a selection period Ts and a reset period Tr for a corresponding row, they become a non-selection period Tn for non-corresponding 3 rows. In the selection period Ts for each row, a selection signal Ss is supplied through the corresponding row select line 18, and in the reset period Tr for each row, a reset signal is supplied through the corresponding row select line 18.

As shown in FIG. 48, in the selection period Ts of the first row, a selection signal Ss of 50 V, for example, is supplied to the row select line 18 for the first row, and the row select lines 18 for the other rows are placed in a high impedance state. The voltages of pixel signals Sd supplied to signal lines 20 for pixels to be turned on (to emit light) of the pixels of the first row are in the range from 0 V to 30 V, and depend on the luminance levels of the corresponding pixels. If the luminance level is maximum, then the voltage of the pixel signal Sd is 0 V. The pixel signal Sd is modulated depending on the luminance level by the amplitude modulating circuit 34 shown in FIG. 1 or the pulse width modulating circuit 38 shown in FIG. 3.

Thus, a voltage ranging from −50 V to −20 V depending on the luminance level is applied between the upper and, lower electrodes 42, 44 of the electron emitter 12 which corresponds to each of the pixels to be turned on in the first row. As a result, each electron emitter 12 accumulates electrons depending on the applied voltage. A pixel signal Sd supplied to the electron emitters 12 which correspond to pixels to be turned off (to extinguish light) has a voltage of 50 V, for example. Therefore, a voltage of 0 V is applied to the electron emitters 12 which correspond to pixels to be turned off, bringing those electron emitters 12 into a state at the point p1 shown in FIG. 47, so that no electrons are accumulated in those electron emitters 12.

After the supply of the pixel signal Sd to the first row is finished, a reset signal starts being supplied to the first row. A voltage of 50 V is between the upper and lower electrodes 42, 44 of the electron emitter 12 which corresponds to each of the pixels in the first row.

In the selection period Ts of the second row, a selection signal Ss of 50 V is supplied to the row select line 18 for the second row, and the row select lines 18 for the other rows are placed in a high impedance state. A voltage ranging from −50 V to −20 V depending on the luminance level is applied between the upper and lower electrodes 42, 44 of the electron emitter 12 which corresponds to each of the pixels to be turned on (to emit light). Between the upper and lower electrodes 42, 44 of the electron emitter 12 which corresponds to each of unselected pixels, the voltage of 50 V applied in the reset period Tr varies in the range from 0 V to 100 V. Since this voltage of a level not reaching the point 4 in FIG. 47, no electrons are emitted from the electron emitters 12 which correspond to the pixels to be turned on (to emit light) in the first row. That is, the unselected pixels in the first row are not affected by the pixel signal Sd that is supplied to the selected pixels in the second row.

Furthermore, the power consumption by the unselected rows can be reduced. Specifically, the power consumption by the unselected rows in the ninth drive method can be reduced to about ¼ of the power consumption by the unselected rows in the first drive method.

Specifically, one example of calculations will be described below. If it is assumed that the display unit 14 has a matrix of pixels in N rows and M columns, and the mth column of the M columns is turned on, then the power consumption by the unselected rows in the first drive method is expressed by:

$$P1 = C \times V_{col}^2 \times f \times N \times m \times (N-1)$$

where C represents the capacitance of a pixel, $V_{col}$ the voltage applied across a pixel, and f the frequency (=60 Hz) of one frame.

The power consumption by the unselected rows in the ninth drive method is expressed by:

$$P9 = C \times V_{col}^2 \times f \times N \times \{m \times (M-m) \times (N-1)\}/M$$

P1 takes a maximum value $P1_{max}$ when m=M, as expressed by:

$$P1_{max} = C \times V_{col}^2 \times f \times N \times (N-1) \times M$$

P9 takes a maximum value $P9_{max}$ when m=M/2, as expressed by:

$$P9_{max} = C \times V_{col}^2 \times f \times N \times (N-1) \times M/4$$

Thus, the power consumption can greatly be reduced by placing the row select lines 18 for the unselected rows in a high impedance state.

According to the above drive methods, necessary charges are accumulated in all the electron emitters 12 in the charge accumulation period Td. In the subsequent light emission period Th, a voltage required to emit electrons is applied to all the electron emitters 12 to cause a plurality of electron emitters 12 which correspond to the pixels to be turned on to emit the electrons. However, other drive methods described below may be employed.

Figure 49:
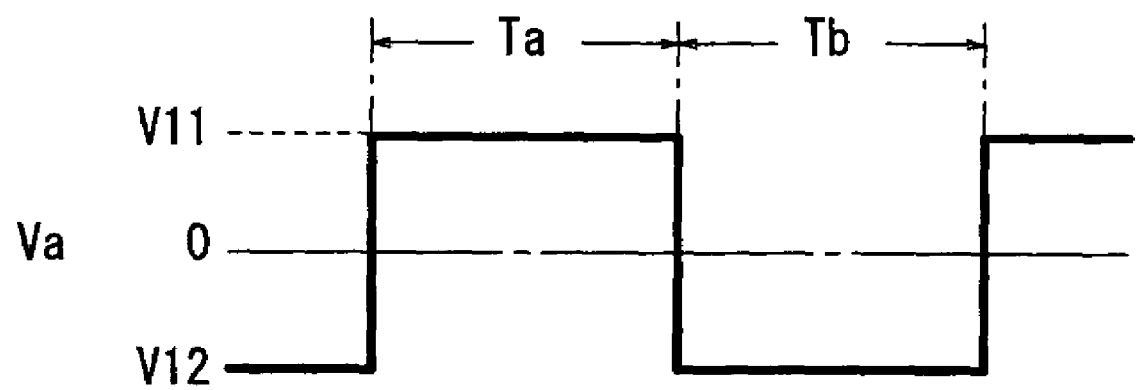
FIG. 49 is a diagram showing the waveform of an applied voltage in another drive method.
Figure 50:
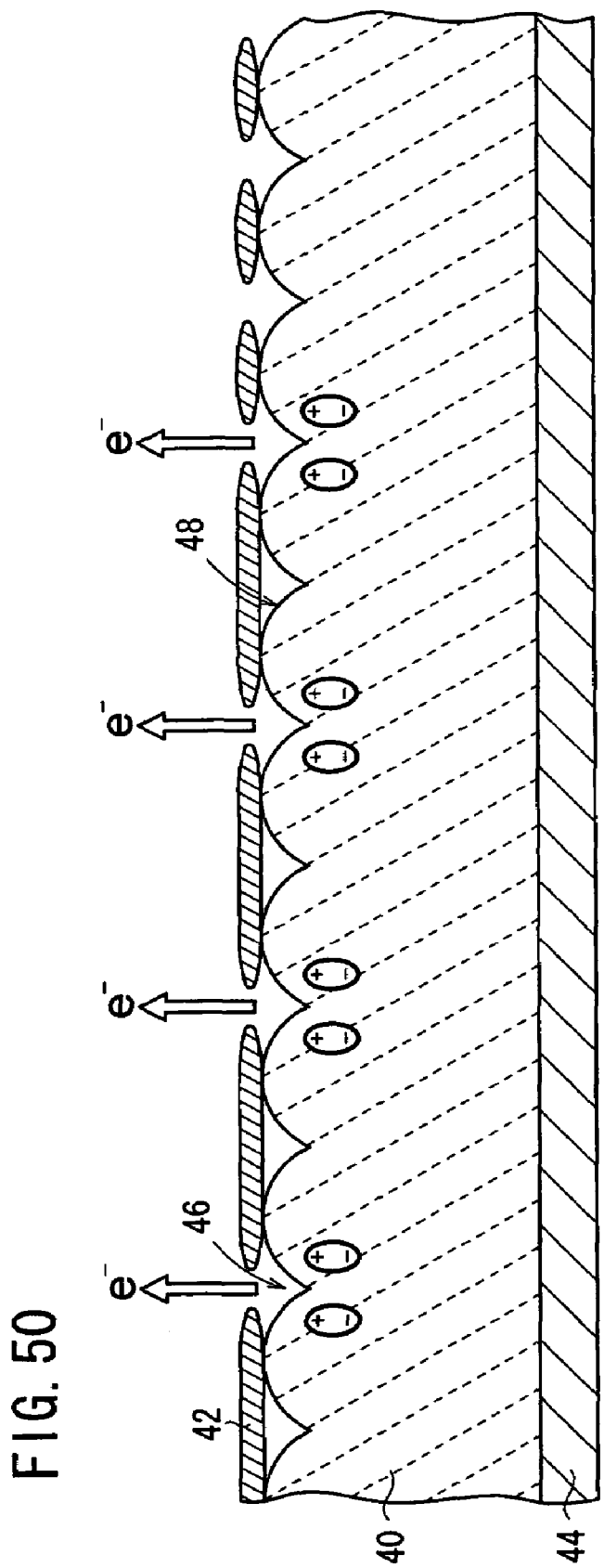
FIG. 50 is a view illustrative of the emission of electrons according to the other drive method shown in FIG. 49.

In a preparatory period Ta shown in FIG. 49, a voltage V11 higher than a reference voltage (e.g., 0 V) is applied to the upper electrode 42, and a voltage V12 lower than the reference voltage is applied to the lower electrode 44. In the preparatory period Ta, the electron emitter is prepared for electron emission (e.g., the emitter 40 is polarized in one direction). In a next drive period Tb, the voltage level of a drive voltage Va is quickly changed, i.e., the voltage V12 lower than the reference voltage is applied to the upper electrode 42, and the voltage V11 higher than the reference voltage is applied to the upper electrode 42. Now, an electric field concentration occurs at the triple junction referred to above, causing the upper electrode 42 to emit primary electrons, which impinge upon the portions of the emitter 40 which are exposed through the through region 46 and regions near the outer peripheral portion of the upper electrode 42. As shown in FIG. 50, secondary electrons (including reflected primary electrons) are emitted from the portions hit by the primary electrons. Thus, secondary electrons are emitted from the through region 46 and the regions near the outer peripheral portion of the upper electrode 42 in an initial state of the drive period Tb.

Figure 51:
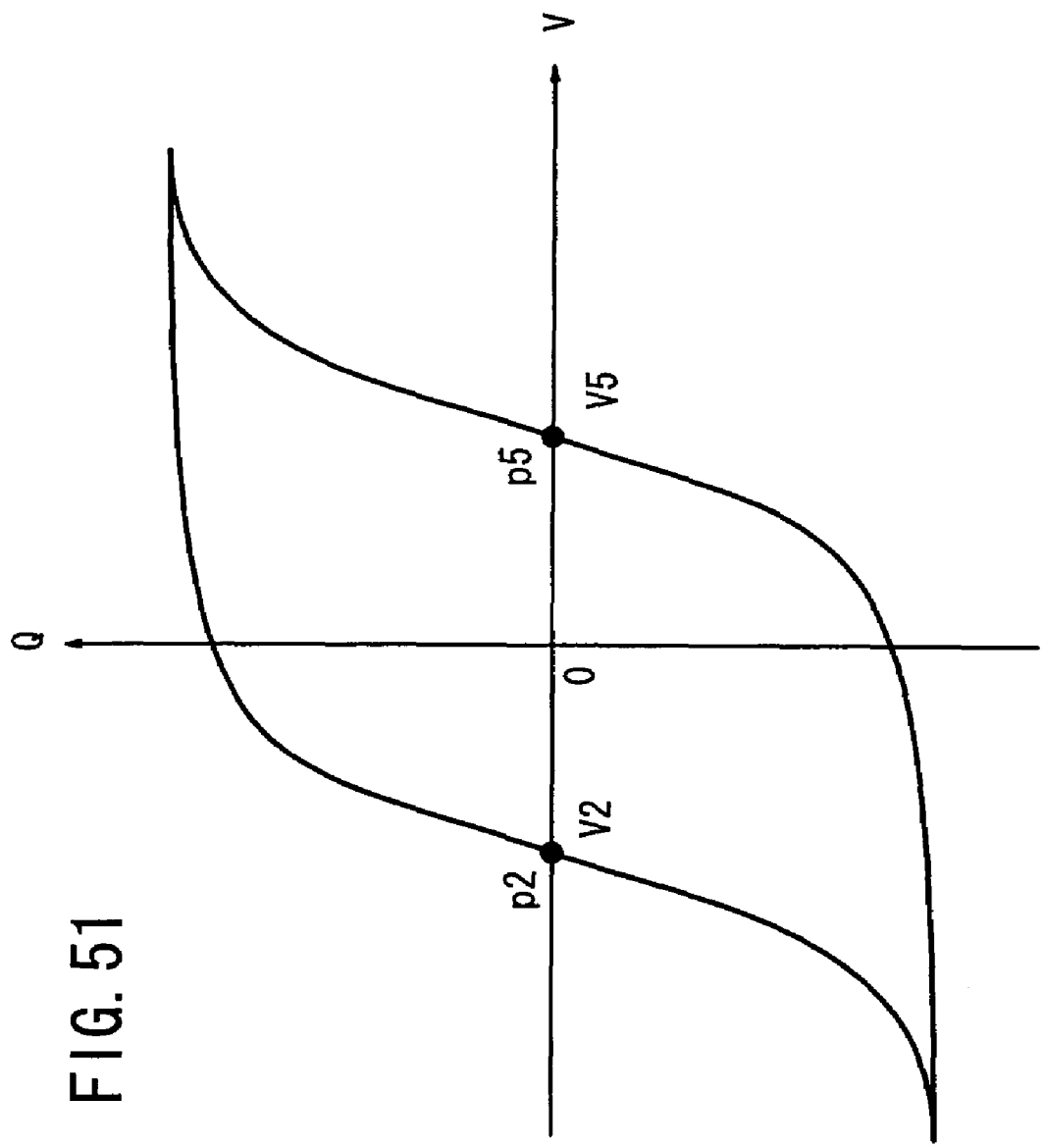
FIG. 51 is a diagram showing voltage vs. charged amount characteristics (voltage vs. polarization amount characteristics) of an electron emitter used in the other drive method shown in FIG. 49.

According to the present drive method, the voltage vs. charged amount characteristics of the electron emitter 12 are represented by a hysteresis curve, as shown in FIG. 51, which is symmetrical with respect to the reference voltage=0 (V), where the absolute value of a negative coercive electric field (the voltage at the point p2) and the absolute value of a positive coercive electric field (the voltage at the point p5) are substantially the same as each other in vacuum.

Figure 52:
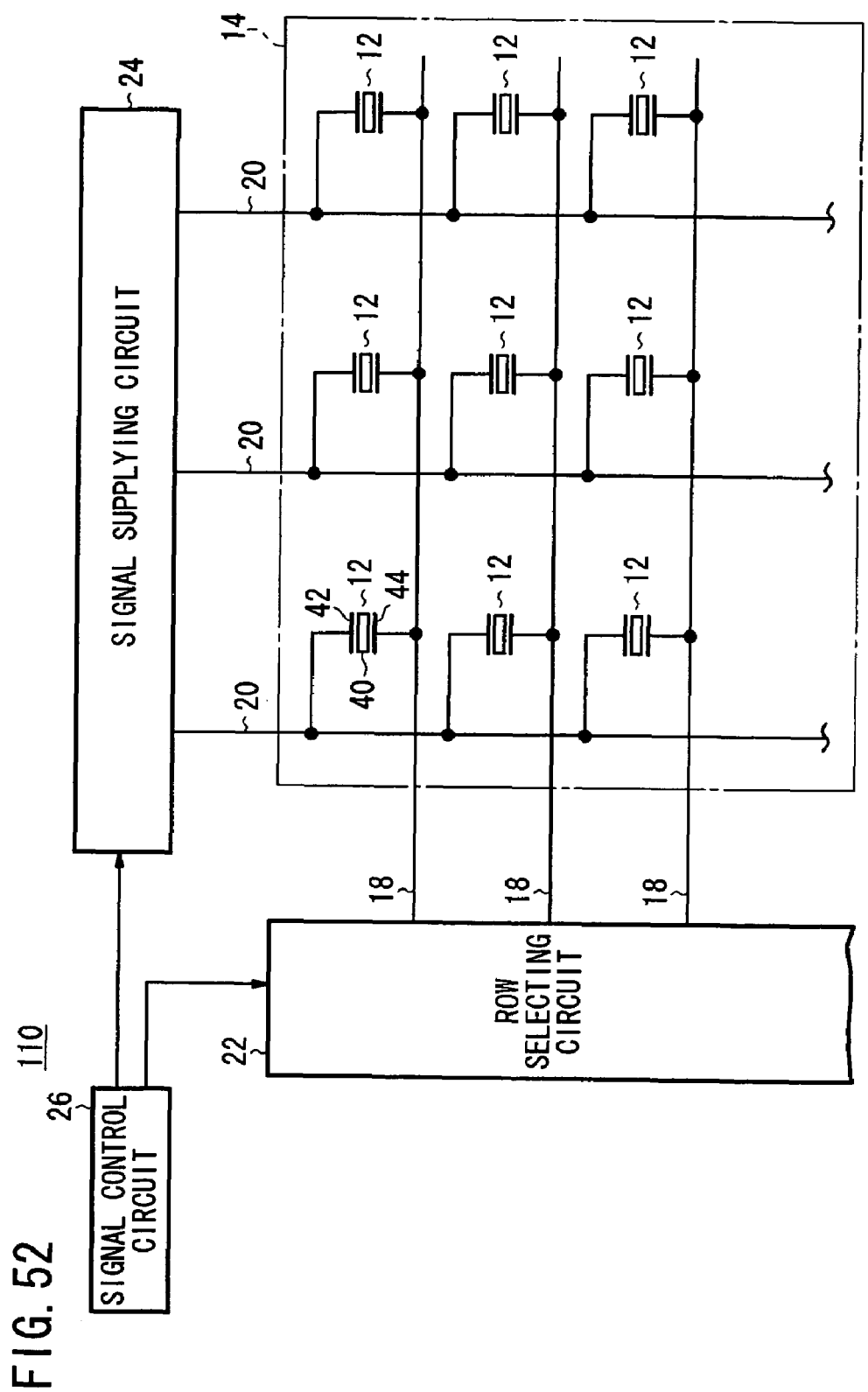
FIG. 52 is a block diagram of a display apparatus which employs a tenth drive method and an eleventh drive method.

As shown in FIG. 52, for example, if a number of electron emitters 12 are arrayed into a display apparatus 110, it may be driven by the following drive method (tenth drive method): As shown in FIG. 53, a voltage (e.g., 100 V) higher than the reference voltage is applied to a row selected by the row selecting circuit 22 (selected row), an ON signal (e.g., −40 V) is supplied to the signal lines 20 of electron emitters 12 which correspond to pixels to emit light therefrom in the selected row, and an OFF signal (e.g., 0 V) is supplied to the signal lines 20 of electron emitters 12 which correspond to pixels to extinguish light therefrom. A voltage (e.g., −100 V) lower than the reference voltage is applied to rows not selected by the row selecting circuit 22 (unselected rows). In this example, the voltage of −140 V is a voltage for causing electron emission, and the voltage of −100 V is a voltage for not causing electron emission.

The tenth drive method will be described below. If all the electron emitters 12 are not to be selected, a voltage of −100 V, for example, is applied through the row select lines 18 to the lower electrodes 44 of all the electron emitters 12, and a voltage of 0 V, for example, is applied through the signal lines 20 to the upper electrodes 42 of all the electron emitters 12, so that a voltage of 100 V is applied to all the electron emitters 12.

Thereafter, if a plurality of electron emitters 12 in the first row are to be selected, in the selection period Ts, a voltage of 100 V is applied to the lower electrodes 44 of the plurality of electron emitters 12 in the first row through the row select line 18 for the first row. A voltage of −40 V is applied to the upper electrodes 42 of the electron emitters 12 to be turned on, of the plurality of electron emitters 12 in the first row, through the corresponding signal lines 20. A voltage of 0 V is applied to the upper electrodes 42 of the electron emitters 12 to be turned off, through the corresponding signal lines 20.

As a result, a voltage (e.g., −140 V) for causing electron emission is applied between the upper and lower electrodes 42, 44 of the electron emitters 12 to be turned on, of the plurality of electron emitters 12 in the first row, during the selection period Ts for the first row. Thus, the electron emitters 12 to be turned on emit electrons for fluorescent light emission.

A voltage (e.g., −100 V) for not causing electron emission is applied between the upper and lower electrodes 42, 44 of the electron emitters 12 to be turned off, of the plurality of electron emitters 12 in the first row, during the selection period Ts for the first row. Thus, the electron emitters 12 to be turned off do not emit electrons and hence are extinguished.

A voltage of −40 V or 0 V is applied to the upper electrodes 42 of the electron emitters 12 in the unselected rows through the signal lines 20. A voltage of −100 V is applied to the lower electrodes 44 of the electron emitters 12 in the unselected rows through the row select lines 18. Since a voltage of 60 V or 100 V higher than the reference voltage (e.g., 0 V) is applied to the electron emitters 12 in the unselected rows, the electron emitters 12 in the unselected rows do not emit electrons.

The first row, the second row, the third row, . . . , the nth row are successively selected in synchronism with a horizontal synchronizing signal, and then selected again after flyback in synchronism with a vertical synchronizing signal, thereby displaying a moving image or a still image on the screen of the display apparatus 110 (the surface of the transparent plate 60).

An eleventh drive method and a twelfth drive method will be described below. The eleventh drive method has the same principles as the ninth drive method, i.e., provides a reset period Tr immediately after the selection period Ts, and places the row select lines 18 for unselected rows in a high impedance state. Therefore, one frame is cycled from a selection period Ts ((n−1)th frame) to a reset period Tr to a non-selection period Tn to a selection period Ts (nth frame).

According to the eleventh drive method, if a plurality of electron emitters 12 in the first row are to be selected, i.e., in the selection period Ts, as shown in FIG. 54, a voltage of 100 V is applied to the lower electrodes 42 of the plurality of electron emitters 12 in the first row through the row select line 18 for the first row. A voltage of −40 V is applied to the upper electrodes 42 of the electron emitters 12 to be turned on, of the plurality of electron emitters 12 in the first row, through the corresponding signal lines 20. A voltage of 0 V is applied to the upper electrodes 42 of the electron emitters 12 to be turned off, through the corresponding signal lines 20.

As a result, a voltage (e.g., −140 V) for causing electron emission is applied between the upper and lower electrodes 42, 44 of the electron emitters 12 to be turned on, of the plurality of electron emitters 12 in the first row, during the selection period Ts for the first row. Thus, the electron emitters 12 to be turned on emit electrons for fluorescent light emission.

A voltage (e.g., −100 V) for not causing electron emission is applied between the upper and lower electrodes 42, 44 of the electron emitters 12 to be turned off, of the plurality of electron emitters 12 in the first row, during the selection period Ts for the first row. Thus, the electron emitters 12 to be turned off do not emit electrons and hence are extinguished.

If a plurality of electron emitters 10 in the first row are to be reset, i.e., in the reset period Tr, a voltage of −100 V is applied to the lower electrodes 42 of the plurality of electron emitters 10 in the first row through the row select line 18 for the first row. At this time, a voltage of −40 V or 0 V is applied through the signal lines 20. Therefore, a voltage of 60 V or 100 V higher than the reference voltage (e.g., 0 V) is applied to the electron emitters 12 during the reset period Tr.

The voltage of −40 V or 0 V which is applied through the signal lines 20 to the electron emitters 12 during the reset period Tr is an ON signal or an OFF signal for the electron emitters 12 in other selected rows. By having the voltage applied from the signal lines 20 to end at 0 V within the reset period Tr (stated otherwise, the selection period Ts), the electron emitters 12 in the reset period Tr necessarily finish the reset period Tr while the voltage of 100 V is being applied thereto.

The row select lines 18 for the unselected rows are placed in a high impedance state. Therefore, a voltage varying in the range from 60 V to 140 V, which is higher than the reference voltage (e.g., 0 V), is applied to the electron emitters 12 in the unselected rows, and the electron emitters 12 in the unselected rows do not emit electrons.

The first row, the second row, the third row, . . . , the nth row are successively selected in synchronism with a horizontal synchronizing signal, and then selected again after flyback in synchronism with a vertical synchronizing signal, thereby displaying a moving image or a still image on the screen of the display apparatus 110 (the surface of the transparent plate 60).

The twelfth drive method has the same principles as the ninth drive method, i.e., provides a reset period Tr immediately after the selection period Ts, and places the row select lines 18 for unselected rows in a high impedance state. Particularly, the twelfth drive method is a process for varying the length of a non-selection period immediately prior to the selection period Ts depending on the gradation level of each row. One frame is cycled from a selection period Ts ((n−1)th frame) to a first non-selection period Tn1 to a reset period Tr to a second non-selection period Tn2 to a selection period Ts (nth frame).

Figure 55:
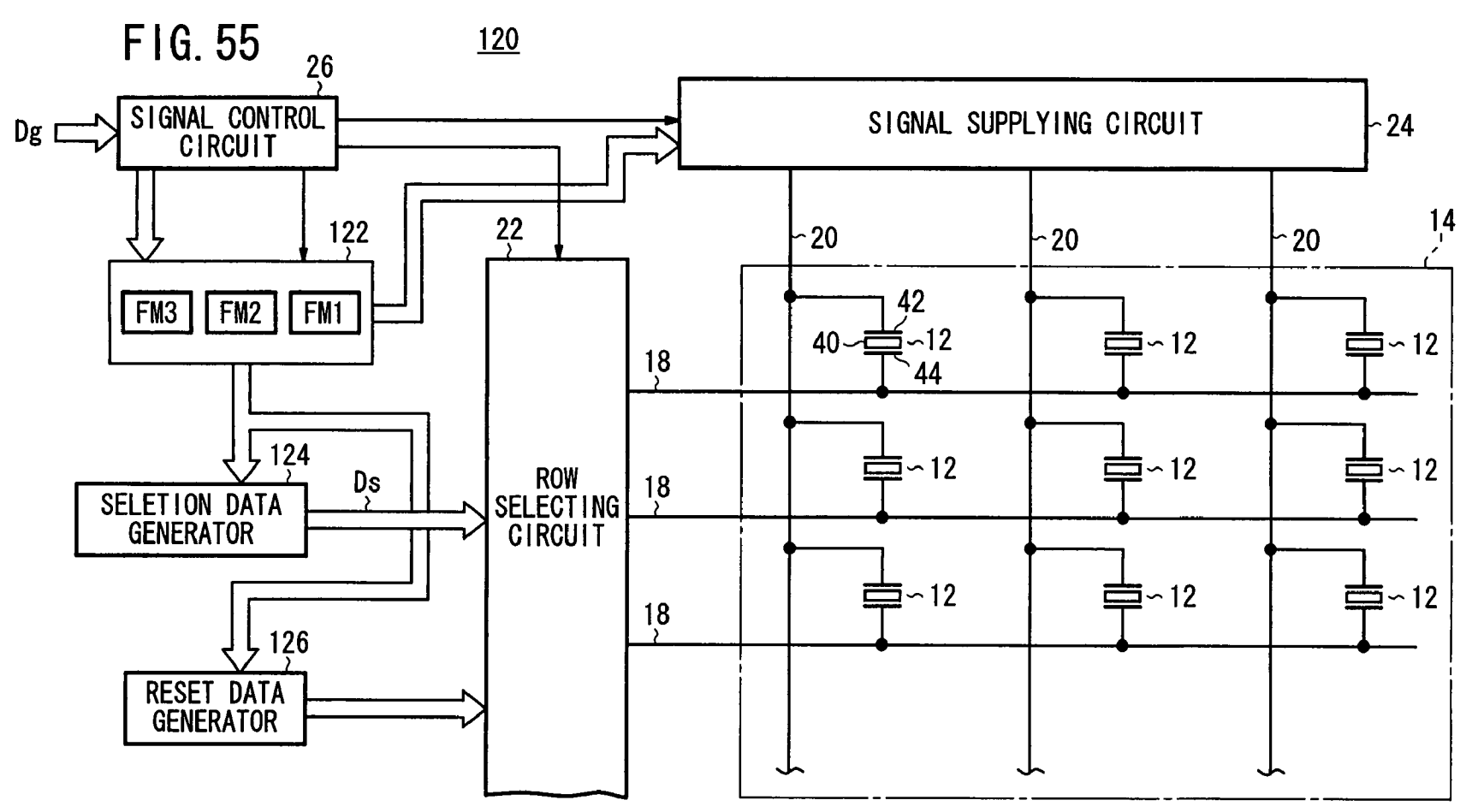

As shown in FIG. 55, a display apparatus 120 used in the twelfth drive method has, in addition to the row selecting circuit 22, the signal supplying circuit 24, and the signal control circuit 26, a frame memory unit 122, a selection data generator 124, and a reset data generator 126. The frame memory unit 122 has three frame memories (first through third frame memories FM1 through FM3), for example.

The signal control circuit 26 successively switches the three frame memories (first through third frame memories FM1 through FM3) to select a frame memory to write a frame of image data Dg therein, and also to select a frame memory to supply a frame of image data Dg therefrom to the signal supplying circuit 24. For example, if it is assumed that an (n−2)th frame of image data is written in the first frame memory FM1 and an (n−1)th frame of image data is written in the second frame memory FM2, then the signal control circuit 26 reads the image data from the first frame memory FM1 and outputs the image data to the signal supplying circuit 24, and writes an nth frame of image data Dg input from an external circuit into the third frame memory FM3.

After the (n−2)th frame of the image data is output in its entirety and the nth frame of image data is written in its entirety into the third frame memory FM3, an (n−1)th frame of image data Dg is supplied to the signal supplying circuit 24, and an (n+1)th frame of image data Dg from an external circuit is written into the first frame memory FM1.

Similarly, after the (n−1)th frame of the image data is output in its entirety and the (n+1)th frame of image data is written in its entirety into the first frame memory FM1, an nth frame of image data Dg is supplied to the signal supplying circuit 24, and an (n+2)th frame of image data Dg from an external circuit is written into the second frame memory FM2.

That is, image data Dg is read from the frame memory which stores the oldest frame of image data Dg, of the three frame memories FM1 through FM3, and output to the signal supplying circuit 24, and a next frame of image data Dg is written into the frame memory from which one frame of image data has already been output.

The selection data generator 124 generates selection data Ds which represents only a selected row as "1" in each selection period Ts, and outputs the selection data Ds to the row selecting circuit 22. According to a simple model of a six-row scanning sequence, if the selected row is the first row, then the selection data generator 124 outputs selection data "100000" and supplies the selection data to the row selecting circuit 22 in the selection period Ts. Likewise, if the selected row is the second row, the selection data generator 124 outputs selection data "010000", and if the selected row is the third row, the selection data generator 124 outputs selection data "001000".

The row selecting circuit 22 sets the voltage of the row select line 18 corresponding to the row "1" to 100 V based on the selection data Ds from the selection data generator 124.

Figure 56:
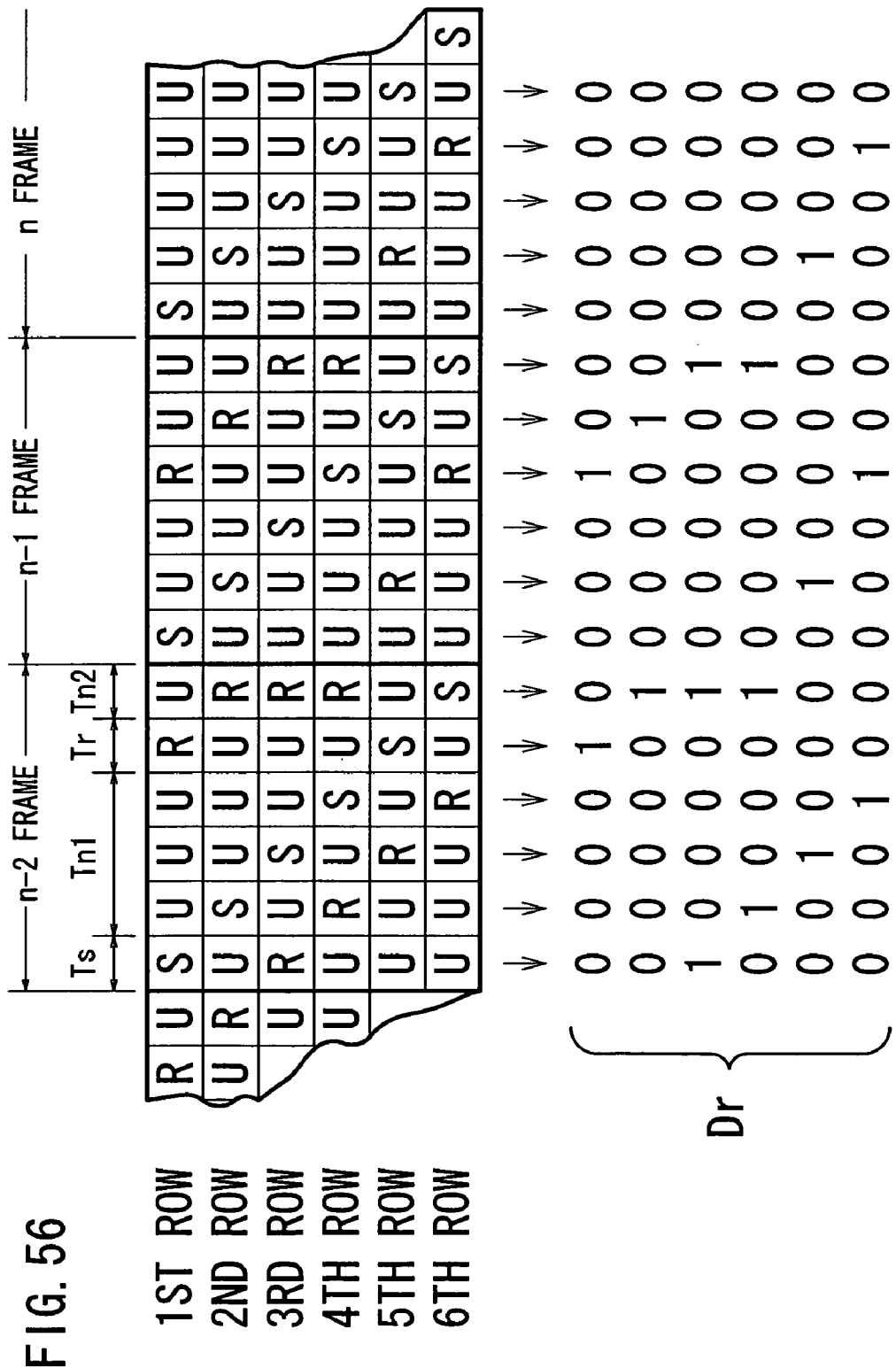
FIG. 56 is a timing chart showing operation according to the twelfth drive method together with reset data.

The reset data generator 126 sets a reset period Tr in each row depending on the gradation level for the row in a next one frame. For example, it is assumed that in a six-row scanning sequence as shown in FIG. 56, the gradation levels (the maximum level 4) for respective rows in the (n−2)th frame, the (n−1)th frame, and the nth frame are as shown in FIGS. 57A through 57C. That is, the gradation levels for the first through sixth rows are 1 in the (n−2)th frame. In the (n−1)th frame, the gradation level for the first row is 1, the gradation level for the second row is 1, the gradation level for the third row is 2, the gradation level for the fourth row is 3, the gradation level for the fifth row is 2, and the gradation level for the sixth row is 1. In the nth frame, the gradation level for the first row is 2, the gradation level for the second row is 2, the gradation level for the third row is 2, the gradation level for the fourth row is 3, the gradation level for the fifth row is 2, and the gradation level for the sixth row is 1.

In the selection period Ts for the first row in the (n−2)th frame, the reset data generator 126 outputs reset data Dr="001000" and supplies the reset data Dr to the row selecting circuit 22. The row selecting circuit 22 sets the voltage of the row select line 18 corresponding to the row "1" to −100 V based on the reset data Dr from the reset data generator 126.

The row selecting circuit 22 places those row select lines which do not correspond to the "1" of the selection data Ds and do not correspond to the "1" of the reset data Dr, of all the row select lines 18, into a high impedance state.

As a result, as shown in FIG. 58, a voltage of −140 V is applied to the pixels to be turned on, of the row put in the selection period Ts, and a voltage of −100 V is applied to the pixels to be turned off. In order to fix the central value of the voltage which varies in the following first non-selection period Tn1 (high impedance state), the voltage applied to the pixels to be turned on is necessarily set to −100 V at the end of the reset period Tr. A voltage of 60 V or 100 V is applied to the pixels in the row put in the reset period Tr. In order to fix the central value of the voltage which varies in the following second non-selection period Tn2 (high impedance state), the voltage applied to the pixels is necessarily set to 100 V at the end of the reset period Tr. A voltage which varies in the range from −140 V to −60 V is applied to the pixels in the row put in the first non-selection period Tn1, and a voltage which varies in the range from 60 V to 140 V is applied to the pixels in the row put in the second non-selection period Tn2.

In the example shown in FIG. 56, the first non-selection period Tn1 corresponding to three selection periods Ts is set after each selection period Ts for the first row, the second row, and the sixth row in the (n−2)th frame. Thereafter, the reset period Tr, and the second non-selection period Tn2 corresponding to one selection period Ts are set. The first non-selection period Tn1 corresponding to two selection periods Ts is set after the selection period Ts for the third row and the fifth row in the (n−2)th frame. Thereafter, the reset period Tr, and the second non-selection period Tn2 corresponding to two selection periods Ts are set. Similarly, the first non-selection period Tn1 corresponding to one selection period Ts is set after the selection period Ts for the fourth row in the (n−2)th frame. Thereafter, the reset period Tr, and the second non-selection period Tn2 corresponding to three selection periods Ts are set. In the first and second non-selection periods Tn1, Tn2, the corresponding row select line 18 is placed in a high impedance state.

That is, the non-selection period (the second non-selection period Tn2) immediately prior to the selection period Ts for each row in the (n−1)th frame is the longest for the fourth row, the shortest for the first row, the second row, and the sixth row, and intermediate for the third row and the fifth row. Therefore, electrons are emitted from the electron emitters 12 to be turned on in the selection period Ts for each row in the (n−1)th frame, and the brightness of the pixels to be turned on varies in terms of rows such that the pixels in the fourth row have the gradation level 3, the pixels the third and fifth rows have the gradation level 2, and the pixels in the first row, the second row, and the sixth row have the gradation level 1.

Likewise, in the nth frame, the brightness of the pixels to be turned on varies in terms of rows such that the pixels in the fourth row have the gradation level 3, the pixels in the first row, the second row, the third row, and the fifth row have the gradation level 2, and the pixels in the sixth row have the gradation level 1.

According to the twelfth drive method, inasmuch as the corresponding row select lines 18 are placed in a high impedance state during the first and second non-selection periods Tn1, Tn2, the power consumption is reduced with the eleventh drive method.

In the above example, the reset data Dr for the rows are generated by the reset data generator 126. If reset data for rows and columns are generated, then the above drive method can easily be used with image data including differential data between frames (compressed image data).

The display apparatus 10 according to the present embodiment can be used as electron beam irradiation apparatus, light sources, LED alternatives, electronic parts manufacturing apparatus, and electronic circuit components, in addition to display apparatus.

An electron beam in an electron beam irradiation apparatus has a higher energy and a better absorption capability than ultraviolet rays in ultraviolet ray irradiation apparatus that are presently in widespread use. The display apparatus may be used to solidify insulating films in superposing wafers for semiconductor devices, harden printing inks without irregularities for drying prints, and sterilize medical devices while being kept in packages.

The display apparatus may also be used as high-luminance, high-efficiency light sources for use in projectors, for example, which may employ ultrahigh-pressure mercury lamps. The light source using the electron emitter according to the present embodiment is compact, has a long service life, has a fast response speed for light emission. The electron emitter does not use any mercury, and the electron emitter is environmentally friendly.

The display apparatus may also be used as LED alternatives in surface light sources such as indoor illumination units, automobile lamps, traffic signal devices, and also in chip light sources, traffic signal devices, and backlight units for small-size liquid-crystal display devices for cellular phones.

The display apparatus may also be used in electronic parts manufacturing apparatus as electron beam sources for film growing apparatus such as electron beam evaporation apparatus, electron sources for generating a plasma (to activate a gas or the like) in plasma CVD apparatus, and electron sources for decomposing gases. The display apparatus may also be used in vacuum micro devices including ultrahigh-speed devices operable in a tera-Hz range and large-current output devices. The display apparatus may also preferably be used as printer components, i.e., light emission devices for applying light to a photosensitive drum in combination with a phosphor, and electron sources for charging dielectric materials.

The display apparatus may also be used in electronic circuit components including digital devices such as switches, relays, diodes, etc. and analog devices such as operational amplifiers, etc. as they can be designed for outputting large currents and higher amplification factors.

The pixels of the display apparatus 10 which have the collector electrode 62 coated with the phosphor 64 as shown in FIGS. 9 and 10 offer the following advantages:

(1) The display apparatus can be much thinner (the panel thickness=several mm) than CRTs.

(2) Since the display apparatus emits natural light from the phosphor 64, the display apparatus can provide a wide angle of view which is about 180° unlike LCDs (liquid crystal displays) and LEDs (light-emitting diodes).

(3) Since the display apparatus employs a surface electron source, it produces less image distortions than CRTs.

(4) The display apparatus can respond more quickly than LCDs, and can display moving images free of after image with a high-speed response on the order of μsec.

(5) The display apparatus consumes an electric power of about 100 W in terms of a 40-inch size, and hence is characterized by lower power consumption than CRTS, PDPs (plasma displays), LCDs, and LEDs.

(6) The display apparatus has a wider operating temperature range (−40 to +85° C.) than PDPs and LCDs. LCDs have lower response speeds at lower temperatures.

(7) The display apparatus can produce higher luminance than conventional FED displays as the fluorescent material can be excited by a large current output.

(8) The display apparatus can be driven at a lower voltage than conventional FED displays because the drive voltage can be controlled by the polarization reversing characteristics and film thickness of the piezoelectric material.

Because of the above various advantages, the display apparatus can be used in a variety of applications described below.

(1) Since the display apparatus can produce higher luminance and consume lower electric power, it is optimum for use as 30- through 60-inch displays for home use (television and home theaters) and public use (waiting rooms, karaoke rooms, etc.).

(2) Inasmuch as the display apparatus can produce higher luminance, can provide large screen sizes, can display full-color images, and can display high-definition images, it is optimum for use as horizontally or vertically long, specially shaped displays, displays in exhibitions, and message boards for information guides.

(3) Because the display apparatus can provide a wider angle of view due to higher luminance and fluorescent excitation, and can be operated in a wider operating temperature range due to vacuum modularization thereof, it is optimum for use as displays on vehicles. Displays for use on vehicles need to have a horizontally long 8-inch size whose horizontal and vertical lengths have a ratio of 15:9 (pixel pitch=0.14 mm), an operating temperature in the range from −30 to +85° C., and a luminance level ranging from 500 to 600 cd/m² in an oblique direction.

Because of the above various advantages, the display apparatus can be used as a variety of light sources described below.

(1) Since the display apparatus can produce higher luminance and consume lower electric power, it is optimum for use as projector light sources which are required to have a luminance level of 2000 lumens.

(2) Because the display apparatus can easily provide a high-luminance two-dimensional array light source, can be operated in a wide temperature range, and have their light emission efficiency unchanged in outdoor environments, it is promising as an alternative of LEDs. For example, the display apparatus is optimum as an alternative of two-dimensional array LED modules for traffic signal devices. At 25° C. or higher, LEDs have an allowable current lowered and produce low luminance.

(3) Since a surface light source-comprising a two-dimensional array of electron emitters according to the present invention can be turned on/off emitter by emitter, it is preferable for use in applications where portions of a light emission area are turned on/off. Furthermore, because the surface light source can instantaneously be turned on, it requires no time for warming up. If the surface light source is used as a liquid crystal backlight, then the quality of moving images displayed thereby can be improved by high-speed blinking.

The display apparatus, the method of driving the display apparatus, the electron emitter, the method of driving the electron emitter, the apparatus for driving the electron emitter, the electron emission apparatus, and the method of driving the electron emission apparatus according to the present invention are not limited to the above embodiments, but may be embodied in various arrangement without departing from the scope of the present invention.

What is claimed is:

1. A display apparatus having a plurality of electron emitters arrayed in association with a plurality of pixels, for emitting electrons from the electron emitters to display an image, each electron emitter including a first electrode and a second electrode in direct contact with said electron emitter; and
    a drive circuit for scanning all the electron emitters to apply necessary voltages to the electron emitters, wherein:
    necessary charges are accumulated in all the electron emitters in a first period;
    a voltage required to emit electrons is applied to all the electron emitters to cause a plurality of electron emitters which correspond to pixels to emit light therefrom, for emitting light from said pixels, in a second period after said first period;
    light is emitted from said pixels only during said second period; and
    wherein one image is displayed in a period as one frame, said one frame including said first period and said second period;
    wherein said drive circuit scans all said electron emitters and applies accumulation voltages depending on the luminance levels of corresponding pixels to the electron emitters which correspond to pixels to emit light therefrom in said first period, and applies a constant emission voltage to all the electron emitters in the second period after said first period;
    wherein charges in amounts depending on the luminance levels of corresponding pixels are accumulated in the electron emitters which correspond to pixels to emit light therefrom in said first period; and
    wherein electrons are emitted in amounts depending on the luminance levels of corresponding pixels from the electron emitters which correspond to pixels to emit light therefrom in said second period, thereby emitting light from the pixels.

2. A display apparatus according to claim 1, characterized in that
    said drive circuit comprises:
    a pulse generating circuit for generating a pulse signal having a constant pulse amplitude; and
    an amplitude modulating circuit for amplitude-modulating said pulse signal to generate said accumulation voltage in said first period.

3. A display apparatus according to claim 1, characterized in that
    said drive circuit comprises:
    a pulse generating circuit for generating a pulse signal applicable to said electron emitters, said pulse signal having a voltage waveform including a positive-going edge or a negative-going edge which is continuously variable in level; and
    a pulse width modulating circuit for pulse-width-modulating said pulse signal to generate said accumulation voltage in said first period.

4. A display apparatus according to claim 1, wherein said electron emitters have such characteristics that the electron emitters change to a first state in which electrons are accumulated when an electric field is applied in one direction to said electron emitters, and change from said first state to a second state in which electrons are emitted when an electric field is applied in another direction to said electron emitters, and a drive circuit is controlled to apply a voltage between a voltage for changing the electron emitters to said first state and a voltage for changing the electron emitters to a state immediately prior to said second state, to electron emitters which are unselected.

5. A display apparatus according to claim 1, characterized in that
    said electron emitters are selected and unselected through corresponding select lines; and
    said drive circuit places the select lines of electron emitters which are unselected into a high impedance state.

6. A method of driving a display apparatus having a plurality of electron emitters arrayed in association with a plurality of pixels, for emitting electrons from the electron emitters to display an image, each electron emitter including a first electrode and a second electrode in direct contact with said electron emitter, said method comprising:
    the step of accumulating necessary charges in all the electron emitters in a first period, which includes the step of scanning all said electron emitters, and applying accumulation voltages depending on the luminance levels of corresponding pixels to the electron emitters which correspond to pixels to emit light therefrom in said first period, to accumulate charges in amounts depending on the luminance levels of corresponding pixels in the electron emitters which correspond to pixels to emit light therefrom in said first period; and
    the step of applying a voltage required to emit electrons to all the electron emitters to cause a plurality of electron emitters which correspond to pixels to emit light therefrom, for emitting light from said pixels, in a second period after said first period, which includes the step of applying a constant emission voltage to all the electron emitter's in the second period after said first period, to emit electrons in amounts depending on the luminance levels of corresponding pixels from the electron emitters which correspond to pixels to emit light therefrom in said second period, thereby emitting light from the pixels;
    wherein light is emitted from said pixels only during said second period and one image is displayed in a period as one flame, said one frame including said first period and said second period.

7. A method for driving a display apparatus according to claim 6, characterized in that
    a pulse signal having a constant pulse amplitude is generated; and
    said pulse signal is amplitude-modulated to generate said accumulation voltage in said first period.

8. A method for driving a display apparatus according to claim 6, characterized in that
a pulse signal applicable to said electron emitters is generated, said pulse signal having a voltage waveform including a positive-going edge or a negative-going edge which is continuously variable in level; and
said pulse signal is pulse-width-modulated to generate said accumulation voltage in said first period.

9. A method for driving a display apparatus according to claim 6, characterized in that
said electron emitters have such characteristics that the electron emitters change to a first state in which electrons are accumulated when an electric field is applied in one direction to said electron emitters, and change from said first state to a second state in which electrons are emitted when an electric field is applied in another direction to said electron emitters; and
a voltage between a voltage for changing the electron emitters to said first state and a voltage for changing the electron emitters to a state immediately prior to said second state, is applied to electron emitters which are unselected.

10. A method of driving a display apparatus according to claim 6, characterized in that
said electron emitters are selected and unselected through corresponding select lines; and
the select lines of electron emitters which are unselected are placed into a high impedance state.

11. An electron emission apparatus having a plurality of electron emitters, each electron emitter including a first electrode and a second electrode in direct contact with said electron emitter;
a pulse generating circuit for generating a pulse signal having a constant pulse amplitude; and
an amplitude modulating circuit for amplitude-modulating said pulse signal to generate an accumulation voltage in a first period.
wherein charges required for electron emission are accumulated in said plurality of electron emitters by applying accumulation voltages that depend on the amount of charges to be accumulated in said plurality of electron emitters in said first period; and
a constant emission voltage required for electron emission is applied to all the said plurality of electron emitters to emit electrons in an amount depending on the charges accumulated in said plurality of electron emitters in a second period after said first period; and
electrons are emitted from said plurality of electron emitters only during said second period.

12. An electron emission apparatus according to claim 11, characterized in that
said electron emitters have such characteristics that the electron emitters change to a first state in which electrons are accumulated when an electric field is applied in one direction to said electron emitters, and change from said first state to a second state in which electrons are emitted when an electric field is applied in another direction to said electron emitters;
said apparatus further comprising a drive circuit for applying a voltage between a voltage for changing the electron emitters to said first state and a voltage for changing the electron emitters to a state immediately prior to said second state, to electron emitters which are unselected.

13. An electron emission apparatus having a plurality of electron emitters, each electron emitter including a first electrode and a second electrode in direct contact with said electron emitter;
a pulse generating circuit for generating a pulse signal applicable to said electron emitters, said pulse signal having a voltage waveform including a positive-going edge or a negative-going edge which is continuously variable in level; and
a pulse width modulating circuit for pulse-width-modulating said pulse signal to generate an accumulation voltage in a first period,
wherein charges required for electron emission are accumulated in said plurality of electron emitters by applying accumulation voltages that depend on the luminance level selected for said plurality of electron emitters in said first period; and
a constant emission voltage required for electron emission is applied to said plurality of electron emitters to emit electrons in an amount depending on the charges accumulated in each of said plurality of electron emitters in a second period after said first period; and
electrons are emitted from said plurality of electron emitters only during said second period.

14. A method of driving an electron emission apparatus having a plurality of electron emitters each having a first electrode and a second electrode in direct contact with said electron emitter, said method comprising:
amplitude-modulating a pulse signal having a constant pulse amplitude to generate accumulation voltages in a first period;
accumulating charges required for electron emission in said plurality of electron emitters by applying the accumulation voltages that depend on the amount of charges to be accumulated in said plurality of electron emitters in said first period; and
applying a constant emission voltage required for electron emission to said plurality of electron emitters to emit electrons in an amount depending on the charges accumulated in said plurality of electron emitters in a second period after said first period,
wherein electrons are emitted from said plurality of electron emitters only during said second period.

15. A method of driving an electron emission apparatus according to claim 14, characterized in that
said electron emitters have such characteristics that the electron emitters change to a first state in which electrons are accumulated when an electric field is applied in one direction to said electron emitters, and change from said first state to a second state in which electrons are emitted when an electric field is applied in another direction to said electron emitters; and
a voltage between a voltage for changing the electron emitters to said first state and a voltage for changing the electron emitters to a state immediately prior to said second state, is applied to electron emitters which are unselected.

16. A method of driving an electron emission apparatus having plurality of electron emitters, each electron emitter including a first electrode and a second electrode in direct contact with said electron emitter, said method comprising:
generating a pulse signal applicable to said electron emitters, said pulse signal having a voltage waveform including a positive-going edge or a negative-going edge which is continuously variable in level;
pulse-width modulating said pulse signal to generate accumulated voltages in said a first period;

accumulating charges required for electron emission in said plurality of electron emitters by applying the accumulation voltages that depend on the luminance level selected for said plurality of electron emitters in said first period; and applying a constant emission voltage required for electron emission to said plurality of electron emitters to emit electrons in an amount depending on the charges accumulated in said electron emitters in a second period after said first period, wherein electrons are emitted from said electron emitters only during said second period.

* * * * *

UNITED STATES PATENT AND TRADEMARK OFFICE
CERTIFICATE OF CORRECTION

PATENT NO. : 7,379,037 B2  Page 1 of 1
APPLICATION NO. : 10/808258
DATED : May 27, 2008
INVENTOR(S) : Yukihisa Takeuchi et al.

It is certified that error appears in the above-identified patent and that said Letters Patent is hereby corrected as shown below:

<u>Column 48</u>
  *Line 52*: please change "emitter's" to --emitters--
  *Line 60*: please change "flame" to --frame--

<u>Column 49</u>
  *Line 44*: please delete "all the"

<u>Column 50</u>
  *Line 67*: please delete "said"

Signed and Sealed this

Twelfth Day of August, 2008

JON W. DUDAS
*Director of the United States Patent and Trademark Office*